US008995779B2

(12) United States Patent
Nakagami et al.

(10) Patent No.: US 8,995,779 B2
(45) Date of Patent: *Mar. 31, 2015

(54) IMAGE PROCESSING DEVICE AND METHOD FOR GENERATING A PREDICTION IMAGE

(71) Applicant: Sony Corporation, Tokyo (JP)

(72) Inventors: Ohji Nakagami, Tokyo (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 36 days.

This patent is subject to a terminal disclaimer.

(21) Appl. No.: 13/887,148

(22) Filed: May 3, 2013

(65) Prior Publication Data

US 2013/0243095 A1    Sep. 19, 2013

Related U.S. Application Data

(63) Continuation of application No. 13/201,351, filed as application No. PCT/JP2010/052017 on Feb. 12, 2010, now Pat. No. 8,457,422.

(30) Foreign Application Priority Data

Feb. 19, 2009    (JP) ................................ 2009-036498

(51) Int. Cl.
  *G06K 9/36*    (2006.01)
  *G06K 9/40*    (2006.01)
  (Continued)

(52) U.S. Cl.
  CPC ....... *H04N 19/00715* (2013.01); *H04N 19/107* (2013.01); *H04N 19/109* (2013.01);
  (Continued)

(58) Field of Classification Search
  CPC .............. H04N 19/00; H04N 19/0003; H04N 19/00036; H04N 19/00042
  USPC ......................... 382/232, 233, 238, 243, 260; 375/240.16, 240.2, 240.24, 240.29, 375/E07
  See application file for complete search history.

(56) References Cited

U.S. PATENT DOCUMENTS 5,089,889 A      2/1992  Sugiyama
6,560,372 B1 *   5/2003  Kadono ........................ 382/243
(Continued)

FOREIGN PATENT DOCUMENTS

CN    102100071 A    6/2011
EP    1 811 786 A1   7/2007
(Continued)

OTHER PUBLICATIONS

International Search Report issued May 18, 2010 in PCT/JP10/052017 filed Feb. 12, 2010.
(Continued)

*Primary Examiner* — Amir Alavi
(74) *Attorney, Agent, or Firm* — Oblon, McCelland, Maier & Neustadt, L.L.P.

(57)    ABSTRACT

Generating a prediction image by performing motion compensation by using a motion vector of an encoded image, with a frame formed of a decoded image serving as a reference frame, to generate a first motion compensation image corresponding to a prediction image; and generating the prediction image by performing a filtering process on at least two motion-compensated images by using a correlation in a time direction included in the first motion compensation image and a second motion compensation image.

9 Claims, 30 Drawing Sheets

(51) Int. Cl.

| | | |
|---|---|---|
| *H04N 19/51* | (2014.01) | |
| *H04N 19/107* | (2014.01) | |
| *H04N 19/109* | (2014.01) | |
| *H04N 19/117* | (2014.01) | |
| *H04N 19/573* | (2014.01) | |
| *H04N 19/577* | (2014.01) | |
| *H04N 19/61* | (2014.01) | |
| *H04N 19/82* | (2014.01) | |
| *G06K 9/46* | (2006.01) | |

(52) U.S. Cl.
 CPC .......... *H04N19/117* (2013.01); *H04N 19/573* (2013.01); *H04N 19/577* (2013.01); *H04N 19/61* (2013.01); *H04N 19/82* (2013.01)
 USPC .......................................... 382/238; 382/260

(56) References Cited

U.S. PATENT DOCUMENTS

| | | | |
|---|---|---|---|
| 6,633,676 | B1 | 10/2003 | Kleihorst et al. |
| 7,139,315 | B2* | 11/2006 | Hirase et al. ............... 375/240.2 |
| 7,864,219 | B2 | 1/2011 | Shimauchi et al. |
| 8,040,951 | B2 | 10/2011 | Kitada et al. |
| 8,457,422 | B2* | 6/2013 | Nakagami et al. ............ 382/233 |
| 8,483,279 | B2* | 7/2013 | Hiramatsu et al. ....... 375/240.16 |
| 2005/0111551 | A1* | 5/2005 | Sato et al. ................ 375/240.16 |
| 2006/0062299 | A1 | 3/2006 | Park et al. |
| 2006/0153295 | A1 | 7/2006 | Wang et al. |
| 2007/0086520 | A1 | 4/2007 | Kim |
| 2007/0098068 | A1 | 5/2007 | Kimata et al. |
| 2007/0183072 | A1 | 8/2007 | Lee |
| 2007/0291847 | A1 | 12/2007 | Shimauchi et al. |
| 2008/0037642 | A1* | 2/2008 | Tsuchiya et al. ......... 375/240.16 |
| 2008/0260043 | A1 | 10/2008 | Bottreau et al. |
| 2009/0010568 | A1 | 1/2009 | Nakagami et al. |
| 2009/0074061 | A1 | 3/2009 | Yin et al. |
| 2009/0080535 | A1 | 3/2009 | Yin et al. |
| 2009/0112272 | A1 | 4/2009 | Schleicher et al. |
| 2009/0116760 | A1 | 5/2009 | Boon et al. |
| 2009/0262803 | A1 | 10/2009 | Wang et al. |
| 2010/0118963 | A1 | 5/2010 | Nakagami et al. |
| 2010/0183072 | A1 | 7/2010 | Nakagami et al. |
| 2010/0202513 | A1 | 8/2010 | Arakawa et al. |
| 2011/0026593 | A1 | 2/2011 | New et al. |
| 2011/0122953 | A1 | 5/2011 | Nakagami et al. |
| 2011/0123131 | A1 | 5/2011 | Nakagami et al. |
| 2011/0286526 | A1 | 11/2011 | Nakagami et al. |
| 2011/0293014 | A1 | 12/2011 | Nakagami et al. |
| 2011/0293195 | A1 | 12/2011 | Nakagami et al. |
| 2012/0114260 | A1 | 5/2012 | Takahashi et al. |
| 2012/0163470 | A1 | 6/2012 | Wu et al. |
| 2013/0243095 | A1* | 9/2013 | Nakagami et al. ....... 375/240.16 |

FOREIGN PATENT DOCUMENTS

| | | |
|---|---|---|
| JP | 8 154250 | 6/1996 |
| JP | 2006 108811 | 4/2006 |
| JP | 2007 081983 | 3/2007 |
| JP | 2007 300380 | 11/2007 |
| JP | 2008 104188 | 5/2008 |
| JP | 2009 502099 | 1/2009 |
| WO | WO 2007 008286 A1 | 1/2007 |

OTHER PUBLICATIONS

Irani, M., et al., "Improving Resolution by Image Registration," CVGIP: Graphical Models and Image Processing, vol. 53, No. 3, pp. 231-239, (May 1991).

Extended European Search Report issued Oct. 4, 2012 in Patent Application No. 10743684.2.

Soon-kak Kwon, et al., "Overview of H.264/MPEG-4 part 10" Jounal of Visual Communication and Image Representation, vol. 17, No. 2, XP 24905089A, Apr. 1, 2006, pp. 186-216.

Extended European Search Report issued May 20, 2014 in Patent Application No. 13170853.9.

Marta Mrak, et al., "An overview of basic techniques behind scalable video coding", 46th International Symposium Electronics in Marine, ELMAR-2004, XP031969794, Jun. 18, 2004, pp. 597-602.

"The status of interframe wavelet coding exploration in MPEG", ISO/IEC JTC1/SC29/WG11 MPEG2002/N4928, XP001112945, Jul. 1, 2002, 8 Pages.

Combined Chinese Office Action and Search Report issued Oct. 30, 2013, in Patent Application No. 201080016294.7 (with English-language translation).

U.S. Appl. No. 14/341,319, filed Jul. 25, 2014, Nakagami et al.

\* cited by examiner

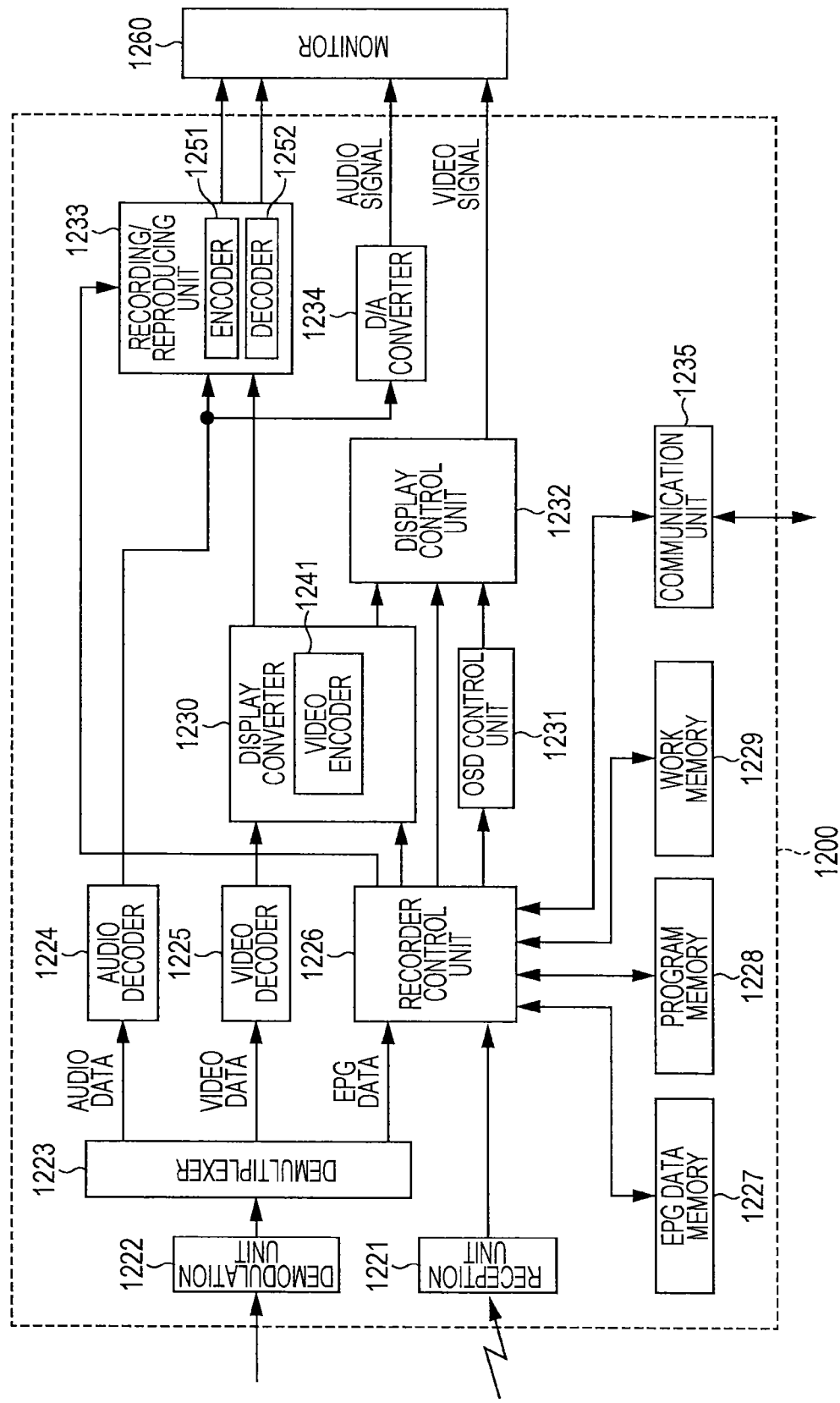

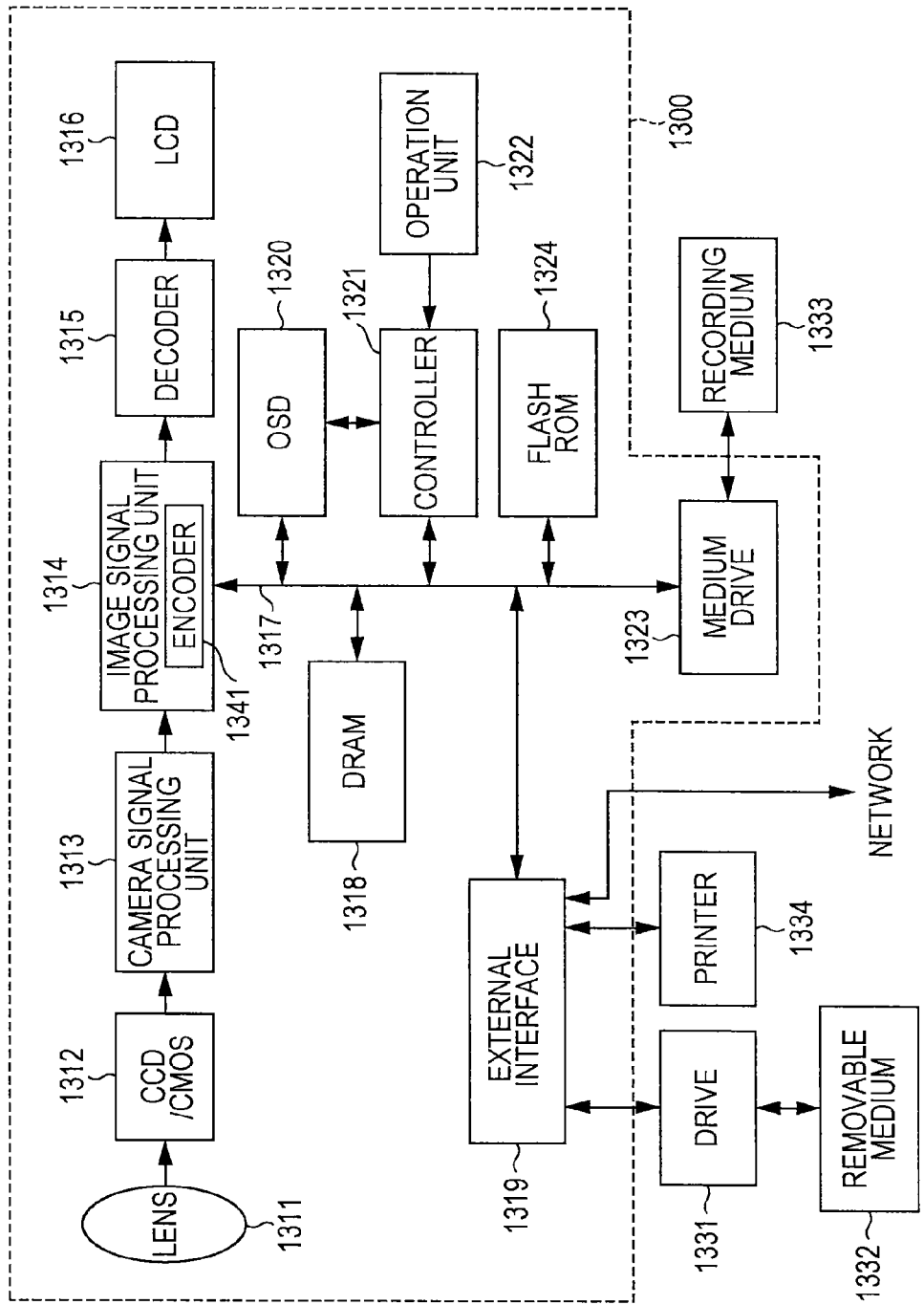

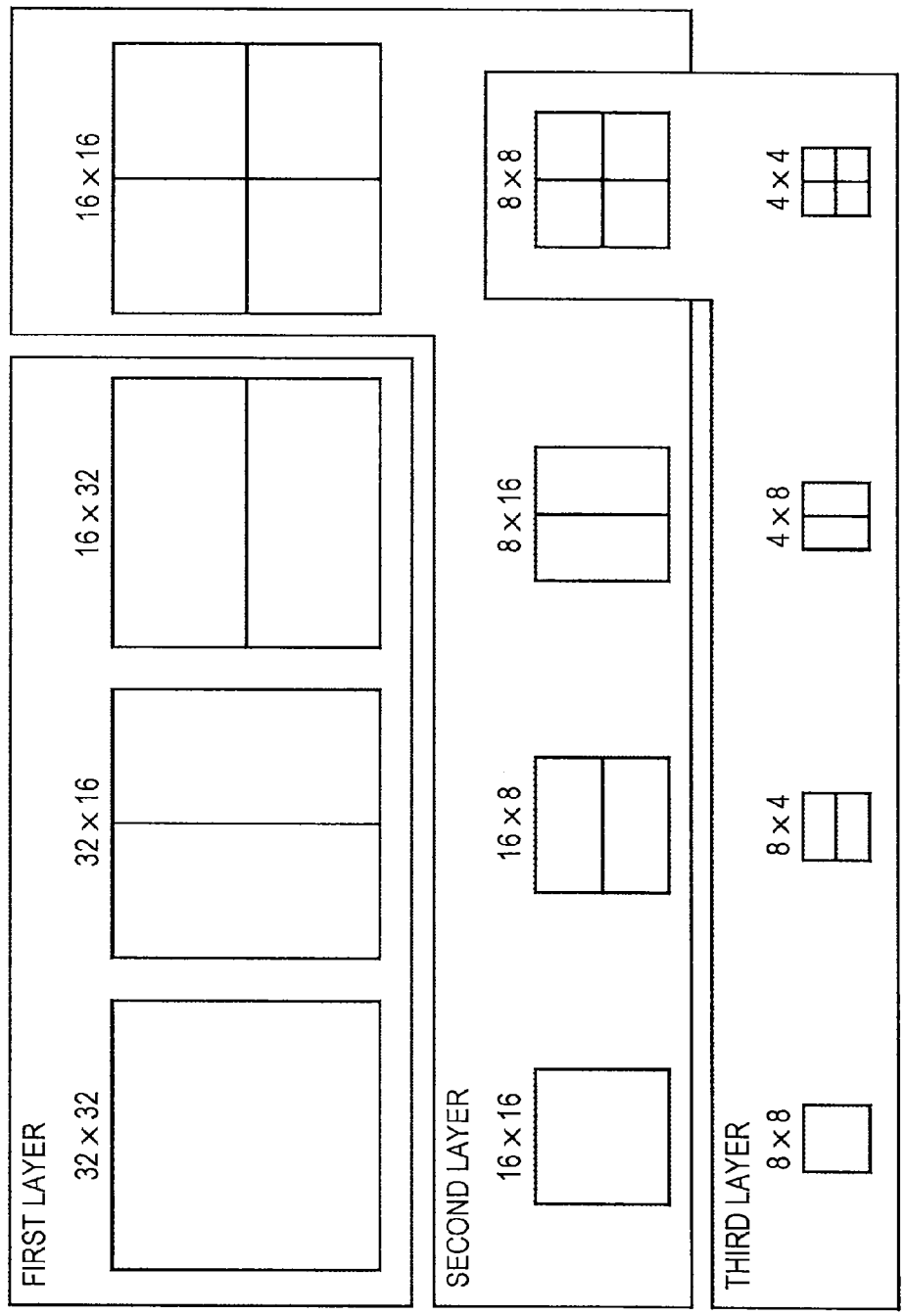

IMAGE PROCESSING DEVICE AND METHOD FOR GENERATING A PREDICTION IMAGE

CROSS-REFERENCE TO RELATED APPLICATIONS

This application is a continuation of and is based upon and claims the benefit of priority under 35 U.S.C. §120 to U.S. Ser. No. 13/201,351, filed Aug. 12, 2011 now U.S. Pat. No. 8,457,422 the entire contents of which is incorporated herein by reference which is the national stage of PCT/JP10/52017, filed Feb. 12, 2010 and claims the benefit of priority under 35 U.S.C. §119 from Japanese Patent Application No. 2009-036498, filed Feb. 19, 2009.

TECHNICAL FIELD

The present invention relates to an image processing device and method, and particularly relates to an image processing device and method that enable generation of a highly precise prediction image without increasing a processing load.

2. Background Art

Conventionally, encoding methods using motion compensation, such as MPEG (Moving Picture Experts Group) or H.26×, and orthogonal transformation, such as discrete cosine transformation, Karhunen Loeve transformation, or wavelet transformation, have been generally used as encoding methods in the case of handling a moving image. In these moving image encoding methods, the amount of code is reduced by using a correlation in a space direction and a time direction among the characteristics of an input image signal on which encoding is to be performed.

For example, in H.264, unidirectional prediction or bidirectional prediction is used for generating an inter-frame, which is a frame serving as a target of inter-frame prediction (inter-prediction), using a correlation in a time direction. The inter-frame prediction generates a prediction image on the basis of frames of different times.

FIG. 1 is a diagram illustrating an example of unidirectional prediction.

As illustrated in FIG. 1, in the case of generating a frame to be encoded P0, which is a current-time frame to be encoded, through unidirectional prediction, motion compensation is performed using an encoded frame at a temporally past or future time with respect to the current time as a reference frame. The residual between a prediction image and an actual image is encoded using a correlation in a time direction, whereby the amount of code can be reduced. Reference frame information and a motion vector are used as information specifying a reference frame and information specifying the position to be referred to in the reference frame, respectively, and these pieces of information are transmitted from an encoding side to a decoding side.

Here, the number of reference frames is not necessarily one. For example, in H.264, a plurality of frames can be used as reference frames. When two frames that are temporally close to the frame to be encoded P0 are used as reference frames R0 and R1, as illustrated in FIG. 1, the pixel values of an arbitrary macroblock in the frame to be encoded P0 can be predicted from the pixel values of arbitrary pixels in the reference frame R0 or R1.

The boxes illustrated inside the respective frames in FIG. 1 represent macroblocks. When it is assumed that the macroblock in the frame to be encoded P0, which is a prediction target, is a macroblock MBP0, the macroblock in the reference frame R0 corresponding to the macroblock MBP0 is a macroblock MBR0 that is specified by a motion vector MV0. Also, the macroblock in the reference frame R1 is a macroblock MBR1 that is specified by a motion vector MV1.

When it is assumed that the pixel values of the macroblocks MBR0 and MBR1 (pixel values of motion compensation images) are $MC0(i,j)$ and $MC1(i,j)$, since the pixel values of any of the motion compensation images are used as the pixel values of a prediction image in unidirectional prediction, a prediction image $Pred(i,j)$ is expressed by the following equation (1). $(i,j)$ represents the relative position of a pixel in the macroblock, and $0 \leq i \leq 16$ and $0 \leq j \leq 16$ are satisfied. In equation (1), "$\|$" represents that the value of any of $MC0(i,j)$ and $MC1(i,j)$ is taken.

[Math. 1]

$$Pred(i,j) = MC_0(i,j) \| MC_1(i,j) \qquad (1)$$

Also, it is possible to divide a single macroblock of 16×16 pixels into smaller blocks having a size of 16×8 pixels, for example, and to perform motion compensation on the individual blocks formed through the division by referring to different reference frames. By transmitting a motion vector of decimal precision, not a motion vector of integer precision, and by performing interpolation using an FIR filter defined according to a standard, the pixel values of pixels around the corresponding position that is referred to can be used for motion compensation.

FIG. 2 is a diagram illustrating an example of bidirectional prediction.

As illustrated in FIG. 2, in the case of generating a frame to be encoded B0, which is a current-time frame to be encoded, through bidirectional prediction, motion compensation is performed using encoded frames at temporally past and future times with respect to the current time as reference frames. A plurality of encoded frames are used as reference frames, and the residual between a prediction image and an actual image is encoded using the correlation with those frames, whereby the amount of code can be reduced. In H.264, it is also possible to use a plurality of past frames and a plurality of future frames as reference frames.

As illustrated in FIG. 2, when one past frame and one future frame are used as reference frames L0 and L1, with the frame to be encoded B0 serving as a basis, the pixel values of an arbitrary macroblock in the frame to be encoded B0 can be predicted on the basis of the pixel values of arbitrary pixels of the reference frames L0 and L1.

In the example in FIG. 2, the macroblock in the reference frame L0 corresponding to the macroblock MBB0 in the frame to be encoded B0 is a macroblock MBL0 that is specified by a motion vector MV0. Also, the macroblock in the reference frame L1 corresponding to the macroblock MBB0 in the frame to be encoded B0 is a macroblock MBL1 that is specified by a motion vector MV1.

When it is assumed that the pixel values of the macroblocks MBL0 and MBL1 are $MC0(i,j)$ and $MC1(i,j)$, respectively, the pixel value $Pred(i,j)$ of a prediction image $Pred(i,j)$ can be obtained as the average value of those pixel values, as expressed by the following equation (2).

[Math. 2]

$$Pred(i,j) = (MC_0(i,j) + MC_1(i,j))/2 \qquad (2)$$

In the foregoing motion compensation using unidirectional prediction, the precision of a prediction image is increased by increasing the precision of a motion vector and reducing the size of a macroblock to reduce the residual with respect to an actual image, thereby increasing the encoding efficiency.

Also, in the motion compensation using bidirectional prediction, the averages of the pixel values of pixels of temporally close reference frames are used as the pixel values of pixels of a prediction image, thereby realizing a stable reduction in prediction residual from the viewpoint of probability.

Also, as another method, there is suggested a method for converting a correlation in a time direction into spatial resolution using motion compensation and FIR filtering of pixel values and using it (e.g., see NPL 1).

In the method described in NPL 1, a correlation in a time direction is used for a resolution increase process that it performed on an input image sequence. Specifically, difference information about a difference between a current image and a past image on which motion prediction/compensation has been performed is calculated, and the difference information is fed back to the target current image, thereby recovering a high-frequency component included in input images.

CITATION LIST

Non Patent Literature

NPL 1: "Improving Resolution by Image Registration", MICHAL IRANI AND SHMUEL PELEG, Department of Computer Science, The Hebrew University of Jerusalem, 91904 Jerusalem, Israel, Communicated by Rama Chellapa, Received Jun. 16, 1989; accepted May 25, 1990

SUMMARY OF INVENTION

Technical Problem

In the case of conventional unidirectional prediction, even when a plurality of reference frames can be selected, it is necessary to selectively use the pixel values of any one of the reference frames as the pixel values of a frame to be encoded. Thus, since a reference frame that is not selected is not used for motion compensation, a temporal correlation between the reference frame and the frame to be encoded is not sufficiently used, and there is much to be improved from the viewpoint of increasing the encoding efficiency.

Also, in the case of conventional bidirectional prediction, the average values of the pixel values of two reference frames are used as the pixel values of a frame to be encoded, so that a temporal low-pass filter process is performed and that a high-frequency component is lost from a prediction image. As a result, since a residual signal including a high-frequency component cannot be encoded, an image obtained through decoding does not include a high-frequency component, and the resolution degrades.

Furthermore, prediction can be performed with higher precision than in conventional bidirectional prediction by filtering the information about two or more reference frames in the method described in NPL 2 and using it. In this case, however, it is necessary to transmit motion vector information relating to the two or more reference frames to a decoder. That is, a large amount of control information is necessary to increase prediction precision, which may not be effective from the viewpoint of encoding efficiency.

The present invention has been made in view of these circumstances, and is directed to enabling generation of a highly precise prediction image using a small amount of control information by reducing the amount of code for motion vectors that are necessary to perform bidirectional prediction or refer to a plurality of images.

Solution to Problem

An aspect of the present invention is an image processing device including: decoding means for decoding an encoded image; generating means for generating a decoded image by adding the image decoded by the decoding means and a prediction image; first extracting means for performing motion compensation by using a motion vector of the encoded image, with a frame formed of the decoded image generated by the generating means serving as a reference frame, and extracting a motion compensation image corresponding to the prediction image from the reference frame; second extracting means for extracting a portion that matches or is similar to the motion compensation image extracted by the first extracting means from a reference frame different from the reference frame from which the motion compensation image is extracted, the portion serving as a motion compensation image corresponding to the prediction image; and prediction image generating means for generating the prediction image by performing a filtering process on the motion compensation image extracted by the first extracting means and the motion compensation image extracted by the second extracting means, the filtering process adding a high-frequency component by using a correlation in a time direction included in the motion compensation images.

The second extracting means may extract a portion that matches or is similar to the motion compensation image extracted by the first extracting means from the reference frame by using a certain cost function that is shared by an encoding device that encodes the image, the portion serving as a motion compensation image corresponding to the prediction image.

The cost function may be a function for calculating a total sum of absolute values of difference values of individual pixel values between the motion compensation image extracted by the first extracting means and a process target block of the reference frame.

The cost function may be a function for calculating a minimum square error of individual pixel values between the motion compensation image extracted by the first extracting means and a process target block of the reference frame.

The prediction image generating means may include first filter means for performing low-pass filtering on a difference image between the motion compensation image extracted by the first extracting means and the motion compensation image extracted by the second extracting means, second filter means for performing high-pass filtering on an image obtained through the low-pass filtering performed by the first filter means, and adding means for adding the image obtained through the low-pass filtering performed by the first filter means and an image obtained through the high-pass filtering performed by the second filter means to any of the motion compensation image extracted by the first extracting means and the motion compensation image extracted by the second extracting means, thereby generating the prediction image.

The adding means may add the image obtained through the low-pass filtering performed by the first filter means and the image obtained through the high-pass filtering performed by the second filter means to the motion compensation image extracted from a frame that is one unit of time before the time of the prediction image.

The image processing device may further include: unidirectional prediction means for performing unidirectional prediction using a plurality of motion compensation images to generate the prediction image; bidirectional prediction means for performing bidirectional prediction using a plurality of motion compensation images to generate the prediction image; and judging means for judging, by using an identification flag included in a header of the encoded image, whether the prediction image is to be generated through unidirectional prediction performed by the unidirectional prediction means, bidirectional prediction performed by the bidirectional prediction means, or the filtering process performed by the prediction image generating means.

An aspect of the present invention is an image processing method including: decoding an encoded image; generating a decoded image by adding the decoded image and a prediction image; performing motion compensation by using a motion vector of the encoded image, with a frame formed of the generated decoded image serving as a reference frame, and extracting a motion compensation image corresponding to the prediction image from the reference frame; extracting a portion that matches or is similar to the extracted motion compensation image from a reference frame different from the reference frame from which the motion compensation image is extracted, the portion serving as a motion compensation image corresponding to the prediction image; and generating the prediction image by performing a filtering process on the plurality of extracted motion compensation images, the filtering process adding a high-frequency component by using a correlation in a time direction included in the motion compensation images.

Another aspect of the present invention is an image processing device including: encoding means for encoding an original image, which is an image to be encoded, to generate an encoded image; detecting means for detecting a motion vector on the basis of the original image and an image that is obtained by performing local decoding on the basis of a residual signal representing a difference between the original image and a prediction image; first extracting means for performing motion compensation by using the motion vector detected by the detecting means, with a frame formed of the image that is obtained by performing local decoding serving as a reference frame, and extracting a motion compensation image corresponding to the prediction image from the reference frame; second extracting means for extracting a portion that matches or is similar to the motion compensation image extracted by the first extracting means from a reference frame different from the reference frame from which the motion compensation image is extracted, the portion serving as a motion compensation image corresponding to the prediction image; and generating means for generating the prediction image by performing a filtering process on the motion compensation image extracted by the first extracting means and the motion compensation image extracted by the second extracting means, the filtering process adding a high-frequency component by using a correlation in a time direction included in the motion compensation images.

The second extracting means may extract a portion that matches or is similar to the motion compensation image extracted by the first extracting means from the reference frame by using a certain cost function that is shared by a decoding device that decodes the encoded image, the portion serving as a motion compensation image corresponding to the prediction image.

The cost function may be a function for calculating a total sum of absolute values of difference values of individual pixel values between the motion compensation image extracted by the first extracting means and a process target block of the reference frame.

The cost function may be a function for calculating a minimum square error of individual pixel values between the motion compensation image extracted by the first extracting means and a process target block of the reference frame.

The generating means may include first filter means for performing low-pass filtering on a difference image between the motion compensation image extracted by the first extracting means and the motion compensation image extracted by the second extracting means, second filter means for performing high-pass filtering on an image obtained through the low-pass filtering performed by the first filter means, and adding means for adding the image obtained through the low-pass filtering performed by the first filter means and an image obtained through the high-pass filtering performed by the second filter means to any of the motion compensation image extracted by the first extracting means and the motion compensation image extracted by the second extracting means, thereby generating the prediction image.

The adding means may add the image obtained through the low-pass filtering performed by the first filter means and the image obtained through the high-pass filtering performed by the second filter means to the motion compensation image extracted from a frame that is one unit of time before the time of the prediction image.

The encoding means may cause a header of the encoded image to include an identification flag for identifying whether a prediction image that is to be added to an image decoded by a decoding device is to be generated through unidirectional prediction, bidirectional prediction, or the filtering process.

Another aspect of the present invention is an image processing method including: encoding an original image, which is an image to be encoded, to generate an encoded image; detecting a motion vector on the basis of the original image and an image that is obtained by performing local decoding on the basis of a residual signal representing a difference between the original image and a prediction image; performing motion compensation by using the detected motion vector, with a frame formed of the image that is obtained by performing local decoding serving as a reference frame, and extracting a motion compensation image corresponding to the prediction image from the reference frame; extracting a portion that matches or is similar to the extracted motion compensation image from a reference frame different from the reference frame from which the motion compensation image is extracted, the portion serving as a motion compensation image corresponding to the prediction image; and generating the prediction image by performing a filtering process on the plurality of extracted motion compensation images, the filtering process adding a high-frequency component by using a correlation in a time direction included in the motion compensation images.

In an aspect of the present invention, an encoded image is decoded, the decoded image and a prediction image are added to generate a decoded image, motion compensation is performed using a motion vector of the encoded image, with a frame formed of the generated decoded image serving as a reference frame, a motion compensation image corresponding to the prediction image is extracted from the reference frame, a portion that matches or is similar to the extracted motion compensation image is extracted from a reference frame different from the reference frame from which the motion compensation image is extracted, the portion serving as a motion compensation image corresponding to the prediction image, and a filtering process is performed on the plurality of extracted motion compensation images, the filtering process adding a high-frequency component using a correlation in a time direction included in the motion compensation images, so that a prediction image is generated.

In another aspect of the present invention, an original image, which is an image to be encoded, is encoded, an encoded image is generated, a motion vector is detected on the basis of the original image and an image that is obtained by performing local decoding on the basis of a residual signal representing a difference between the original image and a prediction image, motion compensation is performed using the detected motion vector, with a frame formed of the image obtained by performing local decoding serving as a reference frame, a motion compensation image corresponding to the prediction image is extracted from the reference frame, a portion that matches or is similar to the extracted motion compensation image is extracted from a reference frame different from the reference frame from which the motion compensation image is extracted, the portion serving as a motion compensation image corresponding to the prediction image, and a filtering process is performed on the plurality of extracted motion compensation images, the filtering process adding a high-frequency component using a correlation in a time direction included in the motion compensation images, so that a prediction image is generated.

Advantageous Effects of Invention

According to the present invention, a highly precise prediction image can be generated without increasing the amount of transmitted motion vectors in a stream, and high encoding efficiency can be achieved.

BRIEF DESCRIPTION OF DRAWINGS

FIG. 28 is a block diagram illustrating a main example configuration of a hard disk recorder to which the present invention is applied.

FIG. 29 is a block diagram illustrating a main example configuration of a camera to which the present invention is applied.

FIG. 30 is a diagram illustrating an example of the sizes of macroblocks.

DESCRIPTION OF EMBODIMENTS

Hereinafter, embodiments for carrying out the invention (hereinafter referred to as embodiments) will be described. Note that the description will be given in the following order.
1. First embodiment (decoding process)
2. Second embodiment (encoding process)
3. Third embodiment (modification of filtering circuit)

1. First Embodiment

[Outline of Prediction]

Figure 3:
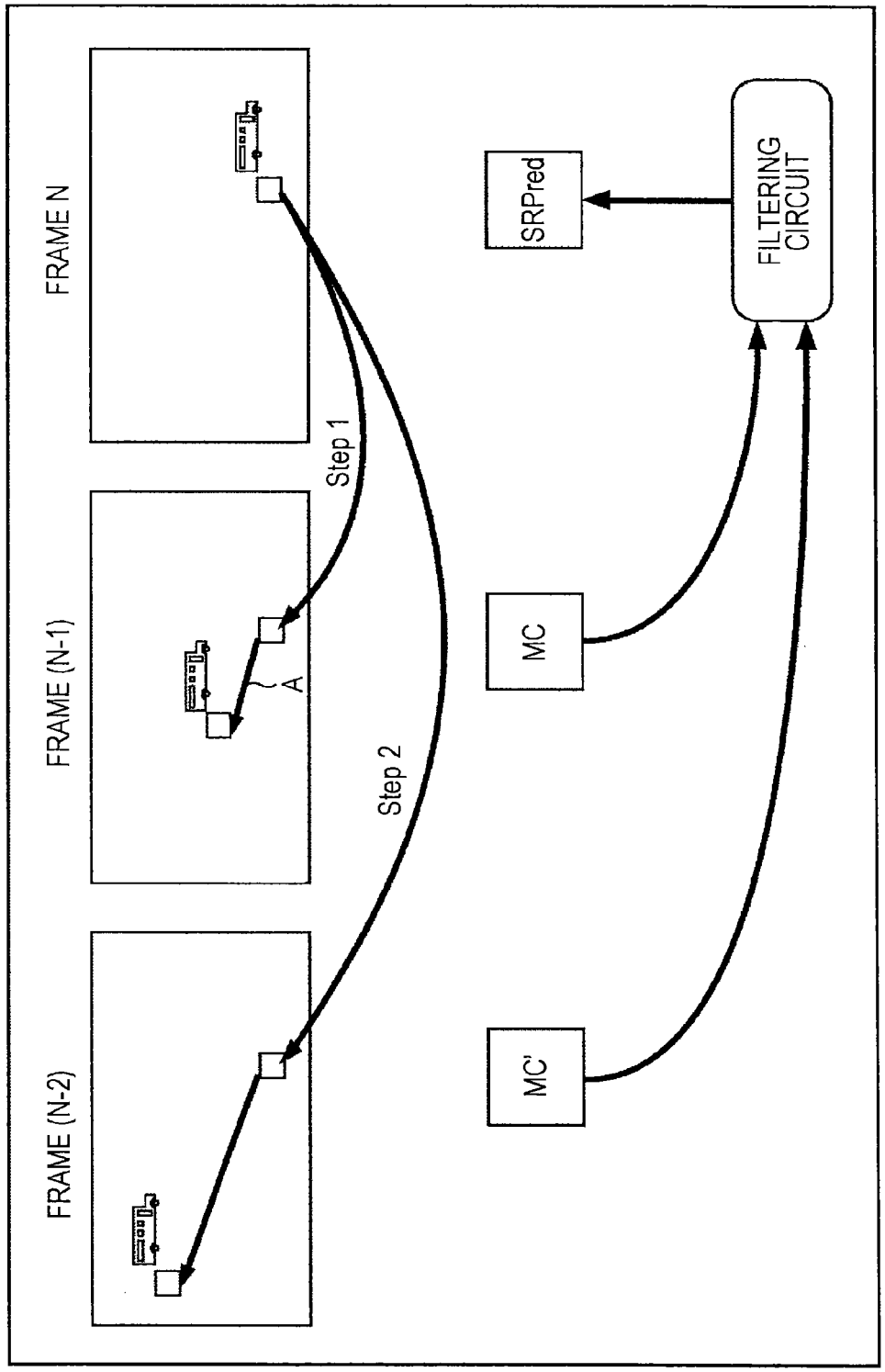
FIG. 3 is a diagram describing an outline of generating a prediction image of the present invention.

FIG. 3 is a diagram describing an outline of a prediction image generation method to which the present invention is applied.

In the present invention, at least one motion vector (motion vector A) is transmitted in a bit stream in order to obtain a plurality of motion compensation images from a plurality of reference planes in a decoder.

FIG. 3 illustrates a state where two frames: a frame (N−1) and a frame (N−2), are used as reference planes for motion compensation in order to decode a frame N.

In FIG. 3, the motion vector A indicating coordinates in the frame (N−1) is transmitted in a stream. The decoder obtains an image MC using this vector.

Subsequently, the decoder performs motion prediction in order to perform motion compensation on the basis of the frame (N−2). That is, an image MC', which has an approximate value with respect to the image MC, is searched for in the frame (N−2). Search methods, for example, a search algorithm, a search range, a cost function, etc., may be arbitrarily determined as long as they are shared in advance by an encoder and a decoder. When they are shared by the encoder and the decoder, the search results in the encoder and the decoder, that is, the pixel values of the image MC', match each other.

In this way, the decoder can obtain a motion prediction image on the basis of the frame (N−1) and the frame (N−2). Accordingly, the motion vector of MC' is not necessary. That is, the amount of code of motion vectors decreases. Thus, the decoder and the encoder can generate a highly precise prediction image using a small amount of control information.

[Configuration of Decoding Device]

Figure 4:
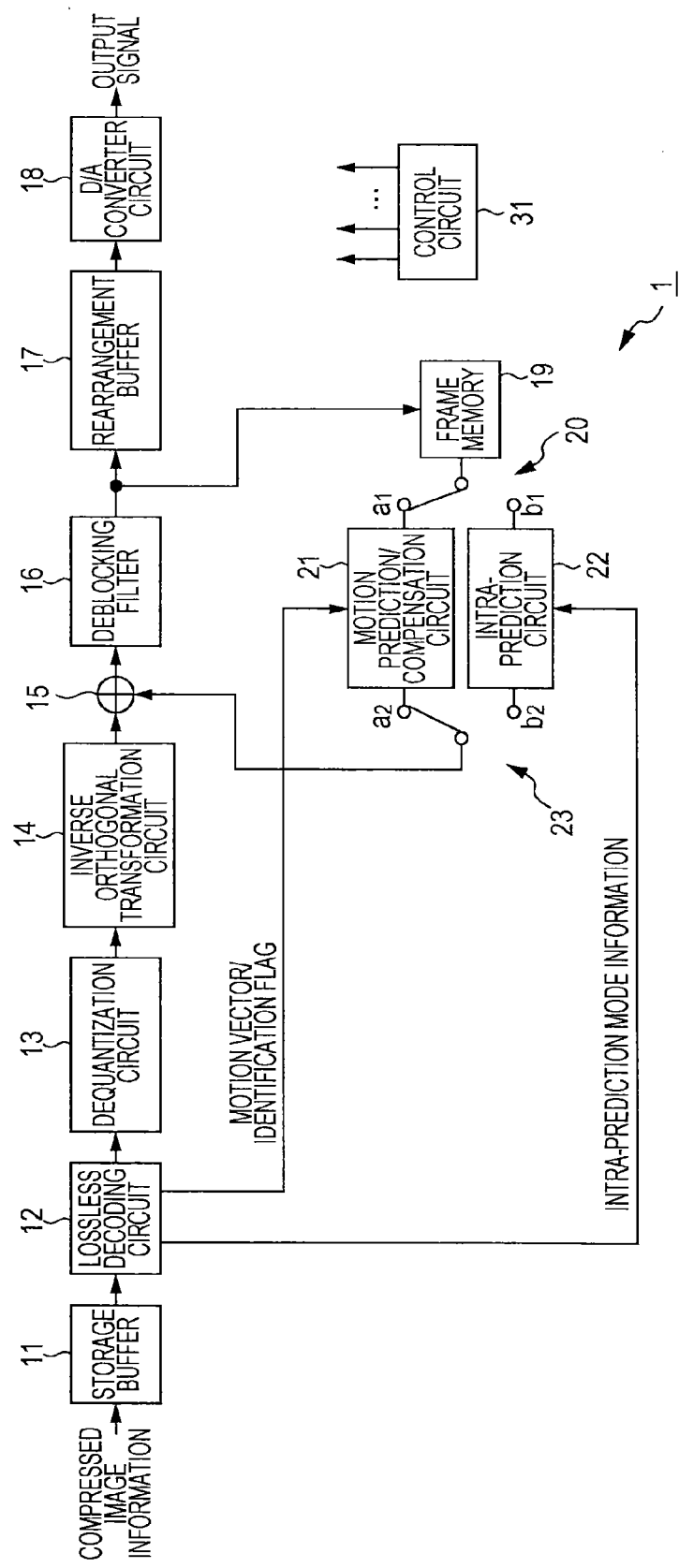
FIG. 4 is a block diagram illustrating an example configuration of a decoding device according to an embodiment of the present invention.

FIG. 4 is a block diagram illustrating an example configuration of a decoding device 1 according to an embodiment of the present invention.

Image information that is encoded by an encoding device, which will be described below, is input to the decoding device 1 via a cable, network, or removable medium. The compressed image information is image information that is encoded in accordance with an H.264 standard, for example.

A storage buffer 11 sequentially stores bit streams input as compressed image information. The information stored in the storage buffer 11 is read as necessary by a lossless decoding circuit 12 in units of images of certain units, such as macroblocks constituting a frame. In the H.264 standard, a process can be performed not only in units of macroblocks of 16×16 pixels, but also in units of blocks of 8×8 pixels or 4×4 pixels, obtained by further dividing the macroblocks.

The lossless decoding circuit 12 performs a decoding process corresponding to an encoding method, such as a variable-length decoding process or an arithmetic decoding process, on an image read from the storage buffer 11. The lossless decoding circuit 12 outputs a quantized transformation coefficient obtained through the decoding process to a dequantization circuit 13.

Also, the lossless decoding circuit 12 identifies, on the basis of an identification flag included in the header of the image to be decoded, whether the image is an intra-coded image or an inter-coded image. If the lossless decoding circuit 12 judges that the image to be decoded is an intra-coded image, the lossless decoding circuit 12 outputs intra-prediction mode information stored in the header of the image to an intra-prediction circuit 22. The intra-prediction mode information includes information about intra-prediction, such as the size of a block serving as the unit of a process.

If the lossless decoding circuit 12 judges that the image to be decoded is inter-coded information, the lossless decoding circuit 12 outputs a motion vector and an identification flag stored in the header of the image to a motion prediction/compensation circuit 21. With the identification flag, the mode of prediction for generating a prediction image through inter-prediction can be identified. The identification flag is set in units of macroblocks or frames, for example.

Figure 1:
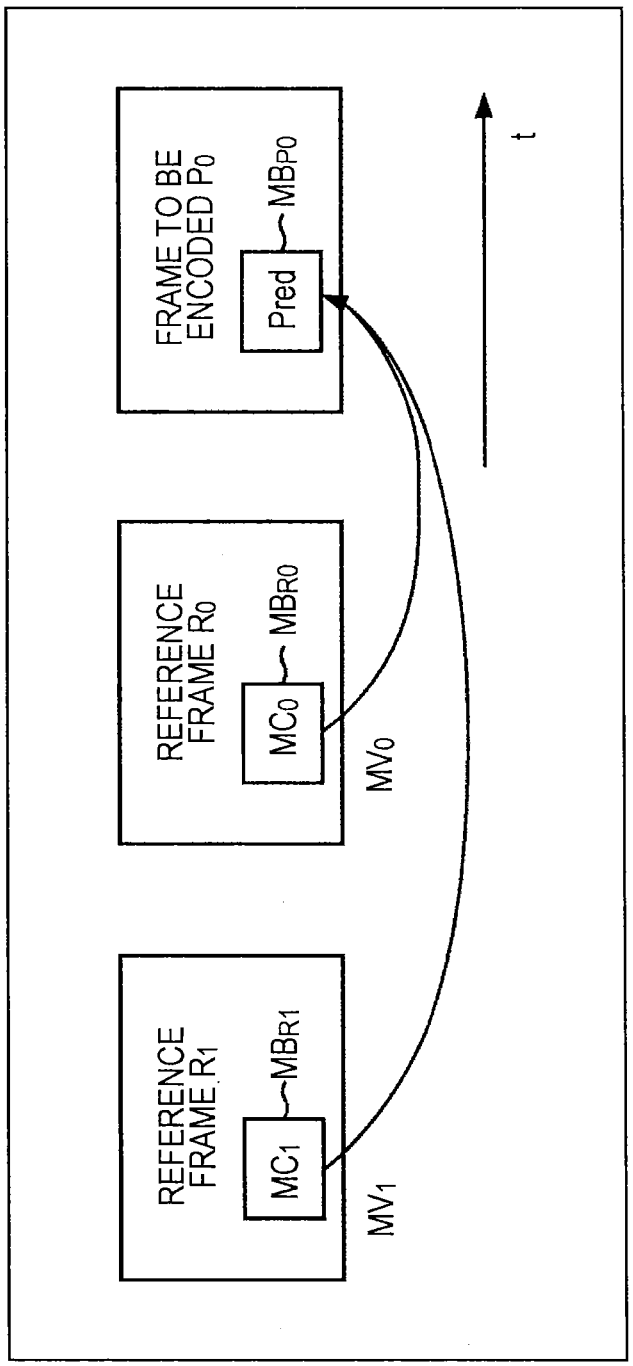
FIG. 1 is a diagram illustrating an example of unidirectional prediction.
Figure 2:
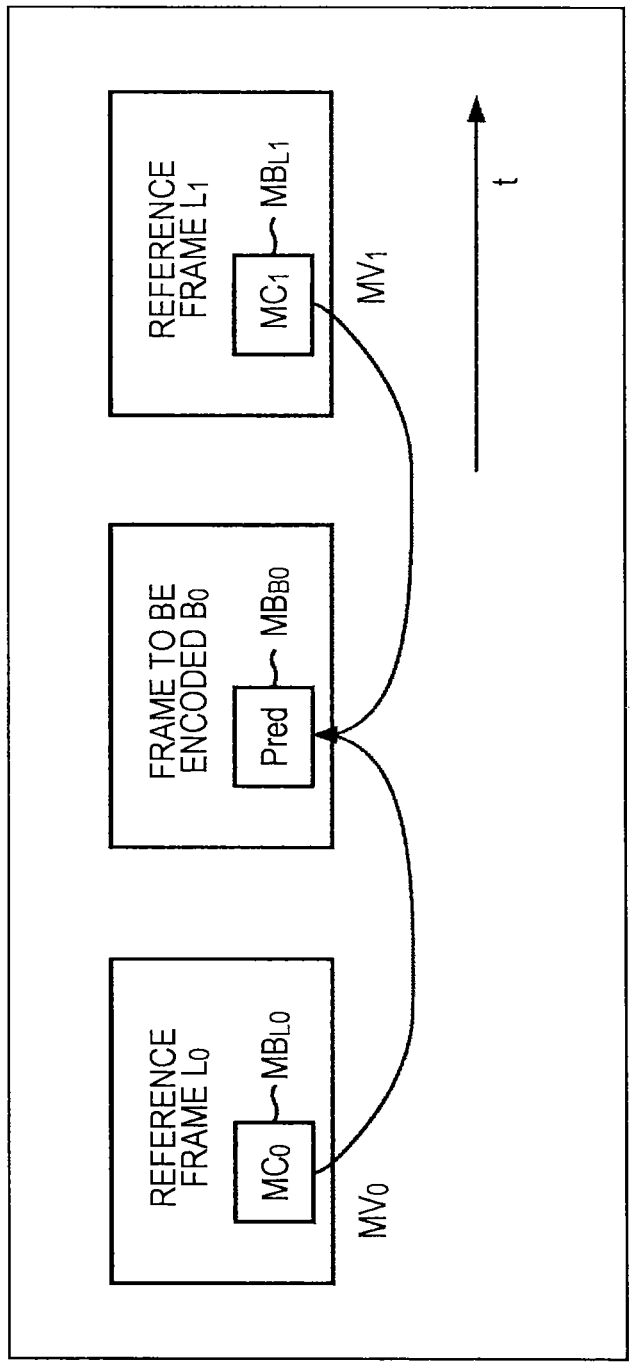
FIG. 2 is a diagram illustrating an example of bidirectional prediction.

As the mode of prediction, there is prepared a third prediction mode for generating a prediction image by performing filtering on motion compensation images that are extracted from a plurality of reference frames arranged in one or two temporal directions, in addition to the mode of unidirectional prediction in FIG. 1 and the mode of bidirectional prediction in FIG. 2.

Figure 5:
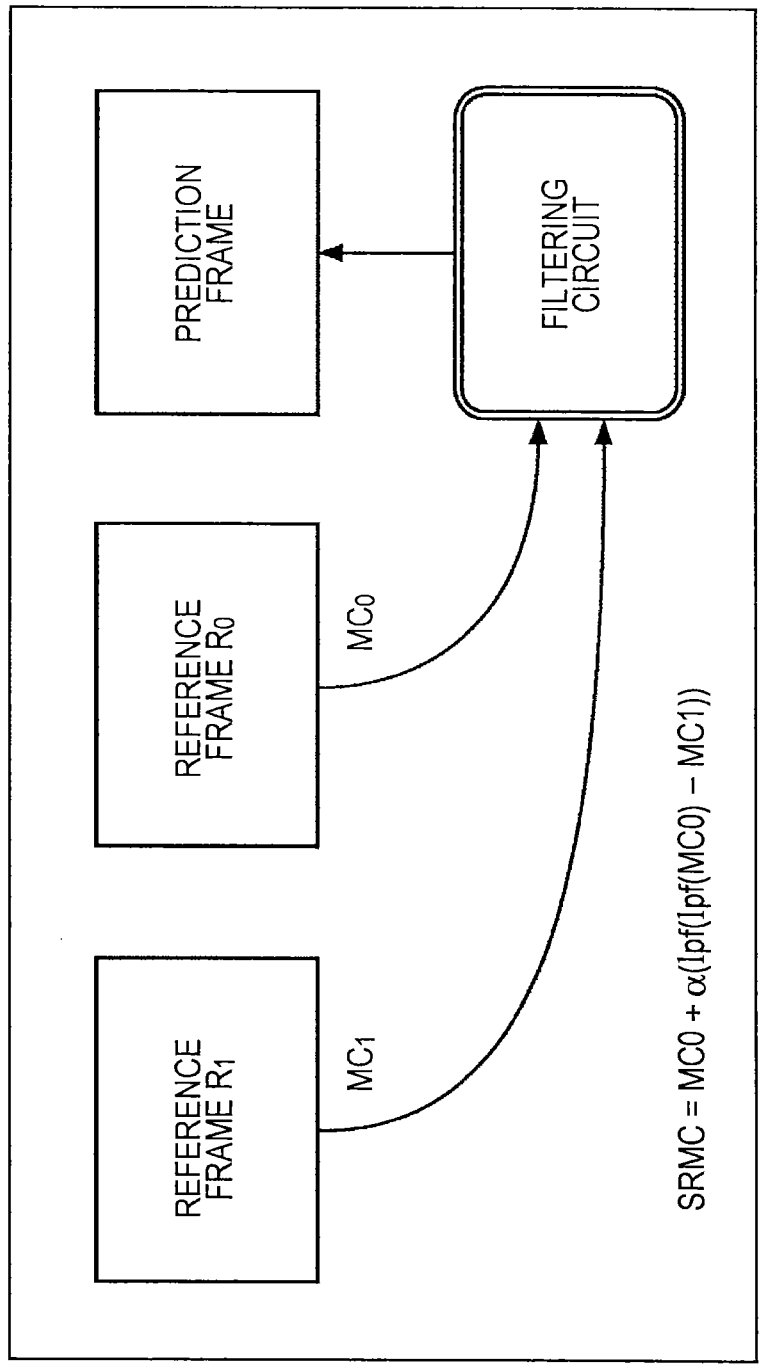
FIG. 5 is a diagram illustrating a concept of a third prediction mode.

FIG. 5 is a diagram illustrating a concept of the third prediction mode.

In the example in FIG. 5, with the time of a current frame (prediction frame) serving as a basis, the frame that is temporally one unit of time before is regarded as a reference frame R0, and the frame that is one unit of time before the reference frame R0 is regarded as a reference frame R1. In this case, according to the third prediction mode, motion compensation images MC0 and MC1 extracted from the reference frames R0 and R1 are input to a filtering circuit, and the pixel values of the image output from the filtering circuit are regarded as the pixel values of a prediction image, which is a target macroblock.

Hereinafter, the mode of prediction in which the pixel values of any of motion compensation images extracted from a plurality of reference frames arranged in one direction are regarded as the pixel values of a prediction image, as described above with reference to FIG. 1, is simply referred to as a unidirectional prediction mode. Also, the mode of prediction in which the average values of the pixel values of the motion compensation images extracted from a plurality of reference frames arranged in two directions are regarded as the pixel values of a prediction image, as described above with reference to FIG. 2, is simply referred to as a bidirectional prediction mode.

The third prediction mode illustrated in FIG. 5, in which the pixel values of a prediction image are obtained by performing filtering on individual motion compensation images extracted from a plurality of reference frames arranged in one direction or two directions, is referred to as a filtering prediction mode. The filtering prediction mode will be described in detail below.

Referring back to FIG. 4, the dequantization circuit 13 performs dequantization in a method corresponding to the quantization method used on the encoding side on the quantized transformation coefficient supplied from the lossless decoding circuit 12. The dequantization circuit 13 outputs the transformation coefficient obtained by performing dequantization to an inverse orthogonal transformation circuit 14.

The inverse orthogonal transformation circuit 14 performs fourth-order inverse orthogonal transformation on the transformation coefficient supplied from the dequantization circuit 13 using a method corresponding to the orthogonal transformation method used on the encoding side, such as discrete cosine transformation or Karhunen Loeve transformation, and outputs an obtained image to an adder circuit 15.

The adder circuit 15 combines the decoded image supplied from the inverse orthogonal transformation circuit 14 and a prediction image supplied from the motion prediction/compensation circuit 21 or the intra-prediction circuit 22 via a switch 23, and outputs a composite image to a deblocking filter 16.

The deblocking filter 16 removes block noise included in the image supplied from the adder circuit 15 and outputs an image from which the block noise has been removed. The image output from the deblocking filter 16 is supplied to a rearrangement buffer 17 and a frame memory 19.

The rearrangement buffer 17 temporarily stores the image supplied from the deblocking filter 16. The rearrangement buffer 17 generates individual frames from images in units of macroblocks stored therein, for example, rearranges the generated frames in certain order, such as display order, and outputs them to a D/A (Digital/Analog) converter circuit 18.

The D/A converter circuit 18 performs D/A conversion on the individual frames supplied from the rearrangement buffer 17 and outputs the signals of the individual frames to the outside.

The frame memory 19 temporarily stores the image supplied from the deblocking filter 16. The information stored in the frame memory 19 is supplied to the motion prediction/compensation circuit 21 or the intra-prediction circuit 22 via a switch 20.

The switch 20 connects to a terminal a1 in the case of generating a prediction image using inter-prediction, and connects to a terminal b1 in the case of generating it using intra-prediction. The switching of the switch 20 is controlled by a control circuit 31, for example.

The motion prediction/compensation circuit 21 determines a prediction mode in accordance with the identification flag supplied from the lossless decoding circuit 12, and selects a frame to be used as a reference frame from among the decoded frames stored in the frame memory 19 in accordance with the prediction mode. The motion prediction/compensation circuit 21 determines a macroblock corresponding to a target prediction image from among the macroblocks constituting the reference frame on the basis of the motion vector supplied from the lossless decoding circuit 12, and extracts the determined macroblock as a motion compensation image. The motion prediction/compensation circuit 21 obtains the pixel values of the prediction image from the pixel values of the motion compensation image in accordance with the prediction mode, and outputs the prediction image in which the pixel values have been obtained to the adder circuit 15 via the switch 23.

The intra-prediction circuit 22 performs intra-prediction in accordance with the intra-prediction mode information supplied from the lossless decoding circuit 12 to generate a prediction image. The intra-prediction circuit 22 outputs the generated prediction image to the adder circuit 15 via the switch 23.

The switch 23 connects to a terminal a2 if a prediction image is generated by the motion prediction/compensation circuit 21, and connects to a terminal b2 if a prediction image is generated by the intra-prediction circuit 22. The switching of the switch 23 is also controlled by the control circuit 31, for example.

The control circuit 31 switches the connection of the switches 20 and 23 and controls the entire operation of the decoding device 1. Whether an image to be processed is an intra-coded image or an inter-coded image may be identified by the control circuit 31.

Figure 6:
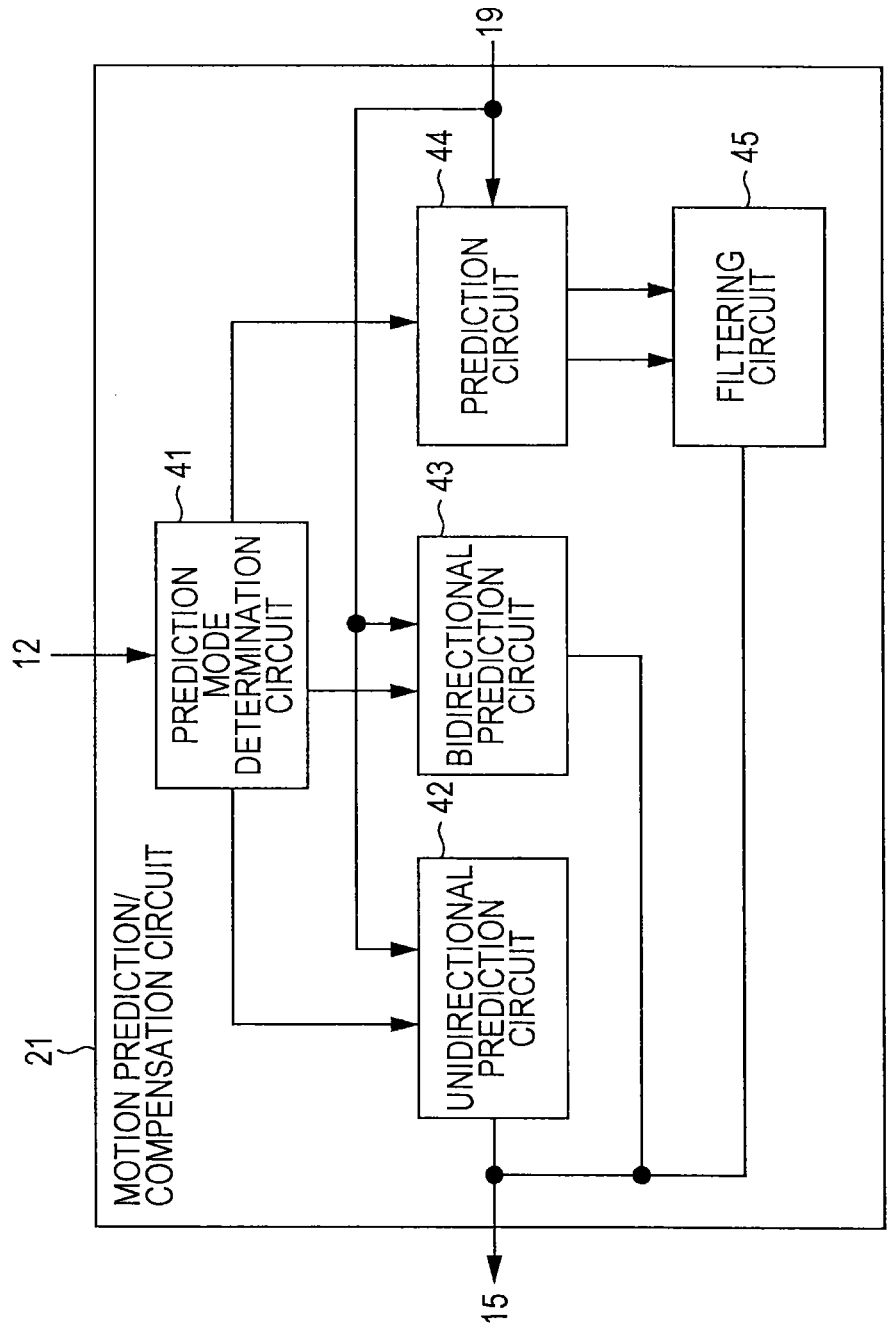
FIG. 6 is a block diagram illustrating an example configuration of the motion prediction/compensation circuit in FIG. 3.

FIG. 6 is a block diagram illustrating an example configuration of the motion prediction/compensation circuit 21 in FIG. 3.

As illustrated in FIG. 6, the motion prediction/compensation circuit 21 is constituted by a prediction mode determination circuit 41, a unidirectional prediction circuit 42, a bidirectional prediction circuit 43, a prediction circuit 44, and a filtering circuit 45. The motion vector and identification flag supplied from the lossless decoding circuit 12 are input to the prediction mode determination circuit 41.

The prediction mode determination circuit 41 determines a prediction mode in accordance with the identification flag supplied from the lossless decoding circuit 12. The prediction mode determination circuit 41 outputs the motion vector to the unidirectional prediction circuit 42 when determining to perform generation of a prediction image using unidirectional prediction, and outputs the motion vector to the bidirectional prediction circuit 43 when determining to perform generation of a prediction image using bidirectional prediction. Also, the prediction mode determination circuit 41 outputs the motion vector to the prediction circuit 44 when determining to perform generation of a prediction image using filtering prediction.

In this way, in order to enable identification of filtering prediction, a value different from the value representing unidirectional prediction and the value representing bidirectional prediction, which are defined in the conventional H.264 standard, can be set as the value of an identification flag. Alternatively, a prediction mode may be determined by a predetermined method, instead of being determined in accordance with an identification flag, in order to reduce the amount of information.

The unidirectional prediction circuit 42 regards a plurality of frames arranged in one temporal direction as reference frames, and determines macroblocks in the reference frames corresponding to a prediction image on the basis of motion vectors, as illustrated in FIG. 1. Also, the unidirectional prediction circuit 42 reads the determined macroblocks in the respective reference frames as motion compensation images from the frame memory 19, and generates a prediction image using the pixel values of any of the motion compensation images as the pixel values of the prediction image. The unidirectional prediction circuit 42 outputs the prediction image to the adder circuit 15. As the unidirectional prediction performed by the unidirectional prediction circuit 42, the unidirectional prediction defined in the H.264 standard is used, for example.

The bidirectional prediction circuit 43 regards a plurality of frames arranged in two temporal directions as reference frames, and determines macroblocks in the reference frames corresponding to a prediction image on the basis of motion vectors, as illustrated in FIG. 2. Also, the bidirectional prediction circuit 43 reads the determined macroblocks in the respective reference frames as motion compensation images from the frame memory 19, and generates a prediction image using the averages of the pixel values of the read motion compensation images as the pixel values of the prediction image. The bidirectional prediction circuit 43 outputs the prediction image to the adder circuit 15. As the bidirectional prediction performed by the bidirectional prediction circuit 43, the bidirectional prediction defined in the H.264 standard is used, for example.

The prediction circuit 44 determines a plurality of frames arranged in one or two temporal directions as reference frames. The frames to be used as reference frames may be predetermined, or may be specified by information transmitted from the encoding side together with an identification flag.

Figure 7:
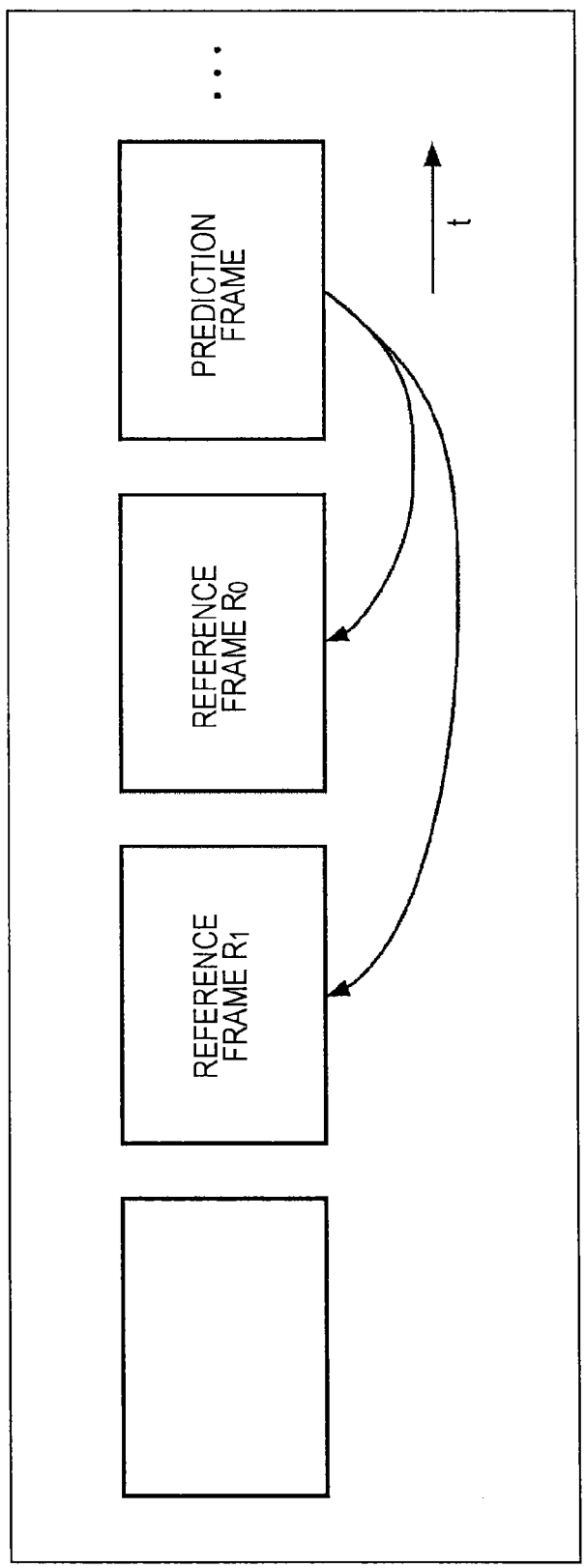
FIG. 7 is a diagram illustrating an example of reference frames.

FIG. 7 is a diagram illustrating an example of reference frames.

In the example in FIG. 7, with the time of a prediction frame serving as a basis, two frames that are temporally one unit of time before and two units of time before are regarded as reference frames, as in the example described above with reference to FIG. 5. Among the two reference frames, the frame that is closer to the prediction frame and that is one unit of time before the prediction frame is regarded as a reference frame R0, and the frame that is one unit of time before the reference frame R0 is regarded as a reference frame R1.

Figure 8:
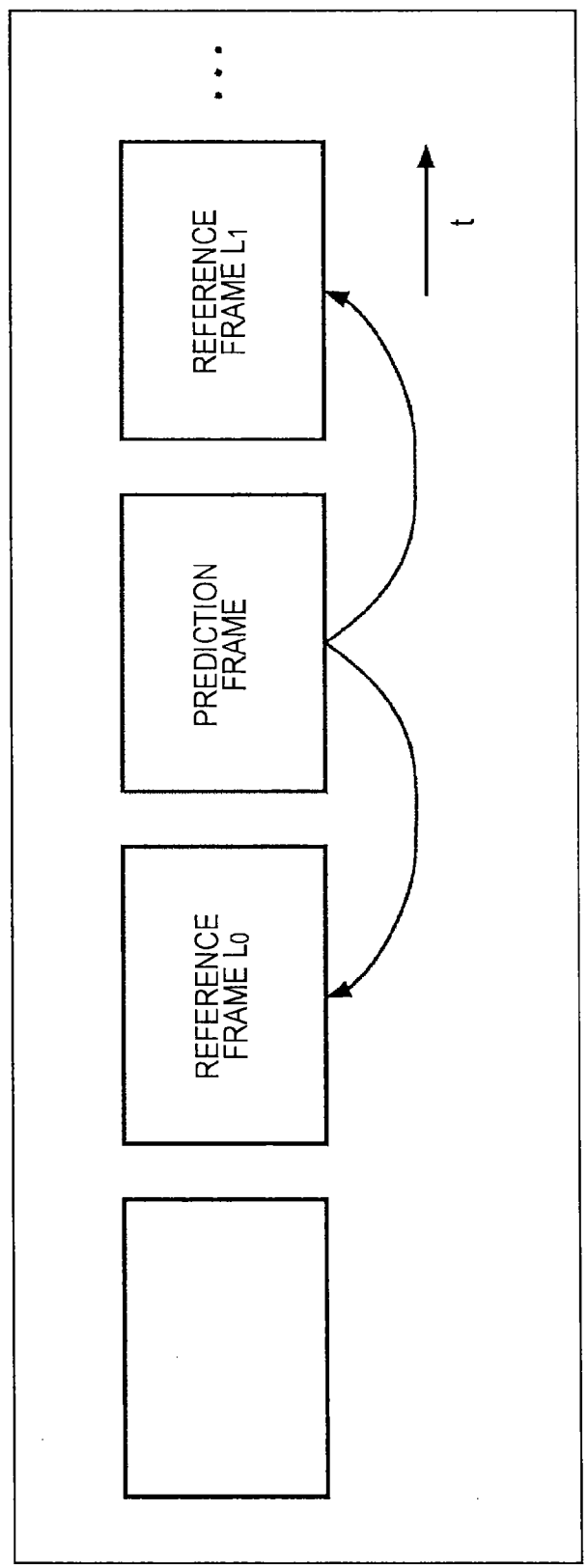
FIG. 8 is a diagram illustrating another example of reference frames.

FIG. 8 is a diagram illustrating another example of reference frames.

In the example in FIG. 8, with the time of a prediction frame serving as a basis, two frames that are temporally one unit of time before and one unit of time after are regarded as reference frames. Among the two reference frames, the frame that is one unit of time before the prediction frame is regarded as a reference frame L0, and the frame that is one unit of time after the prediction frame is regarded as a reference frame L1.

In this way, in the filtering prediction, a plurality of frames arranged in one temporal direction or a plurality of frames arranged in two directions are used as reference frames.

Also, the prediction circuit 44 determines, on the basis of the motion vector supplied from the prediction mode determination circuit 41, the macroblock corresponding to the prediction image among the decoded macroblocks in at least one of the reference frames determined in the manner illustrated in FIG. 7 or FIG. 8.

Furthermore, the prediction circuit 44 performs motion prediction on the remaining reference frame (at least one reference frame) among the reference frames determined in the manner illustrated in FIG. 7 or FIG. 8 using the macroblock corresponding to the prediction image determined on the basis of the motion vector, thereby determining the macroblock corresponding to the prediction image.

The prediction circuit 44 reads the determined macroblocks in the respective reference frames as motion compensation images from the frame memory 19, and outputs the read motion compensation images to the filtering circuit 45.

That is, the prediction circuit 44 extracts a motion compensation image on the basis of a motion vector from part of reference frames, and extracts a motion compensation image from the remaining reference frame on the basis of motion prediction using the motion compensation image.

The motion vector may be performed not in units of macroblocks of 16×16 pixels but in units of blocks obtained by further dividing the macroblocks. Images in units of macroblocks are input to the filtering circuit 45, for example. In FIG. 6, the illustration of two arrows extending from the prediction circuit 44 toward the filtering circuit 45 represents that two motion compensation images are supplied.

The filtering circuit 45 receives the motion compensation images supplied from the prediction circuit 44 and performs filtering thereon, and outputs a prediction image obtained by performing the filtering to the adder circuit 15.

Figure 9:
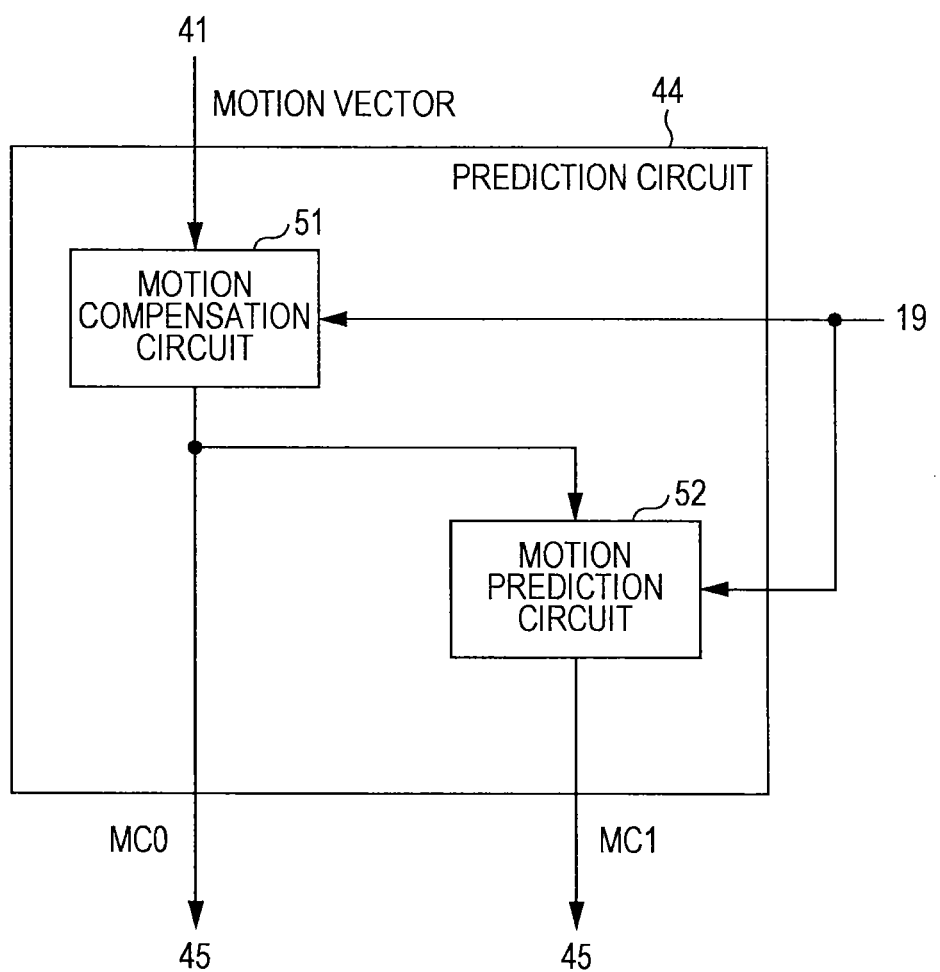
FIG. 9 is a block diagram illustrating an example configuration of the prediction circuit in FIG. 6.

FIG. 9 is a block diagram illustrating an example configuration of the prediction circuit 44 in FIG. 6. In FIG. 9, the prediction circuit 44 has a motion compensation circuit 51 and a motion prediction circuit 52.

The motion compensation circuit 51 specifies a macroblock corresponding to a prediction image in part of reference frames using a motion vector supplied from the prediction mode determination circuit 41. The motion compensation circuit 51 reads the image of the specified macroblock from the frame memory 19 and extracts it as a motion compensation image. The motion compensation circuit 51 supplies the extracted motion compensation image MC0 to the filtering circuit 45 and also supplies it to the motion prediction circuit 52.

The motion prediction circuit 52 performs matching (performs motion prediction) of the motion compensation image MC0 supplied from the motion compensation circuit 51 in at least one or more of the remaining reference frames (reference frames different from the reference frame from which the motion compensation image MC0 has been extracted).

When searching for a portion that matches or is similar to the motion compensation image MC0 in a reference frame, the motion prediction circuit 52 uses a certain cost function that is shared in advance by the encoding device and the decoding device 1. For example, the cost function expressed by the following equation (3) is shared.

[Math. 3]

$$\text{Cost} = \sum_{x=0}^{bk_{width}-1} \sum_{y=0}^{bk_{height}-1} |Ref_i(posX + x, posY + y) - MC[1](x, y)| \quad (3)$$

In equation (3), Refi(posX+x, posY+y) represents the pixel value at the coordinates (posX+x, posY+y) in a reference plane i. Likewise, MC[1] (x, y) represents the pixel value at a relative position (x, y) from the upper left end of the block of the motion compensation image MC[1] (that is, the motion compensation image MC0). Bkwidth and Bkheight represent the width and height of the block, respectively.

As expressed by equation (3), by summing the absolute value of a difference to all the pixels in the block, the degree of similarity between the motion compensation image MC[1] and the block at (posX, posY) in the reference plane i can be calculated.

The degree of similarity is defined by such a cost function shared by the encoding device and the decoding device. That is, the definition of the degree of similarity can be changed by changing the cost function. Another example of the cost function is expressed by the following equation (4). Equation (4) is an example in which a minimum square error is used as a cost function.

[Math. 4]

$$\text{Cost} = \sum_{x=0}^{bk_{width}-1} \sum_{y=0}^{bk_{height}-1} |Ref_i(posX + x, posY + y) - MC[1](x, y)|^2 \quad (4)$$

A plurality of cost functions may be defined and may be switched for each block or each sequence. Adaptive change of a cost function for optimizing a result of the subsequent filtering process results in an improvement of the encoding efficiency.

In such a cost function, when (posX, posY) is changed, the image of the macroblock that causes Cost to be minimized is the most similar to the motion compensation image MC[1] (that is, the motion compensation image MC0).

The range in which (posX, posY) is changed is a search range, and it is necessary that the search range is shared by the encoding device and the decoding device 1. Note that an arbitrary value may be used, for example, a fixed value may be used, or a value may be adaptively changed for each sequence, each frame, each region, etc. In the case of changing a value, a corresponding flag may be separately described in a stream, or the encoding device and the decoding device 1 may realize the change on the basis of judgment in a determined procedure.

The motion compensation image MC[1] is obtained so as to be similar to an encoded image of a current block (macroblock to be processed), and thus a motion compensation image MC[i] that is obtained through motion prediction using such a cost function is similar to the encoded image of the current block.

The decoder performs motion prediction in this manner, whereby a plurality of motion compensation images MC[i] (i>1) can be obtained using one motion vector.

The motion prediction circuit 52 reads out, from the frame memory 122, the image of a macroblock that matches or is similar to the motion compensation image MC0 in a reference frame, and extracts it as a motion compensation image. The motion prediction circuit 52 supplies the extracted motion compensation image MC1 to the filtering circuit 45.

Figure 10:
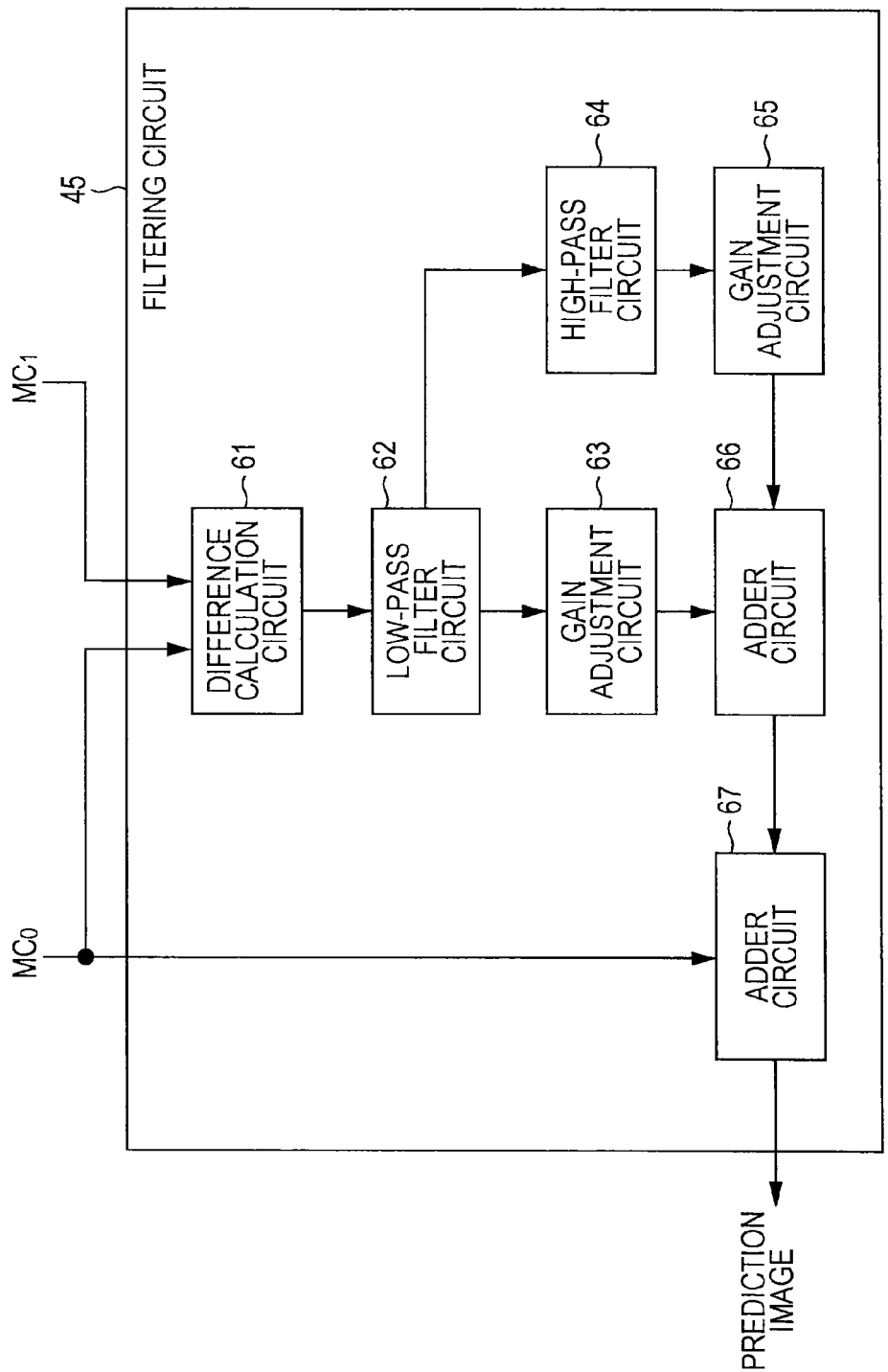
FIG. 10 is a block diagram illustrating an example configuration of the filtering circuit in FIG. 6.

FIG. 10 is a block diagram illustrating an example configuration of the filtering circuit 45. In the filtering circuit 45 having the configuration in FIG. 10, filtering is performed on a signal in a time domain.

As illustrated in FIG. 10, the filtering circuit 45 is constituted by a difference calculation circuit 61, a low-pass filter circuit 62, a gain adjustment circuit 63, a high-pass filter circuit 64, a gain adjustment circuit 65, an adder circuit 66, and an adder circuit 67. The motion compensation image MC0 supplied from the prediction circuit 44 is input to the difference calculation circuit 61 and the adder circuit 67, and the motion compensation image MC1 is input to the difference calculation circuit 61.

In the case of generating a prediction image using unidirectional prediction, as illustrated in FIG. 7, the image extracted from the reference frame R0, which is considered to have a higher correlation with the prediction image, is regarded as the motion compensation image MC0, and the image extracted from the reference frame R1 is regarded as the motion compensation image MC1, for example. The image extracted from the reference frame R0 may be regarded as the motion compensation image MC1, and the image extracted from the reference frame R1 may be regarded as the motion compensation image MC0.

On the other hand, in the case of generating a prediction image using bidirectional prediction, as illustrated in FIG. 8, the image extracted from the reference frame L0, which is one unit of time before, is regarded as the motion compensation image MC0, and the image extracted from the reference frame L1, which is one unit of time after, is regarded as the motion compensation image MC1, for example. The image extracted from the reference frame L0 may be regarded as the motion compensation image MC1, and the image extracted from the reference frame L1 may be regarded as the motion compensation image MC0.

The difference calculation circuit 61 calculates the difference between the motion compensation image MC0 and the motion compensation image MC1, and outputs a difference image to the low-pass filter circuit 62. A difference image D is expressed by the following equation (5).

[Math. 5]

$$D(i,j)=MC_0(i,j)-MC_1(i,j) \qquad (5)$$

In equation (5), (i, j) represents the relative position of a pixel in a motion compensation image. When a process is to be performed in units of macroblocks of 16×16 pixels, 0≤i≤16 and 0≤j≤16 are satisfied. This is the same in the following.

The low-pass filter circuit 62 has an FIR filter circuit. The low-pass filter circuit 62 performs low-pass filtering on the difference image D supplied from the difference calculation circuit 61, and outputs an obtained image to the gain adjustment circuit 63 and the high-pass filter circuit 64. A difference image D', which is an image obtained by performing low-pass filtering, is expressed by the following equation (6). In equation (6), LPF(X) represents that low-pass filtering is performed on an input image X using a two-dimensional FIR filter.

[Math. 6]

$$D'=LPF(D) \qquad (6)$$

The gain adjustment circuit 63 adjusts the gain of the difference image D' supplied from the low-pass filter circuit 62, and outputs the image in which the gain has been adjusted to the adder circuit 66. The output image X(i, j) of the gain adjustment circuit 63 is expressed by the following equation (7).

[Math. 7]

$$X(i,j)=\alpha D'(i,j) \qquad (7)$$

The high-pass filter circuit 64 has an FIR filter circuit. The high-pass filter circuit 64 performs high-pass filtering on the difference image D' supplied from the low-pass filter circuit 62 and outputs an obtained image to the gain adjustment circuit 65. A difference image D", which is an image obtained by performing high-pass filtering, is expressed by the following equation (8). In equation (8), HPF(X) represents that high-pass filtering is performed on an input image X using a two-dimensional FIR filter.

[Math. 8]

$$D''=HPF(D') \qquad (8)$$

The gain adjustment circuit 65 adjusts the gain of the difference image D" supplied from the high-pass filter circuit 64, and outputs the image in which the gain has been adjusted to the adder circuit 66. The output image Y(i, j) of the gain adjustment circuit 65 is expressed by the following equation (9).

[Math. 9]

$$Y(i,j)=\beta D''(i,j) \qquad (9)$$

As the values of $\alpha$ in equation (7) and $\beta$ in equation (9), the values $\alpha=0.8$ and $\beta=0.2$ are selected, for example, but other values may be used in order to increase the precision of a prediction image. Also, the values may be adaptively changed in accordance with the property of an input sequence.

The adder circuit 66 adds the image X(i, j) and the image Y(i, j) in which the gain has been adjusted, and outputs the image obtained through the addition. The output image Z(i, j) of the adder circuit 66 is expressed by the following equation (10).

[Math. 10]

$$Z(i,j)=X(i,j)+Y(j) \qquad (10)$$

The output image Z(i, j) represents a high-frequency component of the image, which can be obtained from the difference between the motion compensation image MC0 and the motion compensation image MC1, that is, the correlation therebetween.

The adder circuit 67 adds the output image Z(i, j) supplied from the adder circuit 66 to the motion compensation image MC0, and outputs an obtained image as a prediction image to the adder circuit 15. The prediction image S(i, j), which is the final output of the adder circuit 67, is expressed by the following equation (11).

[Math. 11]

$$S(i,j)=MC_0(i,j)+Z(i,j) \qquad (11)$$

In this way, according to the filtering prediction mode, the image that is obtained by adding an image representing a high-frequency component to the motion compensation image MC0 is generated as a prediction image. This prediction image includes a larger amount of high-frequency component than a prediction image that is obtained in the case of simply performing bidirectional prediction. As described above, since the averages of the pixel values of a plurality of motion compensation images are obtained as pixel values, a high-frequency component is lost in the prediction image that is generated by performing bidirectional prediction.

Also, since a prediction image including a large amount of high-frequency component is added to a decoded image in the adder circuit 15, the image that is finally output from the decoding device 1 is a high-resolution image including a large amount of high-frequency component.

Furthermore, a prediction image can be generated using a time correlation of images more efficiently, compared to the case of simply performing unidirectional prediction. A prediction image that is generated through unidirectional prediction is not regarded as an image generated by sufficiently using a time correlation of images because the pixel values of any of a plurality of motion compensation images are used, as described above.

In this way, the decoding device 1 is capable of increasing the encoding efficiency while suppressing an increase in load.

[Description of Procedure of Decoding Process]

Now, a process performed by the decoding device 1 having the foregoing configuration will be described.

First, a decoding process performed by the decoding device 1 will be described with reference to the flowchart in FIG. 11.

Figure 11:
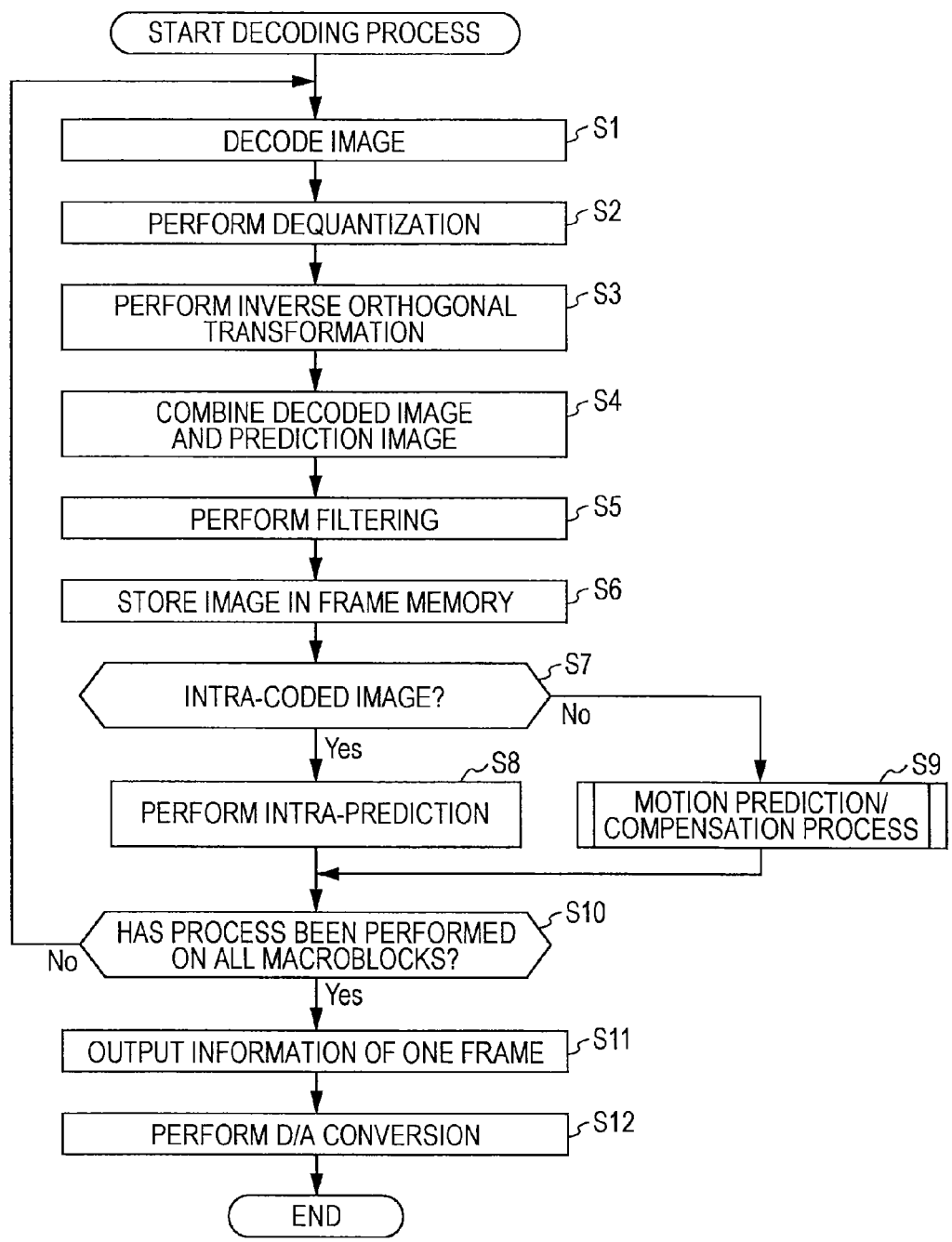
FIG. 11 is a flowchart describing a decoding process performed by the decoding device.

The process in FIG. 11 is started when an image of a certain size, such as a macroblock of 16×16 pixels, is read by the lossless decoding circuit 12 from the information stored in the storage buffer 11, for example. The processes in the respective steps in FIG. 11 are performed in parallel with a process in another step or in changed order as necessary. This is the same in the processes in the respective steps in the individual flowcharts described below.

In step S1, the lossless decoding circuit 12 performs a decoding process on the image read from the storage buffer 11 and outputs a quantized transformation coefficient to the dequantization circuit 13. Also, the lossless decoding circuit 12 outputs intra-prediction mode information to the intra-prediction circuit 22 if the image to be decoded is an intra-coded image, and outputs a motion vector and an identification flag to the motion prediction/compensation circuit 21 if the image to be decoded is an inter-coded image.

In step S2, the dequantization circuit 13 performs dequantization in a method corresponding to the quantization method used on the encoding side, and outputs the transformation coefficient to the inverse orthogonal transformation circuit 14.

In step S3, the inverse orthogonal transformation circuit 14 performs inverse orthogonal transformation on the transformation coefficient supplied from the dequantization circuit 13, and outputs an obtained image to the adder circuit 15.

In step S4, the adder circuit 15 combines the decoded image supplied from the inverse orthogonal transformation circuit 14 and a prediction image supplied from the motion prediction/compensation circuit 21 or from the intra-prediction circuit 22, and outputs a composite image to the deblocking filter 16.

In step S5, the deblocking filter 16 performs filtering to remove block noise included in the composite image, and outputs an image from which the block noise has been removed.

In step S6, the frame memory 19 temporarily stores the image supplied from the deblocking filter 16.

In step S7, the control circuit 31 judges whether the target image is an intra-coded image or not.

If it is judged in step S7 that the target image is an intra-coded image, the intra-prediction circuit 22 performs intra-prediction to generate a prediction image in step S8, and outputs the generated prediction image to the adder circuit 15.

On the other hand, if it is judged in step S7 that the target image is not an intra-coded image, that is, an inter-coded image, a motion prediction/compensation process is performed by the motion prediction/compensation circuit 21 in step S9. The prediction image generated by performing the motion prediction/compensation process is output to the adder circuit 15. The motion prediction/compensation process will be described below with reference to the flowchart in FIG. 12.

In step S10, the control circuit 31 judges whether the foregoing process has been performed on the macroblocks in one entire frame or not. If the control circuit 31 judges that the process has not been performed on the macroblocks in one entire frame, the process is repeated for another macroblock from step S1.

On the other hand, if it is judged in step S10 that the process has been performed on the macroblocks in one entire frame, the rearrangement buffer 17 outputs the generated frame to the D/A converter circuit 18 in accordance with the control performed by the control circuit 31 in step S11.

In step S12, the D/A converter circuit 18 performs D/A conversion on the frame supplied from the rearrangement buffer 17, and outputs an analog signal to the outside. The foregoing process is performed on individual frames.

Next, the motion prediction/compensation process that is performed in step S9 in FIG. 11 will be described with reference to the flowchart in FIG. 12.

In step S31, the prediction mode determination circuit 41 of the motion prediction/compensation circuit 21 judges whether the identification flag supplied from the lossless decoding circuit 12 represents that a process is to be performed in the filtering prediction mode or not.

If it is judged in step S31 that the identification flag represents that a process is to be performed in the filtering prediction mode, the process proceeds to step S32. In step S32, the prediction circuit 44 performs an extraction process of extracting motion compensation images. The details of the extraction process will be described below.

After motion compensation images have been extracted, the filtering circuit 45 performs a filtering prediction process in step S33. The details of the filtering prediction process will be described below.

After the process in step S33 has ended, the motion prediction/compensation process ends, and the process returns to step S9 in FIG. 11 and proceeds to step S10.

Also, if it is judged in step S31 that the identification flag does not represent that a process is to be performed in the filtering prediction mode, unidirectional prediction or bidirectional prediction is performed in step S32 and a prediction image is generated.

That is, if the identification flag represents that a process is to be performed in the unidirectional prediction mode, a motion vector is supplied from the prediction mode determination circuit 41 to the unidirectional prediction circuit 42, and unidirectional prediction is performed in the unidirectional prediction circuit 42. Also, if the identification flag represents that a process is to be performed in the bidirectional prediction mode, a motion vector is supplied from the prediction mode determination circuit 41 to the bidirectional prediction circuit 43, and bidirectional prediction is performed in the bidirectional prediction circuit 43. After the prediction image has been output to the adder circuit 15, the motion prediction/compensation process ends, and the process returns to step S9 in FIG. 11 and proceeds to step S10.

Next, an example of the procedure of the extraction process executed in step S32 in FIG. 12 will be described with reference to the flowchart in FIG. 13.

When the extraction process is started, the prediction circuit 44 sets a variable i to zero in step S51. In step S52, the motion compensation circuit 51 performs motion compensation on the i-th reference frame, that is, a reference plane 0, thereby extracting a motion compensation image MC[0]. In step S53, the motion compensation circuit 51 outputs the motion compensation image MC[0] to the filtering circuit 45.

In step S54, the prediction circuit 44 judges whether or not the value of the variable i is N or less. If it is judged that the value of the variable i is a certain natural number N or less, the process proceeds to step S55.

In step S55, the motion prediction circuit 52 increments the variable i. In step S56, the motion prediction circuit 52 performs motion prediction, such as matching, on a reference plane i using the motion compensation image MC[0], thereby generating a motion compensation image MC[i]. In step S57, the motion prediction circuit 52 outputs the motion compensation image MC[i]. After the process in step S57 has ended, the process returns to step S54, and the subsequent process is executed.

Figure 12:
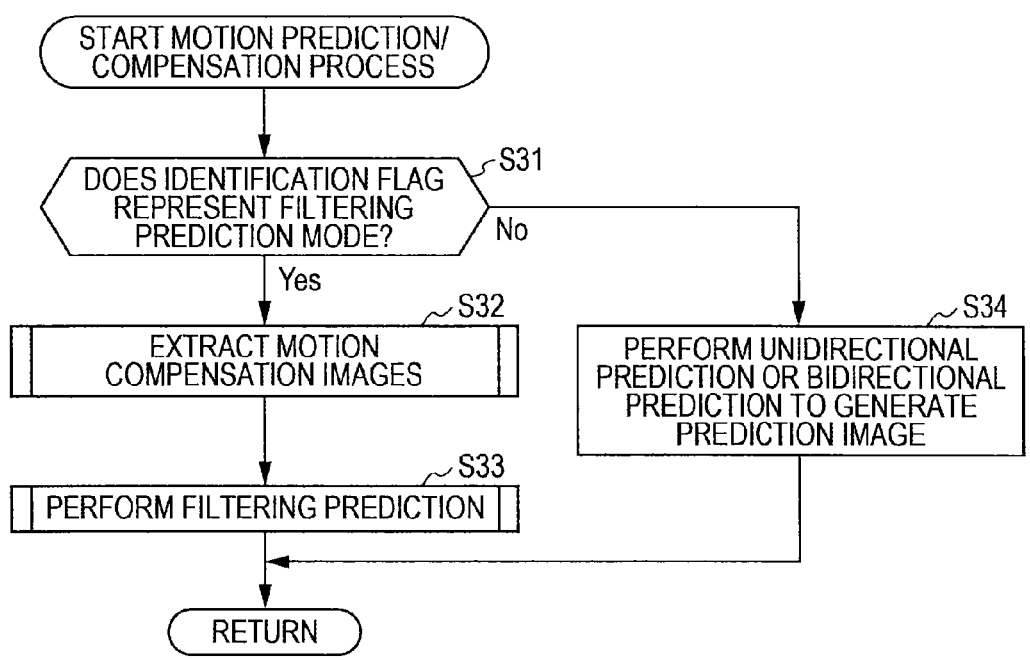
FIG. 12 is a flowchart describing a motion prediction/compensation process performed in step S9 in FIG. 11.
Figure 13:
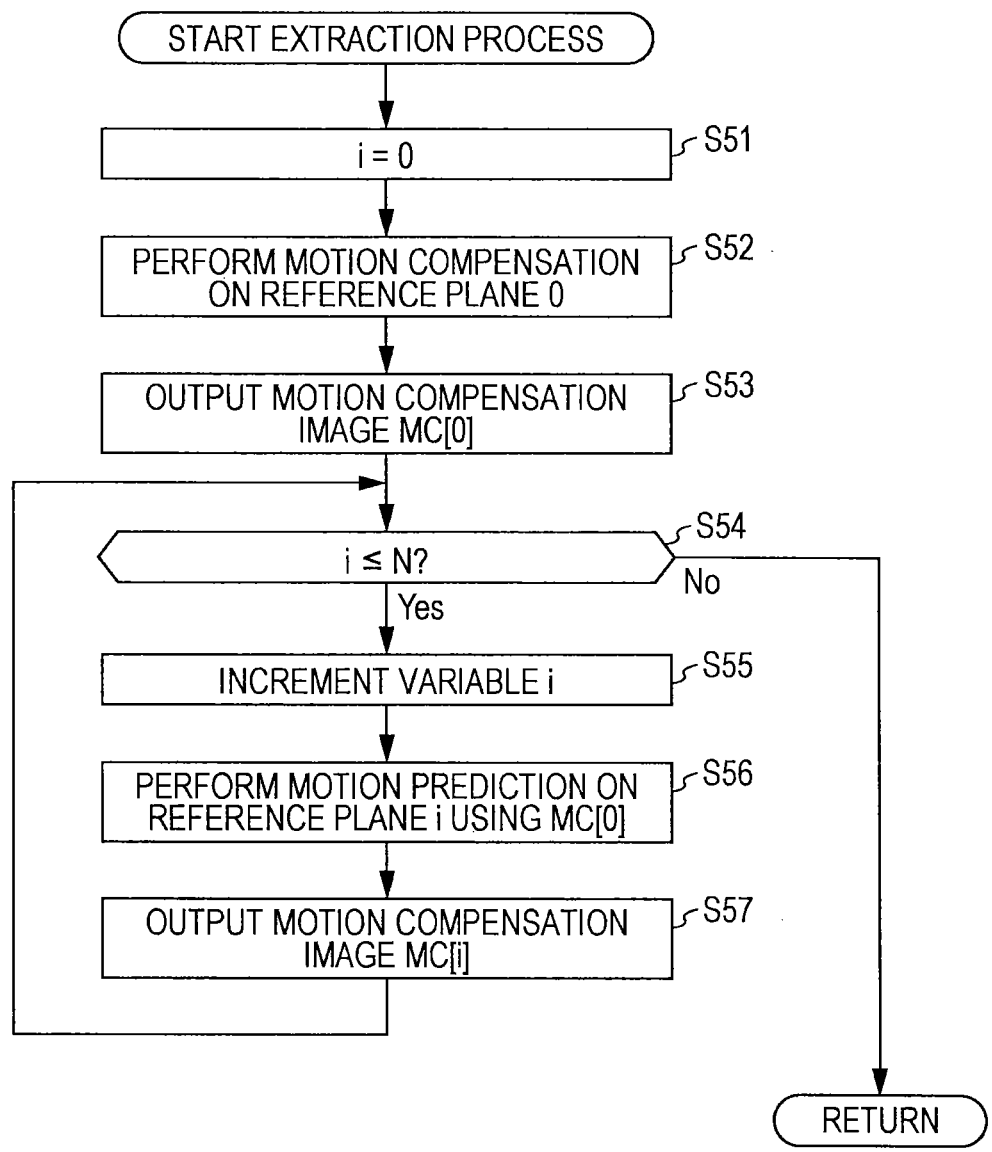
FIG. 13 is a flowchart describing an example of a procedure of an extraction process.

If it is judged in step S54 that the value of the variable i is large than the certain natural number N, the extraction process ends, and the process returns to step S32 in FIG. 12 and proceeds to step S33.

Figure 14:
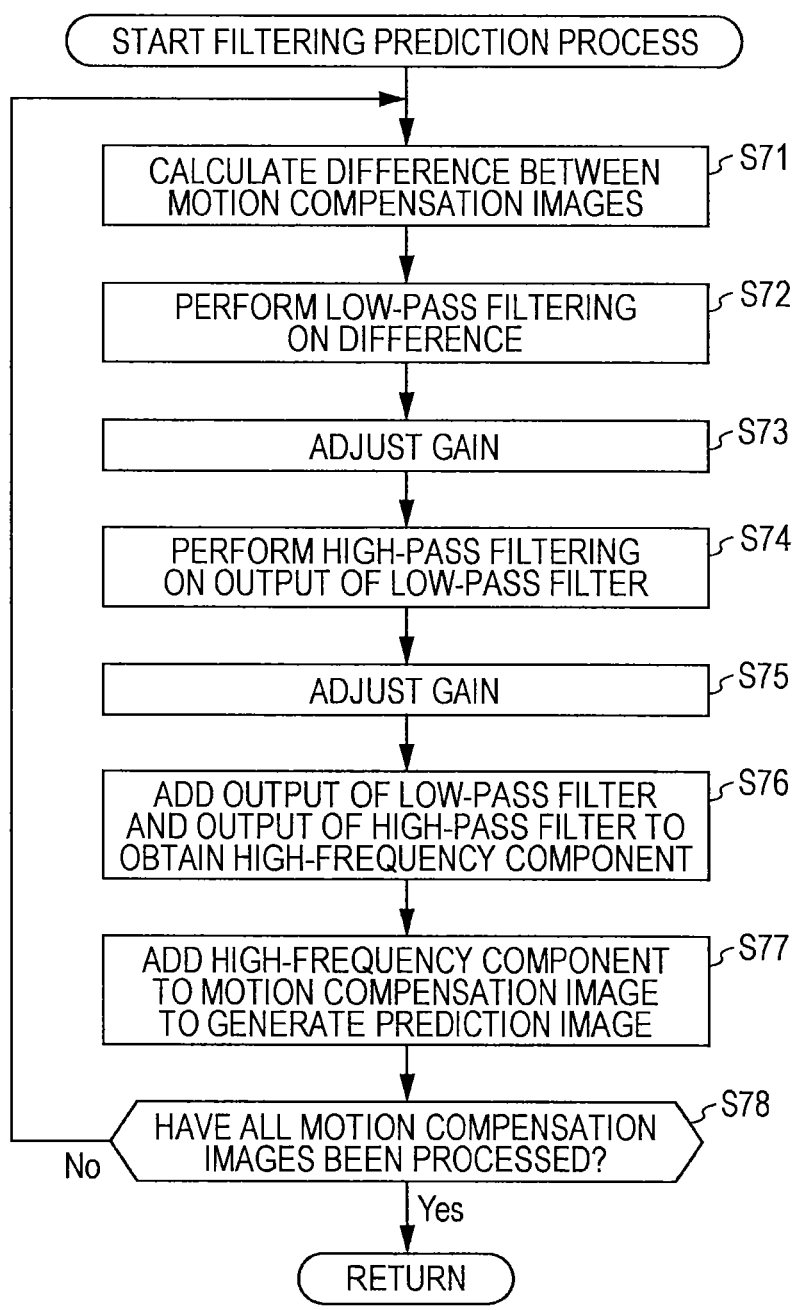
FIG. 14 is a flowchart describing an example of a procedure of a filtering prediction process.

Next, an example of the procedure of the filtering process that is executed in step S33 in FIG. 12 will be described with reference to the flowchart in FIG. 14.

When the filtering process is started after motion compensation images have been extracted, the difference calculation circuit 61 of the filtering circuit 45 calculates the difference between the motion compensation image MC0 and the motion compensation image MC1 and outputs a difference image to the low-pass filter circuit 62 in step S71.

In step S72, the low-pass filter circuit 62 performs low-pass filtering on the difference image supplied from the difference calculation circuit 61, and outputs the image obtained thereby to the gain adjustment circuit 63 and the high-pass filter circuit 64.

In step S73, the gain adjustment circuit 63 adjusts the gain of the image supplied from the low-pass filter circuit 62, and outputs the image in which the gain has been adjusted to the adder circuit 66.

In step S74, the high-pass filter circuit 64 performs high-pass filtering on the difference image supplied from the low-pass filter circuit 62, and outputs the image obtained thereby to the gain adjustment circuit 65.

In step S75, the gain adjustment circuit 65 adjusts the gain of the difference image supplied from the high-pass filter circuit 64, and outputs the image in which the gain has been adjusted to the adder circuit 66.

In step S76, the adder circuit 66 adds the image supplied from the gain adjustment circuit 63 (output of the low-pass filter) and the image supplied from the gain adjustment circuit 65 (output of the high-pass filter), thereby obtaining a high-frequency component of the image. The obtained high-frequency component is supplied from the adder circuit 66 to the adder circuit 67.

In step S77, the adder circuit 67 adds the image supplied from the adder circuit 66 (high-frequency component) to the motion compensation image MC0, and outputs the image obtained thereby, serving as a prediction image, to the adder circuit 15. In step S78, the filtering circuit 45 judges whether or not all the motion compensation images have been processed. If it is judged that there is an unprocessed motion compensation image, the process returns to step S71, and the subsequent process is repeated.

On the other hand, if it is judged in step S78 that all the motion compensation images have been processed, the filtering prediction process ends, the process returns to step S33 in FIG. 12, the motion prediction/compensation process ends, and the process returns to step S9 in FIG. 11 and proceeds to step S10.

In this way, decoding is performed using a prediction image that is generated through filtering prediction, so that a high-resolution decoded image can be obtained. Furthermore, at this time, part of the motion compensation images is obtained using a motion vector, and the remaining motion compensation image is obtained through motion prediction (matching or the like) of the motion compensation image obtained using the motion vector. Accordingly, the number of motion vectors to be encoded can be reduced. That is, the decoding device 1 is capable of generating a highly precise prediction image using a small amount of control information.

2. Second Embodiment

[Configuration of Encoding Device]

Next, the configuration and operation of the device on the encoding side will be described.

Figure 15:
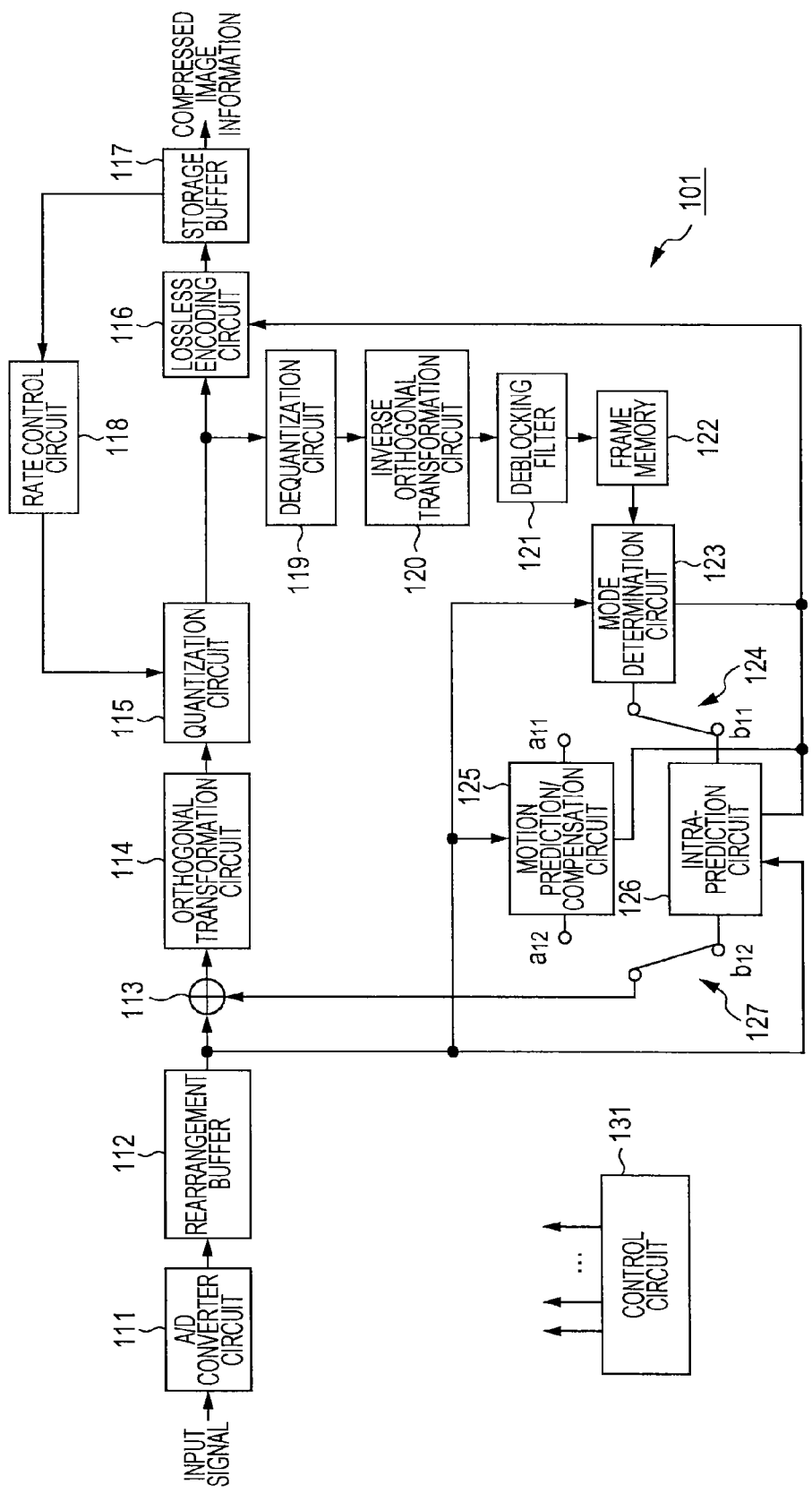
FIG. 15 is a block diagram illustrating an example configuration of an encoding device.

FIG. 15 is a block diagram illustrating an example configuration of an encoding device 101. Compressed image information that is obtained through encoding performed by the encoding device 101 is input to the decoding device 1 in FIG. 4.

An A/D converter circuit 111 performs A/D conversion on an input signal and outputs an image to a rearrangement buffer 112.

The rearrangement buffer 112 performs rearrangement of frames in accordance with the GOP (Group of Pictures) structure of compressed image information, and outputs images in certain units, such as macroblocks. The image output from the rearrangement buffer 112 is supplied to an adder circuit 113, a mode determination circuit 123, a motion prediction/compensation circuit 125, and an intra-prediction circuit 126.

The adder circuit 113 obtains the difference between the image supplied from the rearrangement buffer 112 and a prediction image that is generated by the motion prediction/compensation circuit 125 or the intra-prediction circuit 126 and that is supplied via a switch 127, and outputs the residual to an orthogonal transformation circuit 114. As the prediction image is more similar to an original image and as the residual obtained here is smaller, the amount of code assigned to the residual is smaller, and thus the encoding efficiency is higher.

The orthogonal transformation circuit 114 performs orthogonal transformation, such as discrete cosine transformation or Karhunen Loeve transformation, on the residual supplied from the adder circuit 113, and outputs a transformation coefficient obtained by performing the orthogonal transformation to a quantization circuit 115.

The quantization circuit 115 quantizes the transformation coefficient supplied from the orthogonal transformation circuit 114 in accordance with the control performed by a rate control circuit 118, and outputs the quantized transformation coefficient. The transformation coefficient quantized by the quantization circuit 115 is supplied to a lossless encoding circuit 116 and a dequantization circuit 119.

The lossless encoding circuit 116 compresses the transformation coefficient supplied from the quantization circuit 115 by performing lossless encoding, such as variable-length encoding or arithmetic encoding, and outputs the information to a storage buffer 117.

Also, the lossless encoding circuit 116 sets the value of an identification flag in accordance with the information supplied from the mode determination circuit 123, and describes the identification flag in the header of the image. On the basis of the identification flag described by the lossless encoding circuit 116, a prediction mode is determined in the decoding device 1 as described above.

The lossless encoding circuit 116 also describes the information supplied from the motion prediction/compensation circuit 125 or the intra-prediction circuit 126 in the header of the image. Motion vectors and so fourth detected when inter-prediction is performed are supplied from the motion prediction/compensation circuit 125, and the information about an applied intra-prediction mode is supplied from the intra-prediction circuit 126.

The storage buffer 117 temporarily stores the information supplied from the lossless encoding circuit 116, and outputs it as compressed image information at certain timing. The storage buffer 117 outputs the information about the amount of generated code to a rate control circuit 118.

The rate control circuit 118 calculates a quantization scale on the basis of the amount of code output from the storage buffer 117, and controls the quantization circuit 115 so that quantization is performed with the calculated quantization scale.

The dequantization circuit 119 performs dequantization on the transformation coefficient quantized by the quantization circuit 115, and outputs the transformation coefficient to an inverse orthogonal transformation circuit 120.

The inverse orthogonal transformation circuit 120 performs inverse orthogonal transformation on the transformation coefficient supplied from the dequantization circuit 119, and outputs an obtained image to a deblocking filter 121.

The deblocking filter 121 removes block noise that appears in the locally decoded image, and outputs the image from which block noise has been removed to a frame memory 122.

The frame memory 122 stores the image supplied from the deblocking filter 121. The image stored in the frame memory 122 is read by the mode determination circuit 123 as necessary.

The mode determination circuit 123 determines whether intra-coding is to be performed or inter-coding is to be performed on the basis of the image stored in the frame memory 122 and the original image supplied from the rearrangement buffer 112. Also, if the mode determination circuit 123 determines to perform inter-coding, the mode determination circuit 123 determines any mode among the unidirectional prediction mode, the bidirectional prediction mode, and the filtering prediction mode. The mode determination circuit 123 outputs the information representing a determination result as mode information to the lossless encoding circuit 116.

If the mode determination circuit 123 determines to perform inter-coding, the mode determination circuit 123 outputs a frame that is stored in the frame memory 122 and that is obtained through local decoding to the motion prediction/compensation circuit 125 via a switch 124.

Also, if the mode determination circuit 123 determines to perform intra-coding, the mode determination circuit 123 outputs a frame that is stored in the frame memory 122 and that is obtained through local decoding to the intra-prediction circuit 126.

The switch 124 connects to a terminal a11 when inter-coding is performed, and connects to a terminal b11 when intra-coding is performed. The switching of the switch 124 is controlled by a control circuit 131, for example.

The motion prediction/compensation circuit 125 detects motion vectors on the basis of an original image supplied from the rearrangement buffer 112 and reference frames read from the frame memory 122, and outputs the detected motion vectors to the lossless encoding circuit 116. Also, the motion prediction/compensation circuit 125 performs motion compensation using the detected motion vectors and the reference frames to generate a prediction image, and outputs the generated prediction image to the adder circuit 113 via the switch 127.

The intra-prediction circuit 126 performs intra-prediction on the basis of an original image supplied from the rearrangement buffer 112 and reference frames that are locally decoded and that are stored in the frame memory 122, so as to generate a prediction image. The intra-prediction circuit 126 outputs the generated prediction image to the adder circuit 113 via the switch 127, and outputs intra-prediction mode information to the lossless encoding circuit 116.

The switch 127 connects to a terminal a12 or a terminal b12, and outputs a prediction image generated by the motion prediction/compensation circuit 125 or the intra-prediction circuit 126 to the adder circuit 113.

The control circuit 131 switches the connection of the switches 124 and 127 in accordance with the mode determined by the mode determination circuit 123 and controls the entire operation of the encoding device 101.

Figure 16:
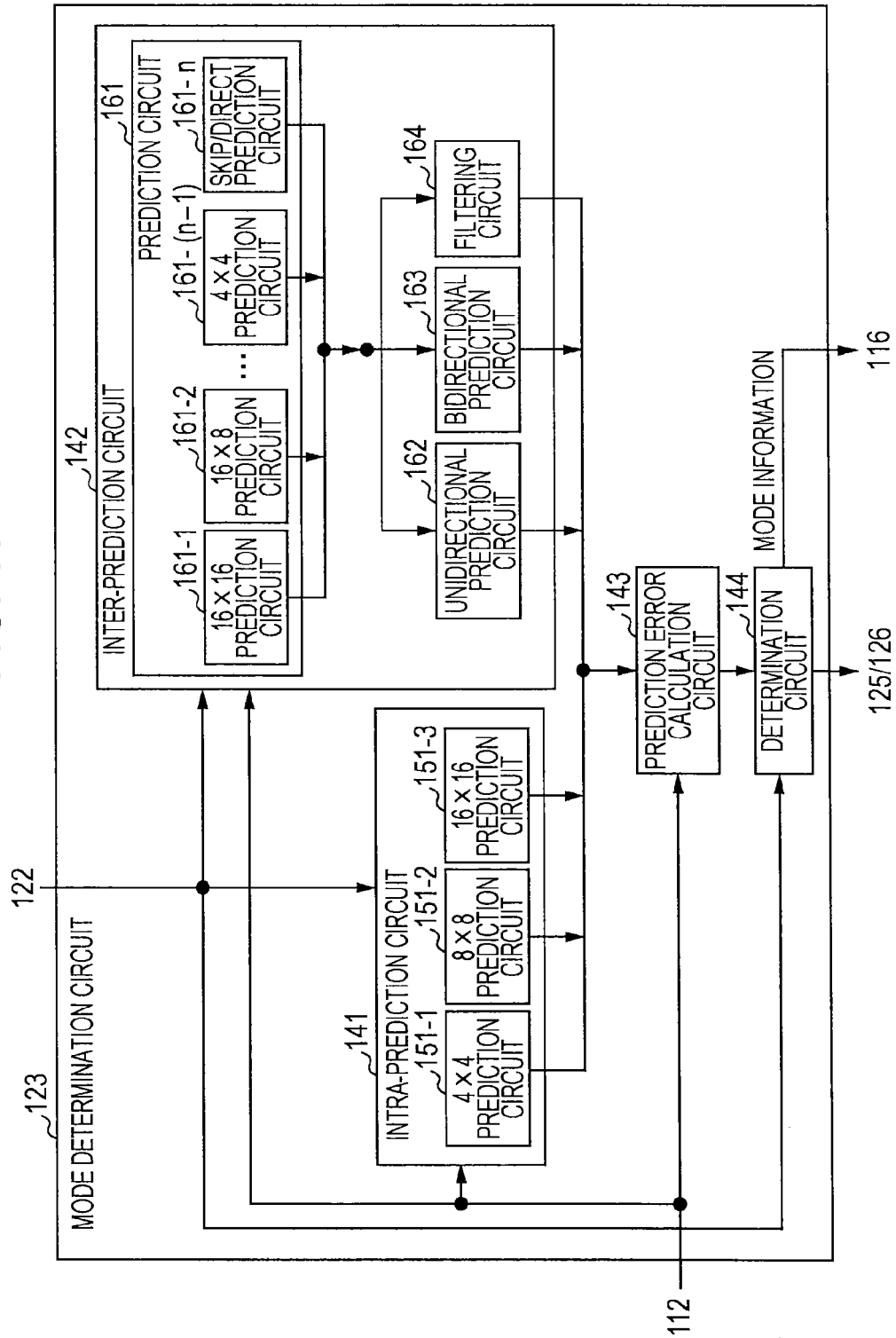
FIG. 16 is a block diagram illustrating an example configuration of the mode determination circuit in FIG. 15.

FIG. 16 is a block diagram illustrating an example configuration of the mode determination circuit 123 in FIG. 15.

As illustrated in FIG. 16, the mode determination circuit 123 is constituted by an intra-prediction circuit 141, an inter-prediction circuit 142, a prediction error calculation circuit 143, and a determination circuit 144. In the mode determination circuit 123, intra-prediction and inter-prediction are performed on blocks having sizes different from each other, and the prediction mode to be used for prediction is determined on the basis of the result. As for inter-prediction, a process is performed in the individual prediction modes of unidirectional prediction mode, bidirectional prediction mode, and filtering prediction mode. The original image supplied from the rearrangement buffer 112 is input to the intra-prediction circuit 141, the inter-prediction circuit 142, and the prediction error calculation circuit 143.

The intra-prediction circuit 141 performs intra-prediction in units of blocks of sizes different from each other on the basis of the original image and an image read from the frame memory 122, and outputs a generated prediction image to the prediction error calculation circuit 143. In a 4×4 prediction circuit 151-1, intra-prediction is performed in units of blocks of 4×4 pixels. In an 8×8 prediction circuit 151-2, intra-prediction is performed in units of blocks of 8×8 pixels. In a 16×16 prediction circuit 151-3, intra-prediction is performed in units of blocks of 16×16 pixels.

A prediction circuit 161 of the inter-prediction circuit 142 detects motion vectors in units of blocks of sizes different from each other on the basis of the original image and reference frames read from the frame memory 122. Also, the prediction circuit 161 performs motion compensation on the basis of the detected motion vectors, and outputs motion compensation images used for generating a prediction image. In a 16×16 prediction circuit 161-1, a process is performed on images in units of blocks of 16×16 pixels. In a 16×8 prediction circuit 161-2, a process is performed on images in units of blocks of 16×8 pixels. Also, in a 4×4 prediction circuit 161-($n$−1), a process is performed on images in units of blocks of 4×4 pixels. In a skip/direct prediction circuit 161-$n$, motion vectors are detected in a skip prediction mode or direct prediction mode, and motion compensation is performed using the detected motion vectors.

Motion compensation images extracted from a plurality of reference frames arranged in one direction with respect to the current frame are supplied from the respective circuits of the prediction circuit 161 to a unidirectional prediction circuit 162. Also, motion compensation images extracted from a plurality of reference frames arranged in two directions with respect to the current frame are supplied from the respective circuits of the prediction circuit 161 to a bidirectional prediction circuit 163.

In a case where filtering prediction is performed using motion compensation images extracted from a plurality of reference frames arranged in one direction, as described above, the motion compensation images extracted from the reference frames arranged in one direction are supplied from the respective circuits of the prediction circuit 161 to a filtering circuit 164. In a case where filtering prediction is performed using motion compensation images extracted from a plurality of reference frames arranged in two directions, the motion compensation images extracted from the reference frames arranged in two directions are supplied from the respective circuits of the prediction circuit 161 to the filtering circuit 164.

The unidirectional prediction circuit 162 performs unidirectional prediction using the motion compensation images of sizes different from each other supplied from the respective circuits of the prediction circuit 161, thereby generating a prediction image, and outputs the generated prediction image to the prediction error calculation circuit 143. For example, the unidirectional prediction circuit 162 generates a prediction image by regarding the pixel values of any of a plurality of motion compensation images of 16×16 pixels supplied from the prediction circuit 161-1 as the pixel values of the prediction image.

The bidirectional prediction circuit 163 performs bidirectional prediction using the motion compensation images of sizes different from each other supplied from the respective circuits of the prediction circuit 161, thereby generating a prediction image, and outputs the generated prediction image to the prediction error calculation circuit 143. For example, the bidirectional prediction circuit 163 generates a prediction image by regarding the average values of the pixel values of a plurality of motion compensation images of 16×16 pixels supplied from the prediction circuit 161-1 as the pixel values of the prediction image.

The filtering circuit 164 performs filtering prediction using the motion compensation images of sizes different from each other supplied from the respective circuits of the prediction circuit 161, thereby generating a prediction image, and outputs the generated prediction image to the prediction error calculation circuit 143. The filtering circuit 164 corresponds to the filtering circuit 45 of the decoding device 1 and has the same configuration as the configuration illustrated in FIG. 10.

For example, in the case of generating a prediction image using the motion compensation images MC0 and MC1 of 16×16 pixels supplied from the prediction circuit 161-1, the filtering circuit 164 obtains the difference between the motion compensation images MC0 and MC1, and performs low-pass filtering on the obtained difference image. Also, the filtering circuit 164 performs high-pass filtering on the output of the low-pass filtering, and adds the image of the output thereof in which the gain has been adjusted and the image of the output of the low-pass filtering in which the gain has been adjusted. The filtering circuit 164 adds the image as an addition result representing a high-frequency component to the motion compensation image MC0, thereby generating a prediction image, and outputs the generated prediction image to the prediction error calculation circuit 143.

The prediction error calculation circuit 143 obtains the differences between the original image and the respective prediction images supplied from the respective circuits of the intra-prediction circuit 141, and outputs a residual signal representing the obtained differences to the determination circuit 144. Also, the prediction error calculation circuit 143 obtains the differences between the original image and the respective prediction images supplied from the unidirectional prediction circuit 162, the bidirectional prediction circuit 163, and the filtering circuit 164 of the inter-prediction circuit 142, and outputs a residual signal representing the obtained differences to the determination circuit 144.

The determination circuit 144 measures the strength of the residual signals supplied from the prediction error calculation circuit 143, and determines the prediction method used for generating a prediction image having a small difference from the original image to be the prediction method for generating a prediction image to be used for encoding. The determination circuit 144 outputs the information representing the determination result, which is mode information, to the lossless encoding circuit 116. The mode information includes information representing the block size to be used as the unit of a process, etc.

Also, if the determination circuit 144 determines to generate a prediction image using inter-prediction (determines to perform inter-coding), the determination circuit 144 outputs reference frames read from the frame memory 122 to the motion prediction/compensation circuit 125 together with the mode information. If the determination circuit 144 determines to generate a prediction image using intra-prediction (determines to perform intra-coding), the determination circuit 144 outputs an image that is read from the frame memory 122 and that is to be used for intra-prediction to the intra-prediction circuit 126 together with the mode information.

Figure 17:
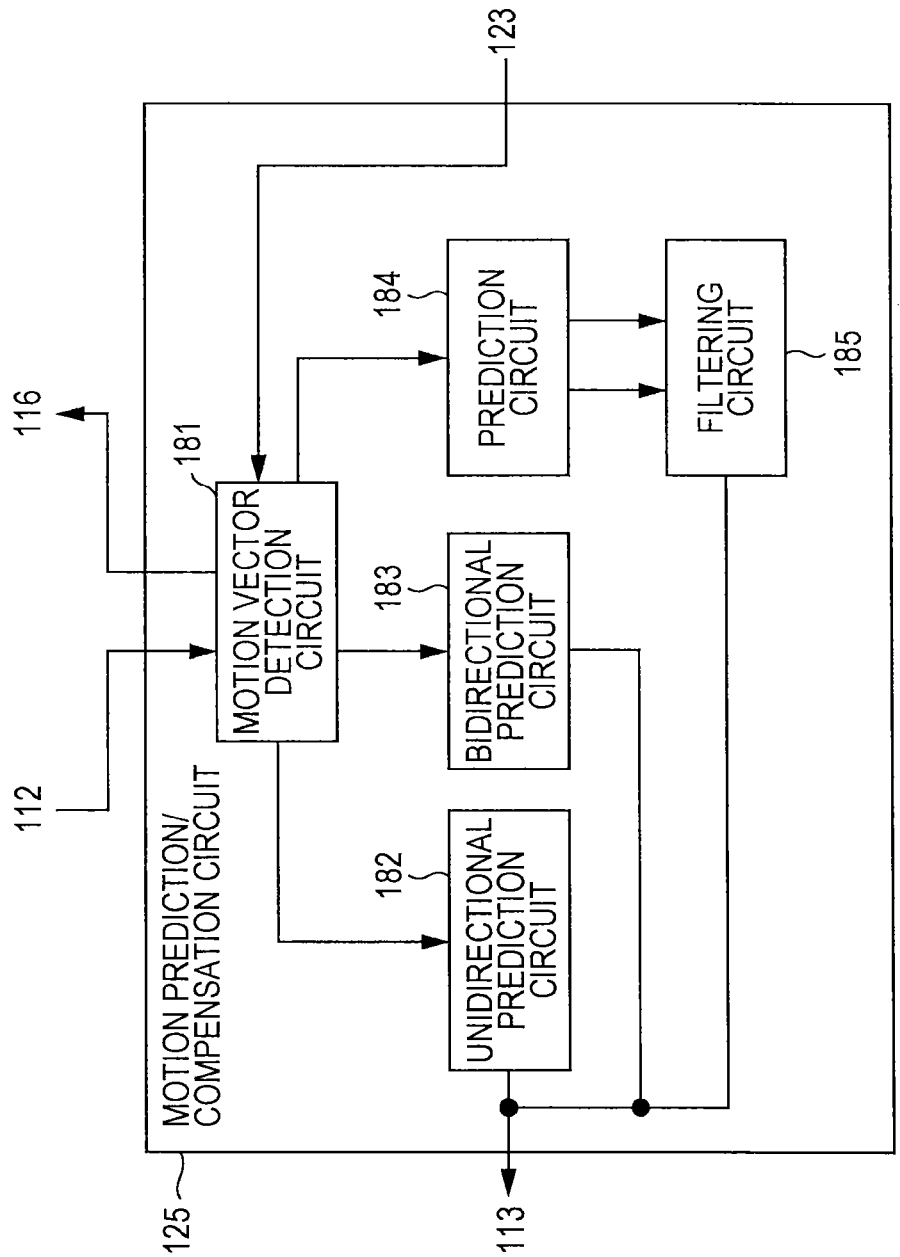
FIG. 17 is a block diagram illustrating an example configuration of the motion prediction/compensation circuit in FIG. 15.

FIG. 17 is a block diagram illustrating an example configuration of the motion prediction/compensation circuit 125 in FIG. 15.

As illustrated in FIG. 17, the motion prediction/compensation circuit 125 is constituted by a motion vector detection circuit 181, a unidirectional prediction circuit 182, a bidirectional prediction circuit 183, a prediction circuit 184, and a filtering circuit 185. The motion prediction/compensation circuit 125 has a configuration similar to that of the motion prediction/compensation circuit 21 illustrated in FIG. 8 except that the motion vector detection circuit 181 is provided instead of the prediction mode determination circuit 41.

The motion vector detection circuit 181 detects motion vectors by performing block matching or the like on the basis of an original image supplied from the rearrangement buffer 112 and reference frames supplied from the mode determination circuit 123. The motion vector detection circuit 181 refers to the mode information supplied from the mode determination circuit 123, and outputs the motion vectors together with the reference frames to any of the unidirectional prediction circuit 182, the bidirectional prediction circuit 183, and the prediction circuit 184.

The motion vector detection circuit 181 outputs the motion vectors together with the reference frames to the unidirectional prediction circuit 182 if unidirectional prediction is selected, and outputs those pieces of information to the bidirectional prediction circuit 183 if bidirectional prediction is selected to be performed. The motion vector detection circuit 181 outputs the motion vectors together with the reference frames to the prediction circuit 184 if filtering prediction is selected to be performed.

Like the unidirectional prediction circuit 42 in FIG. 8, the unidirectional prediction circuit 182 generates a prediction image by performing unidirectional prediction. The unidirectional prediction circuit 182 outputs the generated prediction image to the adder circuit 113.

Like the bidirectional prediction circuit 43 in FIG. 8, the bidirectional prediction circuit 183 generates a prediction image by performing bidirectional prediction. The bidirectional prediction circuit 183 outputs the generated prediction image to the adder circuit 113.

Like the prediction circuit 44 in FIG. 8, the prediction circuit 184 extracts motion compensation images from a plurality of (e.g., two) reference frames, and outputs the extracted plurality of motion compensation images to the filtering circuit 185.

Like the filtering circuit 45 in FIG. 8, the filtering circuit 185 generates a prediction image by performing filtering prediction. The filtering circuit 185 outputs the generated prediction image to the adder circuit 113. Note that the filtering circuit 185 has a configuration similar to the configuration of the filtering circuit 45 illustrated in FIG. 12. Hereinafter, a description will be given by appropriately citing the configuration of the filtering circuit 45 illustrated in FIG. 12 as the configuration of the filtering circuit 185.

The prediction image generated through filtering prediction includes a large amount of high-frequency component compared to the prediction image generated through unidirectional prediction or bidirectional prediction, and is an image having a small difference from an original image. Thus, the amount of code assigned to a residual is small, and thus it is possible to increase the encoding efficiency.

Also, filtering prediction can be performed if the number of reference frames is at least two, and thus such an increase in encoding efficiency can be realized without complicating a process. For example, a residual from an original image can be decreased and the encoding efficiency can be increased by generating a highly precise prediction image with a large number of reference frames used in inter-prediction and by using it. In this case, however, the process is complicated because the number of reference frames is large.

Note that, when a prediction method is to be selected, a weight may be added to the strength of a residual signal in accordance with the amount of code in view of the amount of code of information, such as motion vectors required for prediction and an encoding mode, so that an optimum prediction method is selected. Accordingly, the encoding efficiency can be further improved. Also, in order to simplify an encoding process, a prediction method may be adaptively selected using a feature quantity in time and space directions of an input original image.

[Description of Procedure of Encoding Process]

Next, a process performed by the encoding device 101 having the foregoing configuration will be described.

An encoding process performed by the encoding device 101 will be described with reference to the flowchart in FIG. 18. This process is started when an image in a certain unit, such as a macroblock, is output from the rearrangement buffer 112.

In step S101, the adder circuit 113 obtains the difference between an image supplied from the rearrangement buffer 112 and a prediction image generated by the motion prediction/compensation circuit 125 or the intra-prediction circuit 126, and outputs the residual to the orthogonal transformation circuit 114.

In step S102, the orthogonal transformation circuit 114 performs orthogonal transformation on the residual supplied from the adder circuit 113, and outputs a transformation coefficient to the quantization circuit 115.

In step S103, the quantization circuit 115 quantizes the transformation coefficient supplied from the orthogonal transformation circuit 114, and outputs the quantized transformation coefficient.

In step S104, the dequantization circuit 119 performs dequantization on the transformation coefficient quantized by the quantization circuit 115, and outputs the transformation coefficient to the inverse orthogonal transformation circuit 120.

In step S105, the inverse orthogonal transformation circuit 120 performs inverse orthogonal transformation on the transformation coefficient supplied from the dequantization circuit 119, and outputs an obtained image to the deblocking filter 121.

In step S106, the deblocking filter 121 performs filtering to remove block noise, and outputs the image from which block noise has been removed to the frame memory 122.

In step S107, the frame memory 122 stores the image supplied from the deblocking filter 121.

In step S108, a mode determination process is performed by the mode determination circuit 123. The prediction mode to be used for generating a prediction image is determined through the mode determination process. The mode determination process will be described below.

In step S109, the control circuit 131 judges whether intra-prediction is to be performed or not on the basis of the determination made by the mode determination circuit 123.

If it is judged in step S109 that intra-prediction is to be performed, the intra-prediction circuit 126 performs intra-prediction in step S110, and outputs a prediction image to the adder circuit 113.

On the other hand, if it is judged in step S109 that intra-prediction is not to be performed, that is, inter-prediction is to be performed, a motion prediction/compensation process is performed by the motion prediction/compensation circuit 125 in step S111, and a prediction image is output to the adder circuit 113. The motion prediction/compensation process will be described below.

In step S112, the lossless encoding circuit 116 compresses the transformation coefficient supplied from the quantization circuit 115, and outputs it to the storage buffer 117. Also, the lossless encoding circuit 116 describes an identification flag in the header of the image in accordance with the information supplied from the mode determination circuit 123, and describes a motion vector supplied from the motion prediction/compensation circuit 125 in the header of the image.

In step S113, the storage buffer 117 temporarily stores the information supplied from the lossless encoding circuit 116.

In step S114, the control circuit 131 judges whether the foregoing process has been performed on the macroblocks in one entire frame or not. If it is judged that the process has not been performed on the macroblocks in one entire frame, the process is repeated for another macroblock from step S111.

On the other hand, if it is judged in step S114 that the process has been performed on the macroblocks in one entire frame, the storage buffer 117 outputs compressed image information in accordance with the control performed by the control circuit 131 in step S115. The foregoing process is performed on individual frames.

Next, the mode determination process that is performed in step S108 in FIG. 18 will be described with reference to the flowchart in FIG. 19.

In step S131, the intra-prediction circuit 141 and the inter-prediction circuit 142 perform intra-prediction and inter-prediction, respectively, on blocks having sizes different from each other, thereby generating prediction images. The generated prediction images are supplied to the prediction error calculation circuit 143.

In step S132, the prediction error calculation circuit 143 obtains the differences between the original image and the respective prediction images supplied from the respective circuits of the intra-prediction circuit 141 and from the uni-directional prediction circuit 162, the bidirectional prediction circuit 163, and the filtering circuit 164 of the inter-prediction circuit 142. The prediction error calculation circuit 143 outputs a residual signal to the determination circuit 144.

In step S133, the determination circuit 144 determines the prediction method for generating a prediction image that is to be supplied to the adder circuit 113 on the basis of the strength of the residual signal supplied from the prediction error calculation circuit 143.

In step S134, the determination circuit 144 outputs mode information, which is information about the determined prediction method, to the lossless encoding circuit 116. After that, the process returns to step S108 in FIG. 18, and the subsequent process is performed.

Next, the motion prediction/compensation process that is performed in step S111 in FIG. 18 will be described with reference to the flowchart in FIG. 20.

In step S151, the motion vector detection circuit 181 detects motion vectors on the basis of an original image and reference frames.

In step S152, the motion vector detection circuit 181 judges whether the mode determination circuit 123 has determined that the process is to be performed in the filtering prediction mode or not.

If it is judged that performing the process in the filtering prediction mode has been determined, the process proceeds to step S153. The respective processes in step S153 and step S154 are executed in a manner similar to the case of step S32 and step S33 in FIG. 12. That is, in step S153, an extraction process is executed in the manner described above with reference to the flowchart in FIG. 13. In step S154, a filtering prediction process is executed in the manner described above with reference to the flowchart in FIG. 14.

Figure 18:
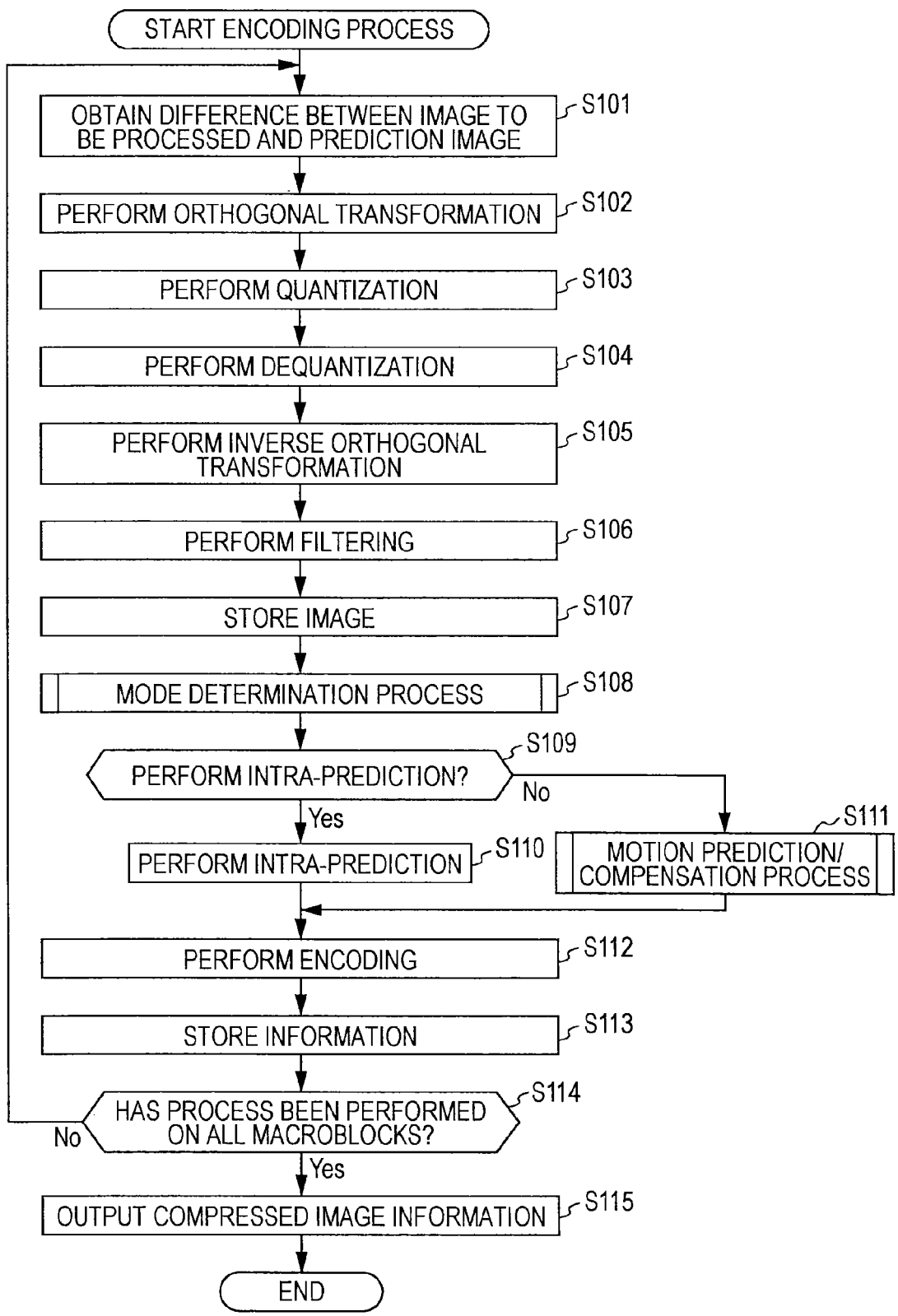
FIG. 18 is a flowchart describing an encoding process performed by the encoding device.
Figure 19:
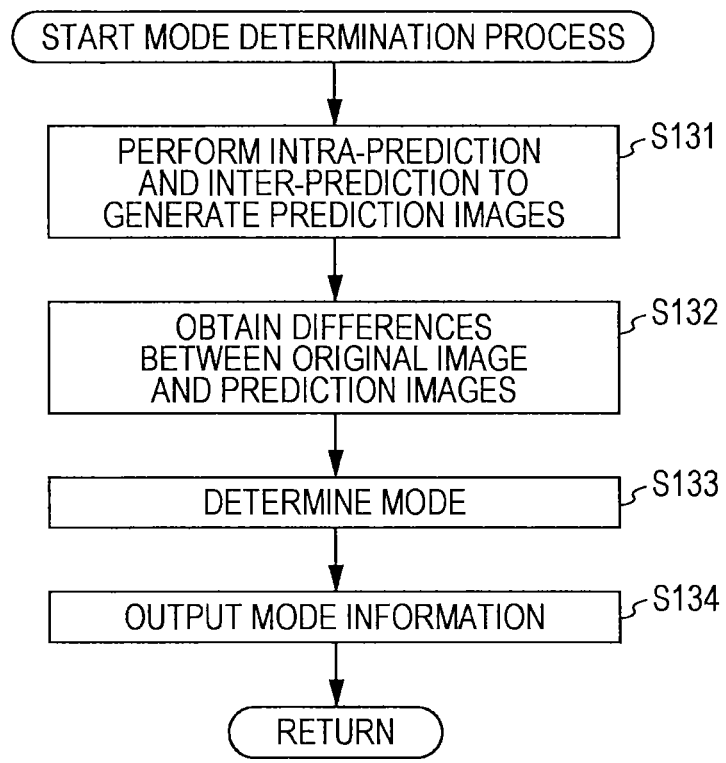
FIG. 19 is a flowchart describing a mode determination process performed in step S108 in FIG. 18.

After the process in step S154 has ended, the motion prediction/compensation process ends, and the process returns to step S111 in FIG. 18 and proceeds to step S112.

Figure 20:
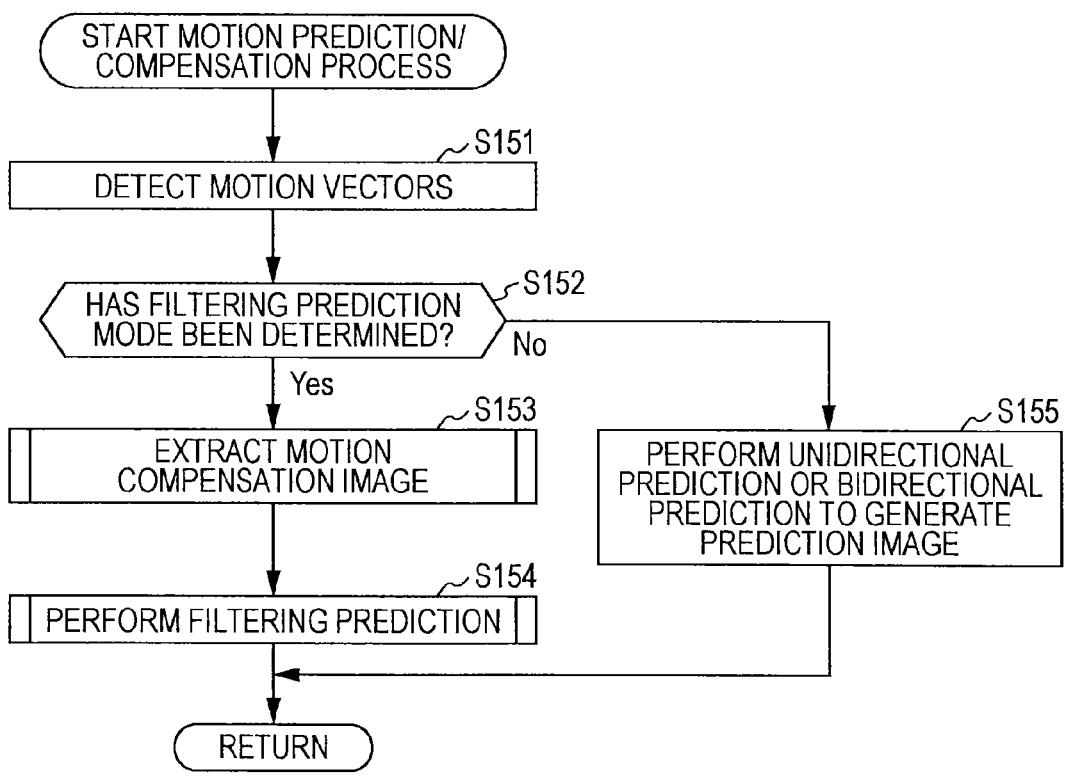
FIG. 20 is a flowchart describing a motion prediction/compensation process performed in step S111 in FIG. 18.

Also, if it is judged in step S152 in FIG. 20 that performing a process in the filtering prediction mode has not been determined, the process proceeds to step S155. In step S155, the unidirectional prediction circuit 182 or the bidirectional prediction circuit 183 performs unidirectional prediction or bidirectional prediction, thereby generating a prediction image.

That is, if performing the process in the unidirectional prediction mode has been determined, motion vectors are supplied from the motion vector detection circuit 181 to the unidirectional prediction circuit 182, and unidirectional prediction is performed in the unidirectional prediction circuit 182. Also, if performing the process in the bidirectional prediction mode has been determined, motion vectors are supplied from the motion vector detection circuit 181 to the bidirectional prediction circuit 183, and bidirectional prediction is performed in the bidirectional prediction circuit 183. After the prediction image has been output to the adder circuit 113 and the process in step S155 in FIG. 20 has ended, the motion prediction/compensation process ends, and the process returns to step S111 in FIG. 18 and proceeds to step S112.

As described above, by performing encoding using a prediction image generated through filtering prediction, the encoding efficiency can be increased.

3. Third Embodiment

[Modification of Filtering Circuit]

In the description given above, the filtering circuits 45 and 185 have the configuration illustrated in FIG. 10, but this configuration can be changed as necessary.

Figure 21:
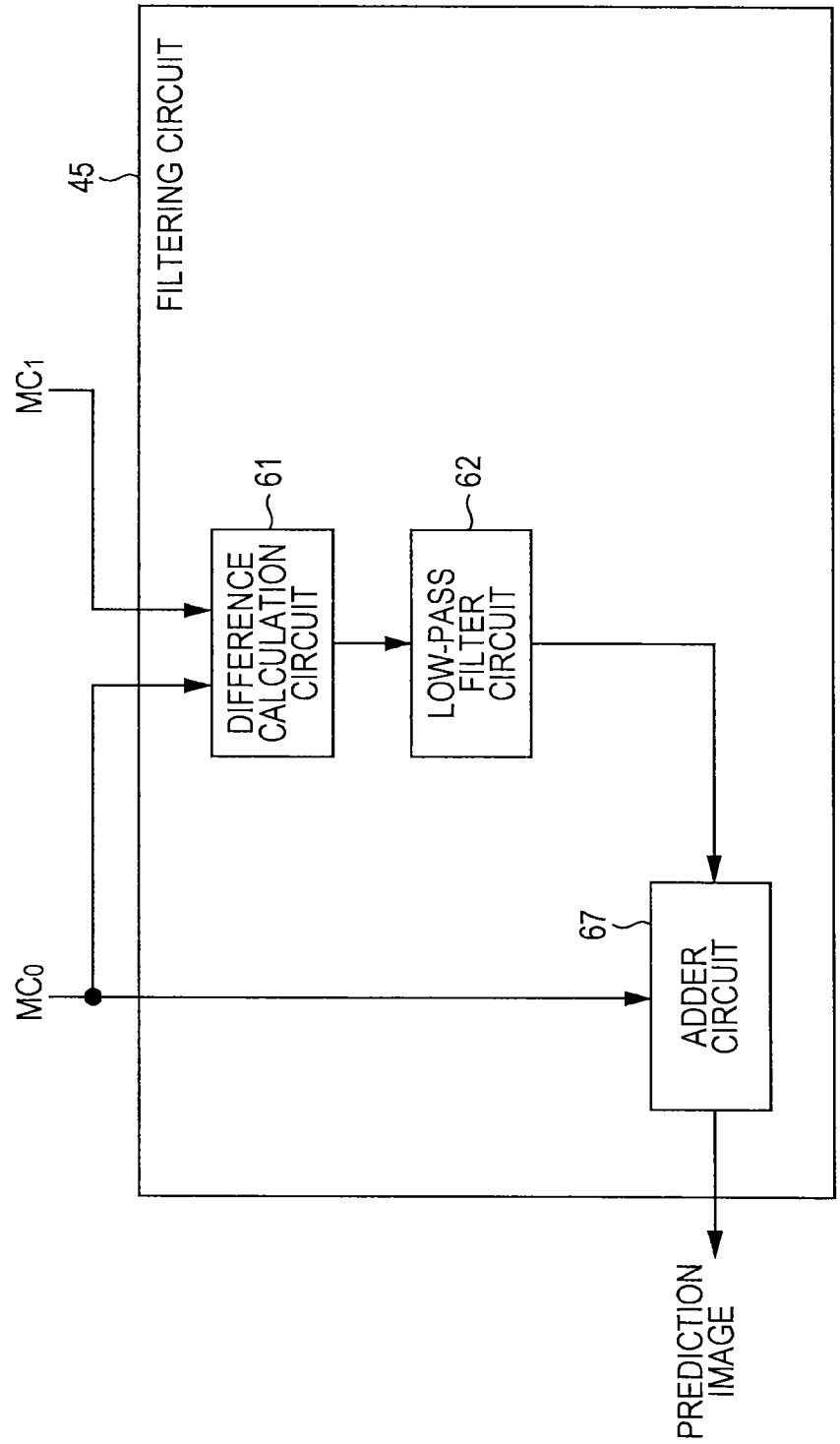
FIG. 21 is a block diagram illustrating another example configuration of the filtering circuit.

FIG. 21 is a block diagram illustrating another example configuration of the filtering circuit 45. The configurations corresponding to the configurations illustrated in FIG. 10 are denoted by the same reference numerals. A redundant description will be appropriately omitted.

The difference calculation circuit 61 in FIG. 21 calculates the difference between the motion compensation image MC0 and the motion compensation image MC1, and outputs a difference image to the low-pass filter circuit 62.

The low-pass filter circuit 62 performs low-pass filtering on the difference image supplied from the difference calculation circuit 61, and outputs an obtained image to the adder circuit 67.

The adder circuit 67 adds the image supplied from the low-pass filter circuit 62 to the motion compensation image MC0, and outputs an obtained image as a prediction image.

By using the configuration illustrated in FIG. 21, the amount of process can be decreased compared to the case of using the configuration in FIG. 10, and a high-speed operation can be realized.

Figure 22:
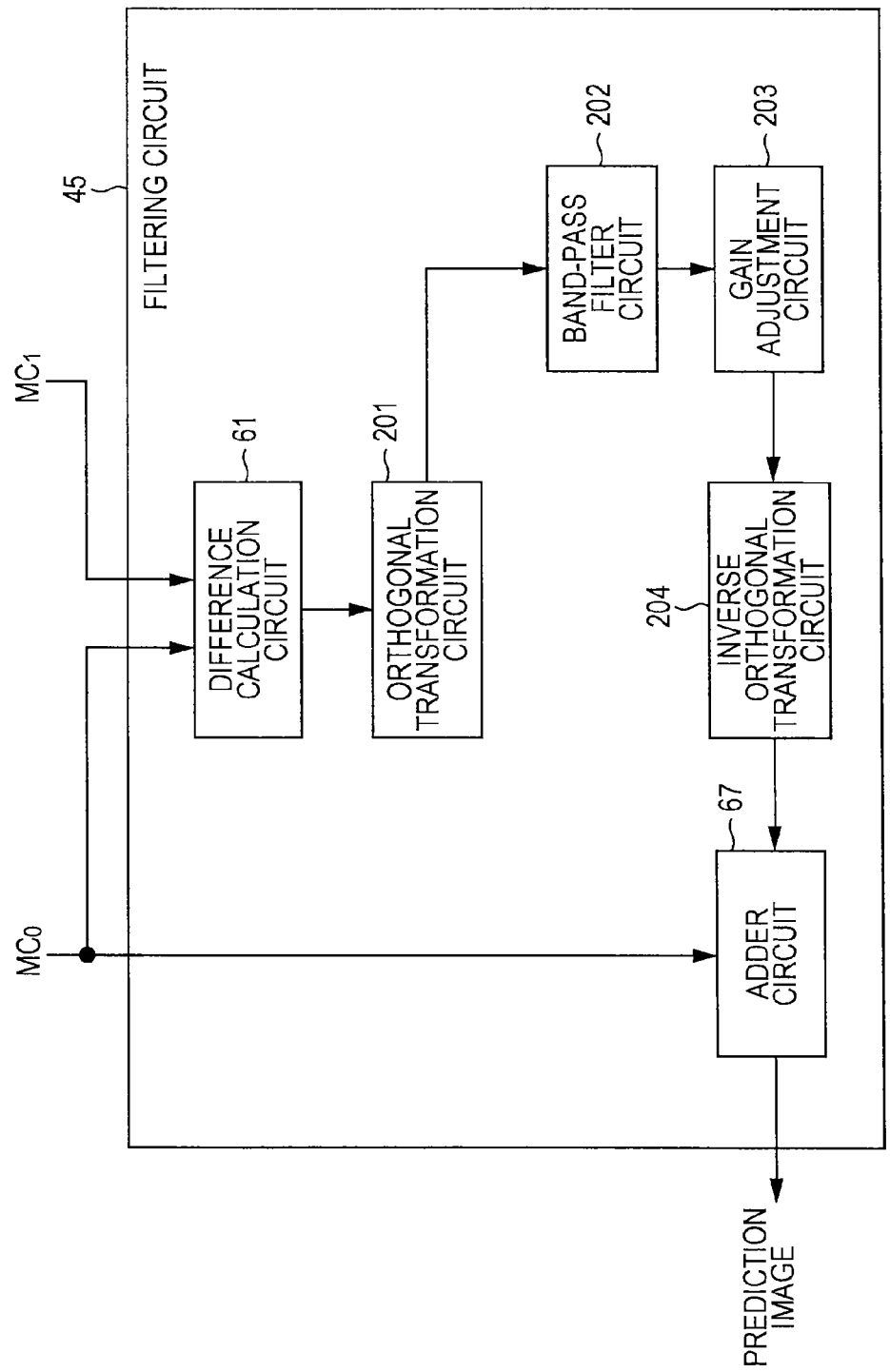
FIG. 22 is a block diagram illustrating a still another example configuration of the filtering circuit.

FIG. 22 is a block diagram illustrating still another example configuration of the filtering circuit 45. The configurations corresponding to the configurations illustrated in FIG. 10 are denoted by the same reference numerals. A redundant description will be appropriately omitted.

In the filtering circuit 45 in FIG. 22, filtering is performed on a signal in a frequency domain, not on a signal in a time domain. Both the filtering circuits 45 illustrated in FIG. 10 and FIG. 21 perform filtering on a signal in a time domain.

The difference calculation circuit 61 in FIG. 22 calculates the difference between the motion compensation image MC0 and the motion compensation image MC1, and outputs a difference image to an orthogonal transformation circuit 201.

The orthogonal transformation circuit 201 performs orthogonal transformation represented by DCT (Discrete Cosine Transform), Hadamard transformation, and KLT (Karhunen Loeve Transformation) on the difference image, and outputs a signal after orthogonal transformation to a band-pass filter circuit 202. The orthogonal transformation is performed, and filtering is performed on a signal in a frequency domain, whereby a highly precise filtering process can be performed more flexibly compared to the case of performing filtering on a signal in a time domain.

When DCT is used as orthogonal transformation, an output DF after orthogonal transformation is expressed by the following equation (12). In equation (12), DCT(X) represents that a two-dimensional DCT process is performed on signal X.

[Math. 12]

$$DF = DCT(D) \tag{12}$$

The band-pass filter circuit 202 performs filtering on the output of the orthogonal transformation circuit 201, and outputs a signal in a certain band.

A gain adjustment circuit 203 adjusts the gain of the output of the band-pass filter circuit 202 by multiplying it by a, and also adjusts a frequency component. An output XF of the gain adjustment circuit 203 is expressed by the following equation (13). In equation (13), BPF(X) represents that a band-pass filter process is performed on signal X.

[Math. 13]

$$XF = \alpha \cdot BPF(DF) \tag{13}$$

An inverse orthogonal transformation circuit 204 performs inverse orthogonal transformation in a method corresponding to the orthogonal transformation performed by the orthogonal transformation circuit 201, so as to transform the signal in a frequency domain supplied from the gain adjustment circuit 203 into a signal in a time domain. For example, when DCT is used as orthogonal transformation in the orthogonal transformation circuit 201, IDCT is performed in the inverse orthogonal transformation circuit 204. An output X of the inverse orthogonal transformation circuit 204 is expressed by the following equation (14). In equation (14), IDCT(X) represents that a two-dimensional IDCT process is performed on signal X.

[Math. 14]

$$X = IDCT(XF) \quad (14)$$

The adder circuit 57 adds the signal X supplied from the inverse orthogonal transformation circuit 204 to the motion compensation image MC0 in a time domain, and outputs an obtained image as a prediction image. The prediction image S(i, j), which is the final output of the adder circuit 57, is expressed by the following equation (15).

[Math. 15]

$$S(i,j) = MC_0(i,j) + X(i,j) \quad (15)$$

In this way, a highly precise prediction image can be generated also by performing filtering on a signal in a frequency domain.

Also, in the description given above, filtering prediction is performed using two reference frames, but two or more frames may be used as reference frames.

Figure 23:
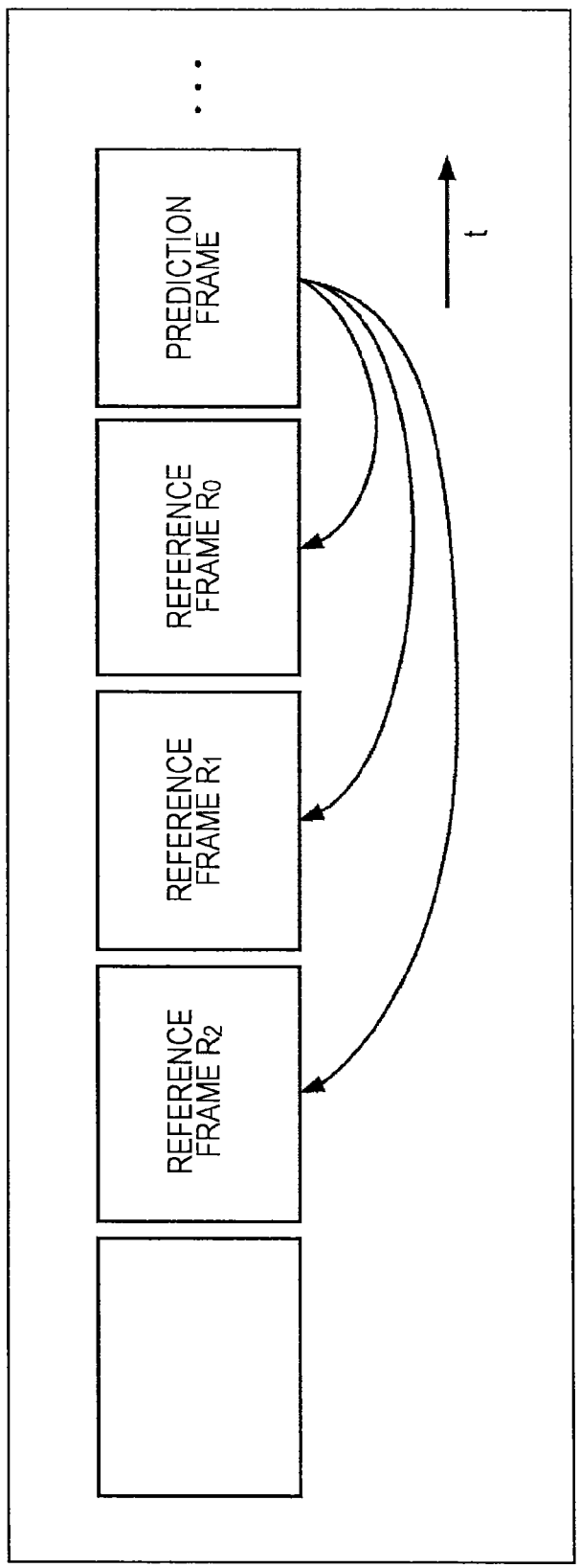
FIG. 23 is a diagram illustrating an example of the case of using three reference frames.

FIG. 23 is a diagram illustrating an example of the case of using three reference frames.

In the example in FIG. 23, with the time of a prediction frame serving as a basis, three frames that are temporally one unit of time before, two units of time before, and three units of time before are regarded as reference frames. The frame that is closer to and one unit of time before the prediction frame is regarded as a reference frame R0, the frame that is one unit of time before the reference frame R0 is regarded as a reference frame R1, and the frame that is one unit of time before the reference frame R1 is regarded as a reference frame R2.

Figure 24:
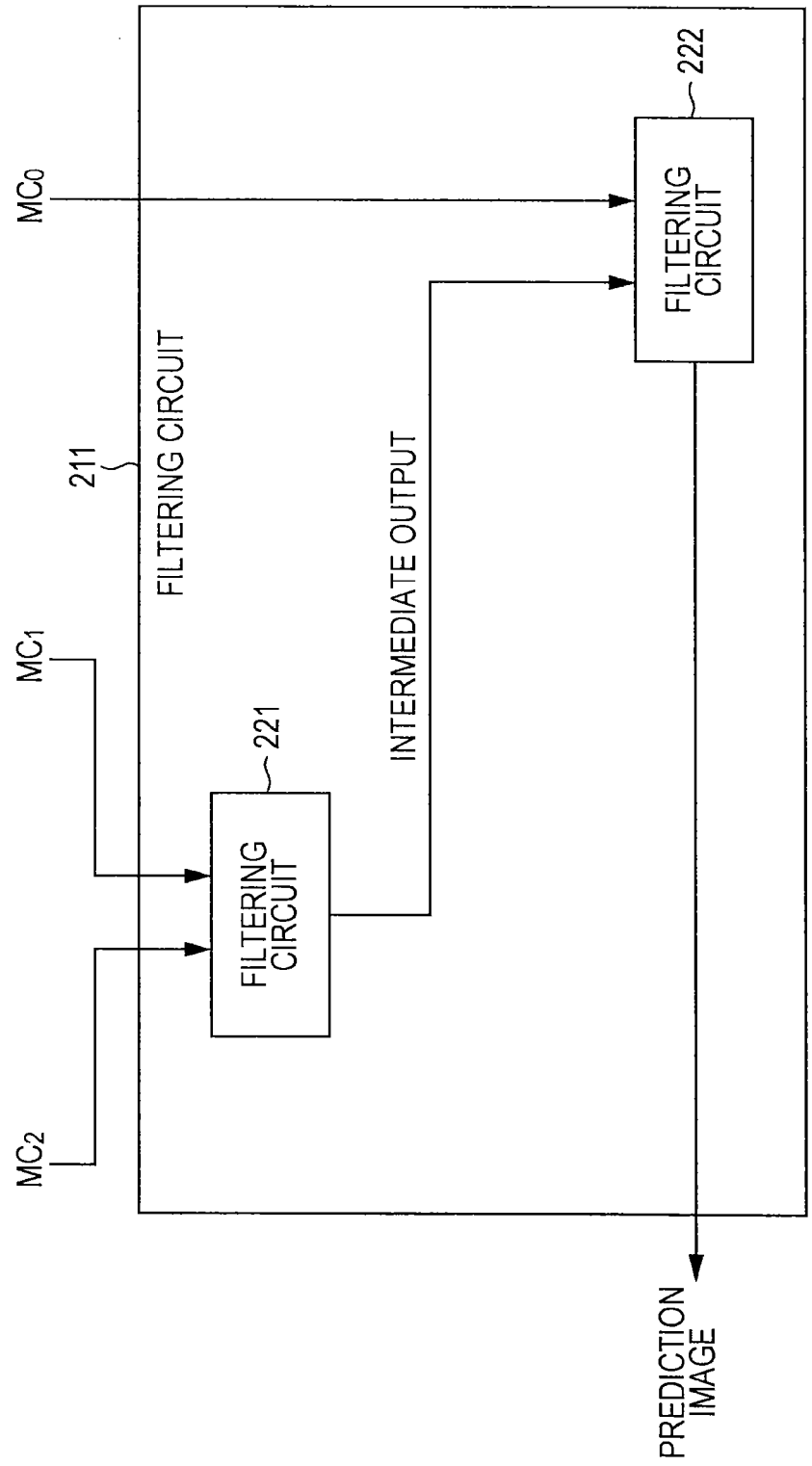
FIG. 24 is a block diagram illustrating an example configuration of a filtering circuit in the case of using three reference frames.

FIG. 24 is a block diagram illustrating an example configuration of a filtering circuit in the case of using three reference frames.

As illustrated in FIG. 24, a filtering circuit 211 is constituted by a filtering circuit 221 and a filtering circuit 222. Each of the filtering circuit 221 and the filtering circuit 222 has the configuration illustrated in FIG. 10, FIG. 21, or FIG. 22. That is, the filtering circuit 211 is configured to operate as a circuit of three inputs and one output by cascading the filtering circuit 45 that is used for two inputs and one output.

Here, a description will be given by regarding the motion compensation image extracted from the reference frame R0 as a motion compensation image MC0, the motion compensation image extracted from the reference frame R1 as a motion compensation image MC1, and the motion compensation image extracted from the reference frame R2 as a motion compensation image MC2. The motion compensation images MC1 and MC2 are input to the filtering circuit 221, and the motion compensation image MC0 is input to the filtering circuit 222.

The filtering circuit 221 performs filtering by regarding the motion compensation images MC1 and MC2 as the motion compensation images MC0 and MC1 in FIG. 10, etc., respectively, and outputs an intermediate output X, which is a result of the filtering, to the filtering circuit 222.

The filtering circuit 221 performs filtering by regarding the intermediate output X and the motion compensation image MC0 as the motion compensation images MC0 and MC1 in FIG. 10, etc., respectively, and outputs a result of the filtering serving as a prediction image.

It is also possible that the filtering circuit 211 that handles such three reference frames is provided in the decoding device 1 in FIG. 4 or the encoding device 101 in FIG. 15 instead of the filtering circuit 45.

Additionally, it is not necessary that the filtering circuit 221 and the filtering circuit 222 have the same configuration, and the individual configurations may be different from each other, for example, one has the configuration illustrated in FIG. 10 and the other has the configuration illustrated in FIG. 21. Also, it is possible to vary the parameter used for a filter in view of the input/output characteristics before and after filtering.

Filtering may be performed by the filtering circuit 211 on the motion compensation images extracted from three reference frames arranged in two time directions, not on the motion compensation images extracted from reference frames arranged in one time direction.

Note that, in the case of using frames before and after the time of the prediction frame as reference frames, including the case described above with reference to FIG. 8, a parameter such as a tap coefficient used for filtering may be dynamically changed in accordance with the time direction or distance of the reference frames.

The transmission of compressed image information from the encoding device 101 to the decoding device 1 is performed via various types of media, such as a recording medium including an optical disc, a magnetic disk, and a flash memory, satellite broadcasting, cable TV, the Internet, and a mobile phone network.

The above-descried series of processes can be executed by hardware and can be executed by software. In the case of executing the series of processes by software, the program constituting the software is installed through a program recording medium to a computer incorporated into dedicated hardware, a general-purpose personal computer capable of executing various types of functions by being installed with various types of programs, or the like.

Figure 25:
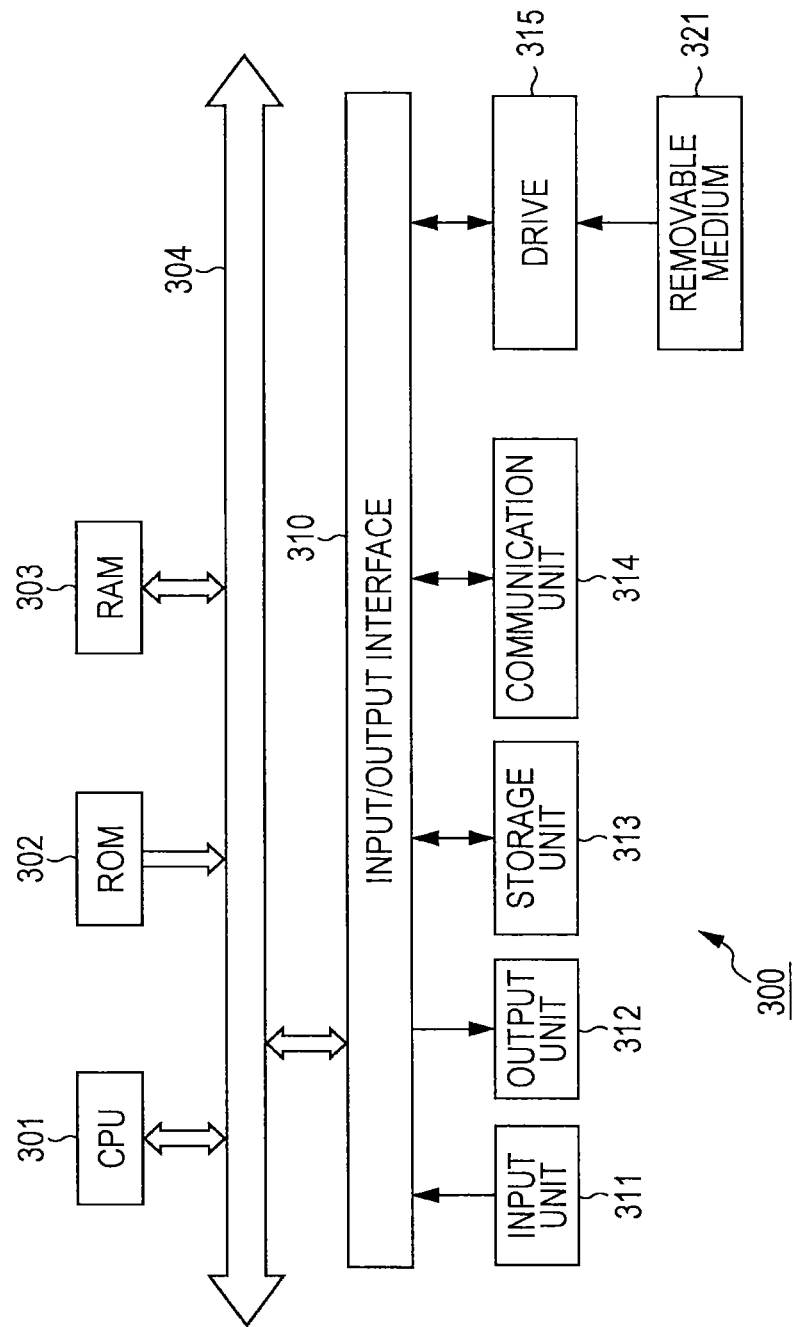
FIG. 25 is a block diagram illustrating an example configuration of a personal computer.

FIG. 25 is a block diagram illustrating an example hardware configuration of a computer 300 that executes the above-described series of processes in accordance with a program.

A CPU (Central Processing Unit) 301, a ROM (Read Only Memory) 302, and a RAM (Random Access Memory) 303 are mutually connected via a bus 304.

An input/output interface 310 is further connected to the bus 304. An input unit 311 made up of a keyboard, a mouse, a microphone, etc., an output unit 312 made up of a display, a speaker, etc., a storage unit 313 made up of a hard disk, a nonvolatile memory, etc., a communication unit 314 made up of a network interface, etc., and a drive 315 that drives a removable medium 321, such as an optical disc or a semiconductor memory, are connected to the input/output interface 310.

In the computer 300 having the foregoing configuration, the CPU 301 loads a program stored in the storage unit 313 to the RAM 303 via the input/output interface 310 and the bus 304 and executes it, for example, thereby performing the above-described series of processes.

The program executed by the CPU 301 is provided while being recorded on the removable medium 321, for example, or via a wired or wireless transmission medium, such as a local area network, the Internet, or digital broadcasting, and is installed in the storage unit 313.

In addition, the program executed by the computer may be a program in which processes are performed in time series in accordance with the order described in this description, or may be a program in which processes are performed in parallel or at necessary timing, such as when a call is performed.

Also, in this description, the steps describing a program recorded on a recording medium of course include processes performed in time series in accordance with the described order, and also include processes performed in parallel or individually, not in time series.

Also, in this description, a system is an entire apparatus constituted by a plurality of devices.

Also, regarding the above description, the configuration described as a single device (or processing unit) may be divided into a plurality of devices (or processing units). In contrast, the configuration described as a plurality of devices (or processing units) may be integrated into a signal device (or processing unit). Alternatively, a configuration other than the above-described configuration may of course be added to each device (or each processing unit). Furthermore, part of the configuration of a certain device (or processing unit) may be included in the configuration of another device (or another processing unit) as long as the configuration and operation of the entire system is substantially the same. That is, the embodiments of the present invention are not limited to the above-described embodiments, and various changes can be accepted without deviating from the gist of the present invention.

For example, the above-described decoding device 1 and the encoding device 101 can be applied to arbitrary electronic apparatuses. Hereinafter, the examples thereof will be described.

Figure 26:
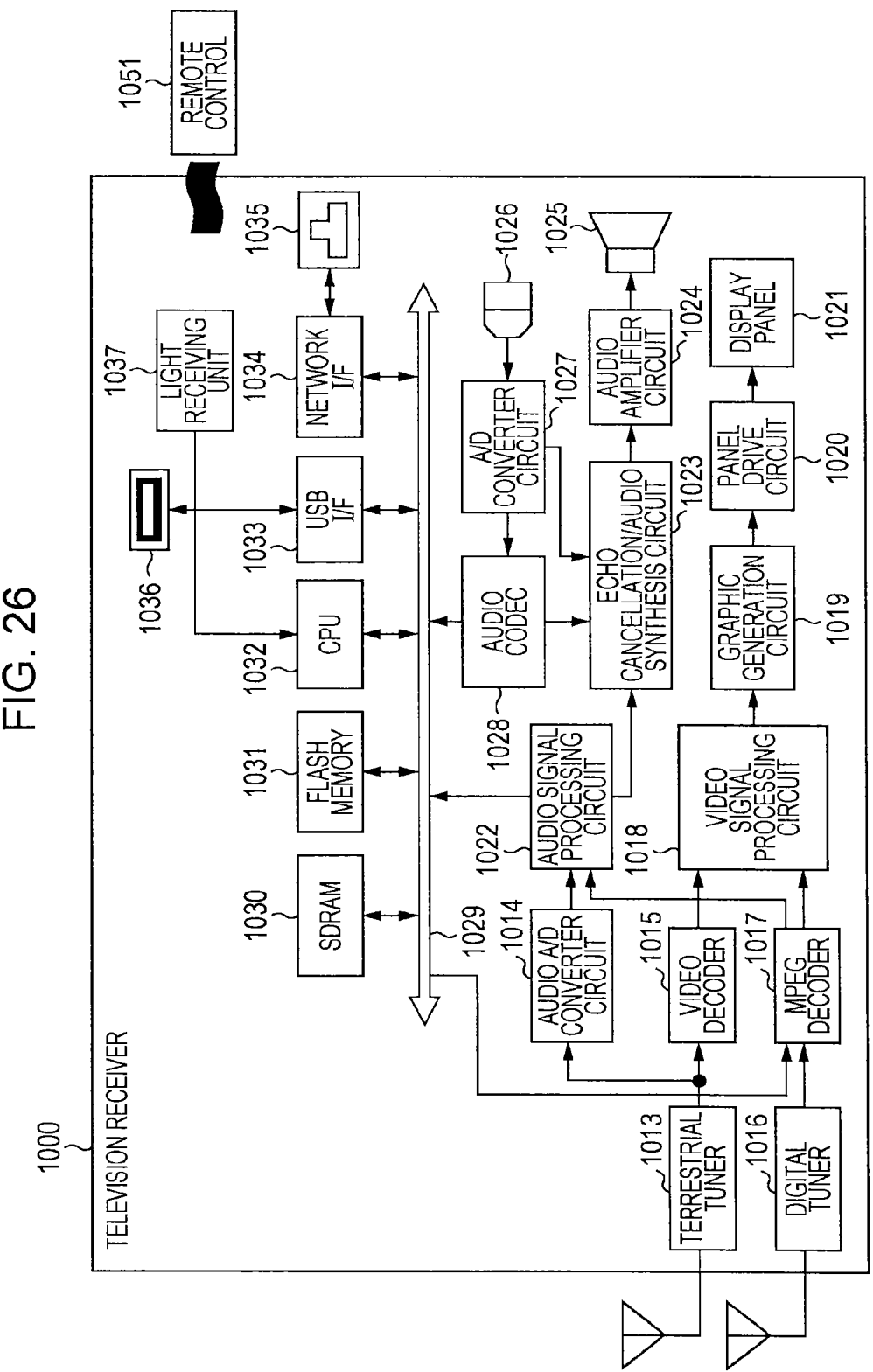
FIG. 26 is a block diagram illustrating a main example configuration of a television receiver to which the present invention is applied.

FIG. 26 is a block diagram illustrating a main example configuration of a television receiver that uses the decoding device 1 to which the present invention is applied.

The television receiver 1000 illustrated in FIG. 26 has a terrestrial tuner 1013, a video decoder 1015, a video signal processing circuit 1018, a graphic generation circuit 1019, a panel drive circuit 1020, and a display panel 1021.

The terrestrial tuner 1013 receives a broadcast wave signal of analog terrestrial broadcasting via an antenna, demodulates it, obtains a video signal, and supplies it to the video decoder 1015. The video decoder 1015 performs a decoding process on the video signal supplied from the terrestrial tuner 1013, and supplies an obtained digital component signal to the video signal processing circuit 1018.

The video signal processing circuit 1018 performs a certain process, such as denoising, on the video data supplied from the video decoder 1015, and supplies the obtained video data to the graphic generation circuit 1019.

The graphic generation circuit 1019 generates video data of a program that is to be displayed on the display panel 1021, image data based on a process based on an application supplied via a network, and the like, and supplies the generated video data and image data to the panel drive circuit 1020. Also, the graphic generation circuit 1019 performs a process of generating video data (graphic) for displaying a screen that is to be used by a user for selecting an item, superimposing it on video data of a program, and supplying the video data obtained thereby to the panel drive circuit 1020 as necessary.

The panel drive circuit 1020 drives the display panel 1021 on the basis of the data supplied from the graphic generation circuit 1019, and causes the display panel 1021 to display video of a program and the above-described various types of screens.

The display panel 1021 is made up of an LCD (Liquid Crystal Display) or the like, and displays video of a program or the like in accordance with the control performed by the panel drive circuit 1020.

Also, the television receiver 1000 has an audio A/D (Analog/Digital) converter circuit 1014, an audio signal processing circuit 1022, an echo cancellation/audio synthesis circuit 1023, an audio amplifier circuit 1024, and a speaker 1025.

The terrestrial tuner 1013 demodulates a received broadcast wave signal, thereby obtaining not only a video signal but also an audio signal. The terrestrial tuner 1013 supplies the obtained audio signal to the audio A/D converter circuit 1014.

The audio A/D converter circuit 1014 performs an A/D conversion process on the audio signal supplied from the terrestrial tuner 1013, and supplies an obtained digital audio signal to the audio signal processing circuit 1022.

The audio signal processing circuit 1022 performs a certain process, such as denoising, on the audio data supplied from the audio A/D converter circuit 1014, and supplies obtained audio data to the echo cancellation/audio synthesis circuit 1023.

The echo cancellation/audio synthesis circuit 1023 supplies the audio data supplied from the audio signal processing circuit 1022 to the audio amplifier circuit 1024.

The audio amplifier circuit 1024 performs a D/A conversion process and an amplification process on the audio data supplied from the echo cancellation/audio synthesis circuit 1023 to adjust it to a certain volume, and causes the audio to output from the speaker 1025.

Furthermore, the television receiver 1000 has a digital tuner 1016 and an MPEG decoder 1017.

The digital tuner 1016 receives a broadcast wave signal of digital broadcasting (digital terrestrial broadcasting, BS (Broadcasting Satellite)/CS (Communications Satellite) digital broadcasting) via an antenna, demodulates it, obtains an MPEG-TS (Moving Picture Experts Group-Transport Stream), and supplies it to the MPEG decoder 1017.

The MPEG decoder 1017 cancels scramble set on the MPEG-TS supplied from the digital tuner 1016, and extracts a stream including the data of a program that is to be played back (to be viewed/listened to). The MPEG decoder 1017 decodes the audio packets constituting the extracted stream and supplies obtained audio data to the audio signal processing circuit 1022, and also decodes the video packets constituting the stream and supplies obtained video data to the video signal processing circuit 1018. Also, the MPEG decoder 1017 supplies EPG (Electronic Program Guide) data extracted from the MPEG-TS to a CPU 1032 via a path that is not illustrated.

The television receiver 1000 uses the above-described decoding device 1 as the MPEG decoder 1017 that decodes video packets in this manner. Note that the MPEG-TS transmitted from a broadcast station or the like is encoded by the encoding device 101.

As in the case of the decoding device 1, the MPEG decoder 1017 performs decoding using a prediction image that is generated through filtering prediction. Also, at this time, as in the case of the decoding device 1, the MPEG decoder 1017 obtains part of motion compensation images using a motion vector, and obtains the remaining motion compensation image(s) through motion prediction of the motion compensation image obtained using the motion vector. Thus, the MPEG decoder 1017 can decrease the number of motion vectors to be encoded.

The video data supplied from the MPEG decoder 1017 is subjected to a certain process in the video signal processing circuit 1018, as in the case of the video data supplied from the video decoder 1015, video data or the like generated in the graphic generation circuit 1019 is appropriately superimposed thereon, the video data is supplied to the display panel 1021 via the panel drive circuit 1020, and the image thereof is displayed.

The audio data supplied from the MPEG decoder 1017 is subjected to a certain process in the audio signal processing circuit 1022, as in the case of the audio data supplied from the audio A/D converter circuit 1014, is supplied to the audio amplifier circuit 1024 via the echo cancellation/audio synthesis circuit 1023, and is subjected to a D/A conversion process and an amplification process. As a result, audio that is adjusted to a certain volume is output from the speaker 1025.

Also, the television receiver 1000 has a microphone 1026 and an A/D converter circuit 1027.

The A/D converter circuit 1027 receives a signal of audio of a user captured by the microphone 1026 that is provided in the television receiver 1000 for audio conversation, performs an A/D conversion process on the received audio signal, and supplies obtained digital audio data to the echo cancellation/audio synthesis circuit 1023.

In a case where the data of audio of a user (user A) of the television receiver 1000 is supplied from the A/D converter circuit 1027, the echo cancellation/audio synthesis circuit 1023 performs echo cancellation on the audio data of the user A, and causes the data of audio that is obtained through synthesis with other audio data to be output from the speaker 1025 via the audio amplifier circuit 1024.

Furthermore, the television receiver 1000 has an audio codec 1028, an internal bus 1029, an SDRAM (Synchronous Dynamic Random Access Memory) 1030, a flash memory 1031, the CPU 1032, a USB (Universal Serial Bus) I/F 1033, and a network I/F 1034.

The A/D converter circuit 1027 receives a signal of audio of a user captured by the microphone 1026 that is provided in the television receiver 1000 for audio conversation, performs an A/D conversion process on the received audio signal, and supplies obtained digital audio data to the audio codec 1028.

The audio codec 1028 converts the audio data supplied from the A/D converter circuit 1027 into data of a certain format for transmitting it via a network, and supplies it to the network I/F 1034 via the internal bus 1029.

The network I/F 1034 is connected to the network via a cable attached to a network terminal 1035. The network I/F 1034 transmits audio data supplied from the audio codec 1028 to another apparatus connected to the network, for example. Also, the network I/F 1034 receives, via the network terminal 1035, audio data transmitted from another apparatus connected via the network, for example, and supplies it to the audio codec 1028 via the internal bus 1029.

The audio codec 1028 converts the audio data supplied from the network I/F 1034 into data of a certain format, and supplies it to the echo cancellation/audio synthesis circuit 1023.

The echo cancellation/audio synthesis circuit 1023 performs echo cancellation on the audio data supplied from the audio codec 1028, and causes audio data obtained through synthesis with other audio data to be output from the speaker 1025 via the audio amplifier circuit 1024.

The SDRAM 1030 stores various types of data necessary for the CPU 1032 to perform a process.

The flash memory 1031 stores a program executed by the CPU 1032. The program stored in the flash memory 1031 is read by the CPU 1032 at certain timing, for example, at the start of the television receiver 1000. The flash memory 1031 also stores EPG data obtained via digital broadcasting and data obtained from a certain server via a network.

For example, the flash memory 1031 stores an MPEG-TS including content data obtained from a certain server via a network under the control performed by the CPU 1032. The flash memory 1031 supplies the MPEG-TS to the MPEG decoder 1017 via the internal bus 1029 under the control performed by the CPU 1032, for example.

The MPEG decoder 1017 processes the MPEG-TS, as in the case of the MPEG-TS supplied from the digital tuner 1016. In this way, the television receiver 1000 is capable of receiving content data of video, audio, or the like via a network, decoding it using the MPEG decoder 1017, and causing the video to be displayed or the audio to be output.

Also, the television receiver 1000 has a light receiving unit 1037 for receiving an infrared signal transmitted from a remote control 1051.

The light receiving unit 1037 receives an infrared ray from the remote control 1051, and outputs a control code representing the detail of a user operation obtained through demodulation to the CPU 1032.

The CPU 1032 executes a program stored in the flash memory 1031, and controls the entire operation of the television receiver 1000 in accordance with a control code or the like supplied from the light receiving unit 1037. The CPU 1032 is connected to the individual units of the television receiver 1000 via paths that are not illustrated.

The USB I/F 1033 performs transmission/reception of data to/from an external apparatus of the television receiver 1000, the apparatus being connected via a USB cable attached to a USB terminal 1036. The network I/F 1034 connects to a network via a cable attached to the network terminal 1035, and performs transmission/reception of data other than audio data to/from various types of apparatuses connected to the network.

The television receiver 1000 uses the decoding device 1 as the MPEG decoder 1017, thereby being capable of generating a highly precise prediction image using a small amount of control information during decoding performed on video packets forming a stream. As a result, the television receiver 1000 is capable of increasing the encoding efficiency while suppressing an increase in load.

Figure 27:
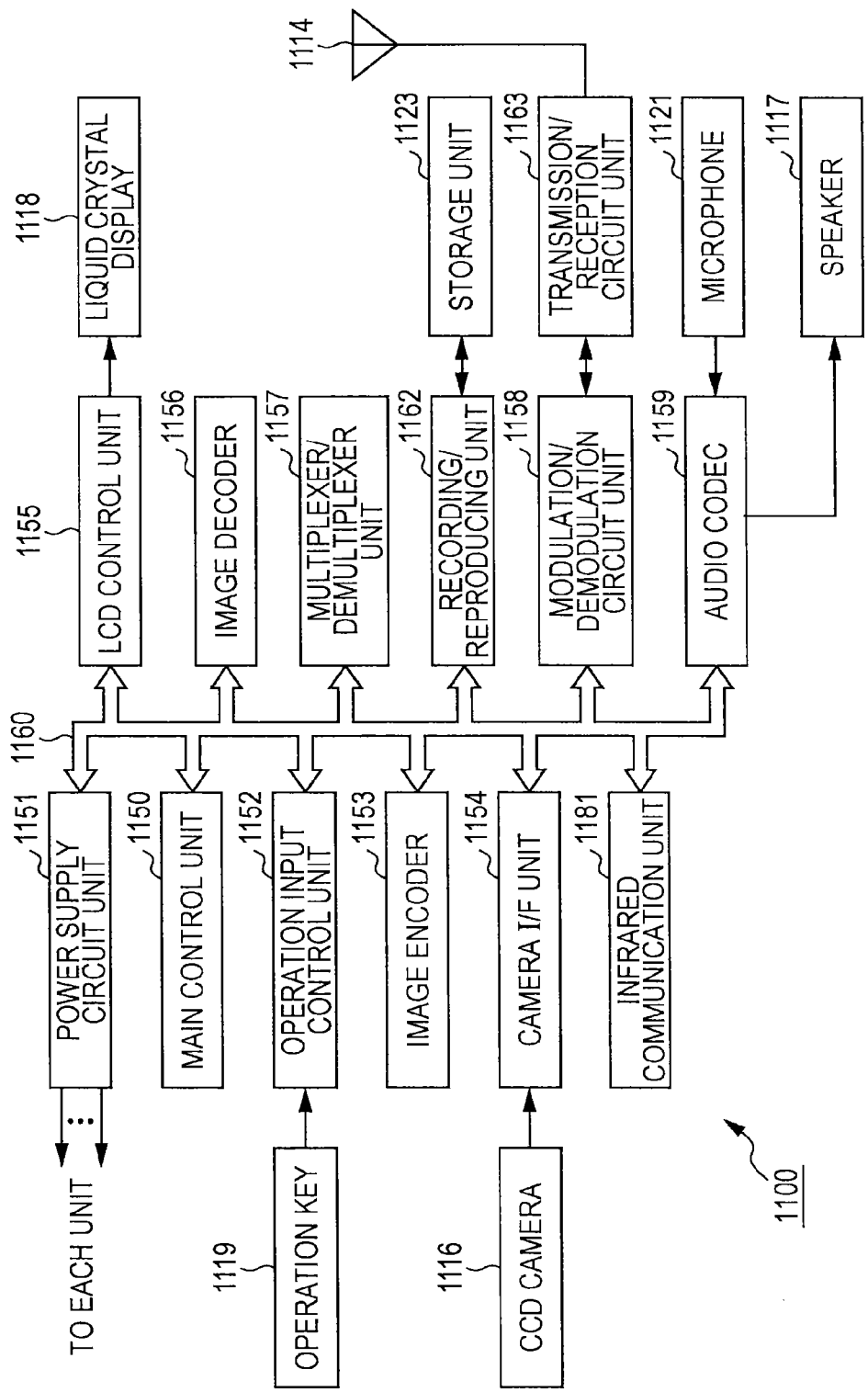
FIG. 27 is a block diagram illustrating a main example configuration of a mobile phone apparatus to which the present invention is applied.

FIG. 27 is a block diagram illustrating a main example configuration of a mobile phone apparatus that uses the decoding device 1 and the encoding device 101 to which the present invention is applied.

The mobile phone apparatus 1100 illustrated in FIG. 27 has a main control unit 1150 configured to collectively control the individual units, a power supply circuit unit 1151, an operation input control unit 1152, an image encoder 1153, a camera I/F unit 1154, an LCD control unit 1155, an image decoder 1156, a multiplexer/demultiplexer unit 1157, a recording/reproducing unit 1162, a modulation/demodulation circuit unit 1158, and an audio codec 1159. These are mutually connected via a bus 1160.

Also, the mobile phone apparatus 1100 has an operation key 1119, a CCD (Charge Coupled Devices) camera 1116, a liquid crystal display 1118, a storage unit 1123, a transmission/reception circuit unit 1163, an antenna 1114, a microphone 1121, and a speaker 1117.

When a call ends or a power key is turned on through a user operation, the power supply circuit unit 1151 supplies power from a battery pack to the individual units, thereby bringing the mobile phone apparatus 1100 into an operable state.

The mobile phone apparatus 1100 performs various types of operations, such as transmission/reception of an audio signal, transmission/reception of an electronic mail or image data, image capturing, or data recording, in various types of modes, such as an audio call mode or a data communication mode, on the basis of the control performed by the main control unit 1150 including a CPU, a ROM, a RAM, etc.

For example, in the audio call mode, the mobile phone apparatus 1100 converts an audio signal collected by the microphone 1121 into digital audio data using the audio codec 1159, performs a spectrum spread process thereon using the modulation/demodulation circuit unit 1158, and performs a digital-to-analog conversion process and a frequency conversion process using the transmission/reception circuit unit 1163. The mobile phone apparatus 1100 transmits a signal to be transmitted obtained though the conversion processes to a base station that is not illustrated via the antenna 1114. The signal to be transmitted (audio signal) transmitted to the base station is supplied to a mobile phone apparatus of the other end of a call via a public phone line network.

Also, for example, in the audio call mode, the mobile phone apparatus 1100 amplifies a reception signal received by the antenna 1114 using the transmission/reception circuit unit 1163, further performs a frequency conversion process and an analog-to-digital conversion process, performs a spectrum inverse spread process using the modulation/demodulation circuit unit 1158, and converts it into an analog audio signal using the audio codec 1159. The mobile phone apparatus 1100 outputs the analog audio signal obtained through the conversion from the speaker 1117.

Furthermore, for example, in the case of transmitting an electronic mail in the data communication mode, the mobile phone apparatus 1100 accepts, in the operation input control unit 1152, the text data of the electronic mail input through an operation of the operation key 1119. The mobile phone apparatus 1100 processes the text data in the main control unit 1150, and causes it to be displayed as an image on the liquid crystal display 1118 via the LCD control unit 1155.

Also, the mobile phone apparatus 1100 generates, in the main control unit 1150, electronic mail data on the basis of the text data or a user instruction accepted by the operation input control unit 1152. The mobile phone apparatus 1100 performs a spectrum spread process on the electronic mail data using the modulation/demodulation circuit unit 1158, and performs a digital-to-analog conversion process and a frequency conversion process using the transmission/reception circuit unit 1163. The mobile phone apparatus 1100 transmits a signal to be transmitted obtained through the conversion processes to a base station that is not illustrated via the antenna 1114. The signal to be transmitted (electronic mail) transmitted to the base station is supplied to a certain destination via a network and a mail server or the like.

Also, for example, in the case of receiving an electronic mail in the data communication mode, the mobile phone apparatus 1100 receives a signal transmitted from the base station via the antenna 1114 using the transmission/reception circuit unit 1163, amplifies it, and further performs a frequency conversion process and an analog-to-digital conversion process. The mobile phone apparatus 1100 performs a spectrum inverse spread process on the received signal using the modulation/demodulation circuit unit 1158 to restore original electronic mail data. The mobile phone apparatus 1100 displays the restored electronic mail data on the liquid crystal display 1118 via the LCD control unit 1155.

Additionally, the mobile phone apparatus 1100 is capable of causing the received electronic mail data to be recorded (stored) in the storage unit 1123 via the recording/reproducing unit 1162.

The storage unit 1123 is an arbitrary rewritable storage medium. The storage unit 1123 may be a semiconductor memory, such as a RAM or a built-in flash memory, a hard disk, or a removable medium, such as a magnetic disk, a magneto-optical disc, an optical disc, a USB memory, or a memory card. Of course, other types of media may be used.

Furthermore, for example, in the case of transmitting image data in the data communication mode, the mobile phone apparatus 1100 generates image data through capturing using the CCD camera 1116. The CCD camera 1116 has optical devices, such as a lens and a diaphragm, and a CCD serving as a photoelectric conversion element, captures an image of a subject, converts the intensity of received light into an electric signal, and generates image data of the image of the subject. The CCD camera 1116 encodes the image data using the image encoder 1153 via the camera I/F unit 1154, thereby converting the image data into encoded image data.

The mobile phone apparatus 1100 uses the above-described encoding device 101 as the image encoder 1153 that performs such a process. As in the case of the encoding device 101, the image encoder 1053 performs encoding using a prediction image that is generated through filtering prediction. Also, at this time, as in the case of the encoding device 101, the image encoder 1153 obtains part of motion compensation images using a motion vector, and obtains the remaining motion compensation image(s) through motion prediction of the motion compensation image obtained using the motion vector. Accordingly, the image encoder 1153 can decrease the number of motion vectors to be encoded.

In addition, at the same time, the mobile phone apparatus 1100 performs, in the audio codec 1159, analog-to-digital conversion on audio collected by the microphone 1121 during image capturing using the CCD camera 1116, and furthermore encodes it.

The mobile phone apparatus 1100 multiplexes, in the multiplexer/demultiplexer unit 1157, the encoded image data supplied from the image encoder 1153 and the digital audio data supplied from the audio codec 1159 in a certain method. The mobile phone apparatus 1100 performs a spectrum spread process on the multiplexed data obtained as a result using the modulation/demodulation circuit unit 1158, and performs a digital-to-analog conversion process and a frequency conversion process using the transmission/reception circuit unit 1163. The mobile phone apparatus 1100 transmits a signal to be transmitted obtained through the conversion processes to a base station that is not illustrated via the antenna 1114. The signal to be transmitted (image data) transmitted to the base station is supplied to the other end of communication via a network or the like.

Note that, in the case of not transmitting image data, the mobile phone apparatus 1100 can cause the image data generated by the CCD camera 1116 to be displayed on the liquid crystal display 1118 via the LCD control unit 1155, not via the image encoder 1153.

Also, for example, in the case of receiving data of a moving image file that is linked to a simple web page or the like in the data communication mode, the mobile phone apparatus 1100 receives a signal transmitted from a base station via the antenna 1114 using the transmission/reception circuit unit 1163, amplifies it, and further performs a frequency conversion process and an analog-to-digital conversion process. The mobile phone apparatus 1100 performs a spectrum inverse spread process on the received signal to restore original multiplexed data using the modulation/demodulation circuit unit 1158. The mobile phone apparatus 1100 demultiplexes the multiplexed data into encoded image data and audio data using the multiplexer/demultiplexer unit 1157.

The mobile phone apparatus 1100 decodes the encoded image data using the image decoder 1156 to generate reproduced moving image data, and causes the data to be displayed on the liquid crystal display 1118 via the LCD control unit 1155. Accordingly, for example, the moving image data included in the moving image file linked to the simple web page is displayed on the liquid crystal display 1118.

The mobile phone apparatus 1100 uses the above-described decoding device 1 as the image decoder 1156 for performing such a process. That is, as in the case of the decoding device 1, the image decoder 1156 obtains part of motion compensation images using a motion vector, and obtains the remaining motion compensation image(s) through motion prediction of the motion compensation image obtained using the motion vector. Accordingly, the image decoder 1156 can decrease the number of motion vectors to be encoded.

At this time, the mobile phone apparatus 1100 converts digital audio data into an analog audio signal using the audio codec 1159, and causes it to be output from the speaker 1117. Accordingly, for example, audio data included the moving image file linked to the simple web page is reproduced.

Note that, as in the case of an electronic mail, the mobile phone apparatus 1100 can also cause the received data linked to the simple web page or the like to be recorded (stored) in the storage unit 1123 via the recording/reproducing unit 1162.

Also, the mobile phone apparatus 1100 can analyze a two-dimensional code obtained by the CCD camera 1116 through image capturing and obtain information recorded in the two-dimensional code using the main control unit 1150.

Furthermore, the mobile phone apparatus 1100 can communicate with an external apparatus through an infrared ray using the infrared communication unit 1181.

By using the encoding device 101 as the image encoder 1153, the mobile phone apparatus 1100 can reduce the number of motion vectors to be transmitted when encoding image data generated in the CCD camera 1116 and transmitting the image data, thereby increasing the encoding efficiency.

Also, by using the decoding device 1 as the image decoder 1156, the mobile phone apparatus 1100 can generate a highly precise prediction image using a small amount of control information during decoding that is performed when receiving data (encoded data) of a moving image file linked to a simple web page or the like. As a result, the mobile phone apparatus 1100 can increase the encoding efficiency while suppressing an increase in load.

Note that, although a description has been given above that the mobile phone apparatus 1100 uses the CCD camera 1116, an image sensor using a CMOS (Complementary Metal Oxide Semiconductor) (CMOS image sensor) may be used instead of the CCD camera 1116. In this case, too, the mobile phone apparatus 1100 can capture an image of a subject and generate image data of the image of the subject, as in the case of using the CCD camera 1116.

Also, although a description has been given above of the mobile phone apparatus 1100, the decoding device 1 and the encoding device 101 can be applied to any apparatus having an image capturing function and a communication function similar to those of the mobile phone apparatus 1100, such as a PDA (Personal Digital Assistants), a smart phone, a UMPC (Ultra Mobile Personal Computer), a net book, or a notebook personal computer, as in the case of the mobile phone apparatus 1100.

FIG. 28 is a block diagram illustrating a main example configuration of a hard disk recorder that uses the decoding device 1 and the encoding device 101 to which the present invention is applied.

The hard disk recorder (HDD recorder) 1200 illustrated in FIG. 28 is an apparatus that stores audio data and video data of a broadcast program included in a broadcast wave signal (television signal) that is transmitted from a satellite, an antenna on the ground, or the like and that is received by a tuner in a hard disk included therein and that provides the stored data to a user at timing corresponding to an instruction provided from the user.

The hard disk recorder 1200 can extract audio data and video data from a broadcast wave signal, appropriately decode them, and cause them to be stored in the hard disk included therein, for example. Also, the hard disk recorder 1200 can obtain audio data and video data from another apparatus via a network, appropriately decode them, and cause them to be stored in the hard disk included therein, for example.

Furthermore, the hard disk recorder 1200 can decode audio data and video data recorded on the hard disk included therein, supply them to a monitor 1260, cause the image thereof to be displayed on the screen of the monitor 1260, and cause the audio thereof to be output from the speaker of the monitor 1260, for example. Also, the hard disk recorder 1200 can decode audio data and video data extracted from a broadcast wave signal obtained via a tuner or audio data and video data obtained from another apparatus via a network, supply them to the monitor 1260, cause the image thereof to be displayed on the screen of the monitor 1260, and cause the audio thereof to be output from the speaker of the monitor 1260, for example.

Of course, another operation can be performed.

As illustrated in FIG. 28, the hard disk recorder 1200 has a reception unit 1221, a demodulation unit 1222, a demultiplexer 1223, an audio decoder 1224, a video decoder 1225, and a recorder control unit 1226. The hard disk recorder 1200 further has an EPG data memory 1227, a program memory 1228, a work memory 1229, a display converter 1230, an OSD (On Screen Display) control unit 1231, a display control unit 1232, a recording/reproducing unit 1233, a D/A converter 1234, and a communication unit 1235.

Also, the display converter 1230 has a video encoder 1241. The recording/reproducing unit 1233 has an encoder 1251 and a decoder 1252.

The reception unit 1221 receives an infrared signal from a remote control (not illustrated), converts it into an electric signal, and outputs it to the recorder control unit 1226. The recorder control unit 1226 is constituted by a microprocessor or the like, for example, and executes various types of processes in accordance with a program stored in the program memory 1228. At this time, the recorder control unit 1226 uses the work memory 1229 as necessary.

The communication unit 1235 is connected to a network, and performs a communication process with another apparatus via the network. For example, the communication unit 1235 is controlled by the recorder control unit 1226, communicates with a tuner (not illustrated), and outputs a channel select control signal mainly to the tuner.

The demodulation unit 1222 demodulates the signal supplied from the tuner and outputs it to the demultiplexer 1223. The demultiplexer 1223 demultiplexes the data supplied from the demodulation unit 1222 into audio data, video data, and EPG data, and outputs them to the audio decoder 1224, the video decoder 1225, and the recorder control unit 1226, respectively.

The audio decoder 1224 decodes audio data input thereto, and outputs it to the recording/reproducing unit 1233. The video decoder 1225 decodes video data input thereto, and outputs it to the display converter 1230. The recorder control unit 1226 supplies EPG data input thereto to the EPG data memory 1227 so as to store it therein.

The display converter 1230 encodes, with the video encoder 1241, the video data supplied from the video decoder 1225 or the recorder control unit 1226 into video data of an NTSC (National Television Standards Committee) method, for example, and outputs it to the recording/reproducing unit 1233. Also, the display converter 1230 converts the size of the screen of the video data supplied from the video decoder 1225 or the recorder control unit 1226 into the size corresponding to the size of the monitor 1260, converts it into video data of the NTSC method with the video encoder 1241, converts it into an analog signal, and outputs it to the display control unit 1232.

The display control unit 1232 superimposes the OSD signal output from the OSD (On Screen Display) control unit 1231 on the video signal input from the display converter 1230 under the control performed by the recorder control unit 1226, outputs it to the display of the monitor 1260, and causes it to be displayed.

Also, the monitor 1260 is supplied with the audio data that is output from the audio decoder 1224 and that has been converted into an analog signal by the D/A converter 1234. The monitor 1260 outputs this audio signal from the speaker included therein.

The recording/reproducing unit 1233 has a hard disk as a storage medium for having video data, audio data, and the like recorded thereon.

The recording/reproducing unit 1233 encodes, with the encoder 1251, the audio data supplied from the audio decoder 1224, for example. Also, the recording/reproducing unit 1233 encodes, with the encoder 1251, the video data supplied from the video encoder 1241 of the display converter 1230. The recording/reproducing unit 1233 combines, with a multiplexer, the encoded data of the audio data and the encoded data of the video data. The recording/reproducing unit 1233 performs channel coding on the composite data to amplify it, and writes the data on the hard disk via a recording head.

The recording/reproducing unit 1233 reproduces the data recorded on the hard disk via a reproducing head, amplifies it, and demultiplexes it into audio data and video data using a demultiplexer. The recording/reproducing unit 1233 decodes, with the decoder 1252, the audio data and the video data. The recording/reproducing unit 1233 D/A converts the decoded audio data and outputs it to the speaker of the monitor 1260. Also, the recording/reproducing unit 1233 D/A converts the decoded video data and outputs it to the display of the monitor 1260.

The recorder control unit 1226 reads the latest EPG data from the EPG data memory 1227 on the basis of a user instruction represented by an infrared signal that is supplied from the remote control and that is received via the reception unit 1221, and supplies it to the OSD control unit 1231. The OSD control unit 1231 generates image data corresponding to the input EPG data, and outputs it to the display control unit 1232. The display control unit 1232 outputs the video data input from the OSD control unit 1231 to the display of the monitor 1260, and causes it to be displayed. Accordingly, an EPG (electronic program guide) is displayed on the display of the monitor 1260.

Also, the hard disk recorder 1200 can obtain various types of data, such as video data, audio data, or EPG data, supplied from another apparatus via a network, such as the Internet.

The communication unit 1235 is controlled by the recorder control unit 1226, obtains encoded data of video data, audio data, and EPG data transmitted from another apparatus via a network, and supplies it to the recorder control unit 1226. The recorder control unit 1226 supplies the obtained encoded data of video data and audio data to the recording/reproducing unit 1233, and causes the hard disk to store it, for example. At this time, the recorder control unit 1226 and the recording/reproducing unit 1233 may perform a process, such as re-encoding, as necessary.

Also, the recorder control unit 1226 decodes the obtained encoded data of video data and audio data, and supplies the obtained video data to the display converter 1230. The display converter 1230 processes the video data supplied from the recorder control unit 1226, like the video data supplied from the video decoder 1225, supplies it to the monitor 1260 via the display control unit 1232, and causes the image to be displayed.

Also, in accordance with this image display, the recorder control unit 1226 may supply decoded audio data to the monitor 1260 via the D/A converter 1234 and cause the audio to be output from the speaker.

Furthermore, the recorder control unit 1226 decodes the obtained encoded data of the EPG data, and supplies the decoded EPG data to the EPG data memory 1227.

The hard disk recorder 1200 described above uses the decoding device 1 as the video decoder 1225, the decoder 1252, and the decoder included in the recorder control unit 1226. That is, the video decoder 1225, the decoder 1252, and the decoder included in the recorder control unit 1226 obtain part of motion compensation images using a motion vector, and obtains the remaining motion compensation image(s) through motion prediction of the motion compensation image obtained using the motion vector, as in the case of the decoding device 1. Accordingly, the video decoder 1225, the decoder 1252, and the decoder included in the recorder control unit 1226 can decrease the number of motion vectors to be encoded.

Therefore, the hard disk recorder 1200 can generate a highly precise prediction image using a small amount of control information during decoding that is performed when the tuner or the communication unit 1235 receives video data (encoded data) or when the recording/reproducing unit 1233 reproduces video data (encoded data) from a hard disk. As a result, the hard disk recorder 1200 can increase the encoding efficiency while suppressing an increase in load.

Also, the hard disk recorder 1200 uses the encoding device 101 as the encoder 1251. Thus, the encoder 1251 obtains part of motion compensation images using a motion vector, and obtains the remaining motion compensation image(s) through motion prediction of the motion compensation image obtained using the motion vector, as in the case of the encoding device 101. Accordingly, the encoder 1251 can decrease the number of motion vectors to be encoded.

Therefore, the hard disk recorder 1200 can decrease the number of motion vectors when recording encoded data on a hard disk, thereby increasing the encoding efficiency.

Note that, although a description has been given above of the hard disk recorder 1200 for recording video data and audio data on a hard disk, any types of recording media may of course be used. For example, the decoding device 1 and the encoding device 101 can be applied to a recorder that applies a recording medium other than a hard disk, for example, a flash memory, an optical disc, or video tape, as in the case of the above-described hard disk recorder 1200.

FIG. 29 is a block diagram illustrating a main example configuration of a camera that uses the decoding device 1 and the encoding device 101 to which the present invention is applied.

The camera 1300 illustrated in FIG. 29 captures an image of a subject, causes an LCD 1316 to display the image of the subject, and records it as image data on a recording medium 1333.

A lens block 1311 causes light (i.e., an image of a subject) to enter a CCD/CMOS 1312. The CCD/CMOS 1312 is an image sensor using a CCD or CMOS, converts the intensity of received light into an electric signal, and supplies it to a camera signal processing unit 1313.

The camera signal processing unit 1313 converts the electric signal supplied from the CCD/CMOS 1312 into color-difference signals of Y, Cr, and Cb, and supplies them to an image signal processing unit 1314. The image signal processing unit 1314 performs certain image processing on an image signal supplied from the camera signal processing unit 1313 and encodes, with an encoder 1341, the image signal under the control performed by a controller 1321. The image signal processing unit 1314 supplies encoded data that is generated by encoding the image signal to a decoder 1315. Furthermore, the image signal processing unit 1314 obtains data to be displayed generated in an on screen display (OSD) 1320, and supplies it to the decoder 1315.

In the foregoing process, the camera signal processing unit 1313 appropriately uses a DRAM (Dynamic Random Access Memory) 1318 connected via a bus 1317, and causes the DRAM 1318 to hold image data, encoded data obtained by encoding the image data, or the like as necessary.

The decoder 1315 decodes encoded data supplied from the image signal processing unit 1314, and supplies obtained image data (decoded image data) to the LCD 1316. Also, the decoder 1315 supplies the data to be displayed supplied from the image signal processing unit 1314 to the LCD 1316. The LCD 1316 appropriately combines the image of the decoded image data supplied from the decoder 1315 and the image of the data to be displayed, and displays the composite image.

The on screen display 1320 outputs data to be displayed, such as a menu screen made up of symbols, characters, or figures, and icons, to the image signal processing unit 1314 via the bus 1317 under the control performed by the controller 1321.

The controller 1321 executes various types of processes on the basis of a signal representing the detail of an instruction provided from a user using an operation unit 1322, and controls the image signal processing unit 1314, the DRAM 1318, an external interface 1319, the on screen display 1320, a medium drive 1323, and so fourth via the bus 1317. Programs, data, and the like that are necessary for the controller 1321 to execute various types of processes are stored in a flash ROM 1324.

For example, the controller 1321 can encode the image data stored in the DRAM 1318 and decode the encoded data stored in the DRAM 1318 on behalf of the image signal processing unit 1314 or the decoder 1315. At this time, the controller 1321 may perform an encoding/decoding process in a method similar to an encoding/decoding method of the image signal processing unit 1314 or the decoder 1315, or may perform an encoding/decoding process in a method incompatible with the image signal processing unit 1314 or the decoder 1315.

Also, for example, if an instruction to start printing an image is provided from the operation unit 1322, the controller 1321 reads image data from the DRAM 1318 and supplies it to a printer 1334 connected to the external interface 1319 via the bus 1317 to print it.

Furthermore, for example, if an instruction to record an image is provided from the operation unit 1322, the controller 1321 reads encoded data from the DRAM 1318 and supplies it to the recording medium 1333 loaded in the medium drive 1323 via the bus 1317 to store it.

The recording medium 1333 is an arbitrary readable and writable removable medium, such as a magnetic disk, a magneto-optical disc, an optical disc, or a semiconductor memory. Of course, the recording medium 1333 may be a removable medium of any type, and may be a tape device, disc, or memory card. Of course, the recording medium 1333 may be a noncontact IC card or the like.

Also, the medium drive 1323 and the recording medium 1333 may be integrated, and may be constituted by a non-transportable storage medium, such as a built-in hard disk drive or an SSD (Solid State Drive).

The external interface 1319 is constituted by a USB input/output terminal or the like, for example, and is connected to the printer 1334 in the case of printing an image. Also, a drive 1331 is connected to the external interface 1319 as necessary, a removable medium 1332, such as a magnetic disk, an optical disc, or a magneto-optical disc, is appropriately loaded thereto, and a computer program read therefrom is installed into the flash ROM 1324 as necessary.

Furthermore, the external interface 1319 has a network interface connected to a certain network, such as a LAN or the Internet. The controller 1321 can read encoded data from the DRAM 1318 and supply it from the external interface 1319 to another apparatus connected via a network, in accordance with an instruction provided from the operation unit 1322, for example. Also, the controller 1321 can obtain, via the external interface 1319, encoded data or image data supplied from another apparatus via a network, and cause the DRAM 1318 to hold it or supply it to the image signal processing unit 1314.

The camera 1300 described above uses the decoding device 1 as the decoder 1315. That is, the decoder 1315 obtains part of motion compensation images using a motion vector, and obtains the remaining motion compensation image(s) through motion prediction of the motion compensation image obtained using the motion vector, as in the case of the decoding device 1. Accordingly, the decoder 1315 can decrease the number of motion vectors to be encoded.

Therefore, the camera 1300 can generate a highly precise prediction image using a small amount of control information when reading image data generated in the CCD/CMOS 1312 or encoded data of video data from the DRAM 1318 or the recording medium 1333, or when obtaining encoded data of video data via a network. As a result, the camera 1300 can increase the encoding efficiency while suppressing an increase in load.

Also, the camera 1300 uses the encoding device 101 as the encoder 1341. The encoder 1341 obtains part of motion compensation images using a motion vector, and obtains the remaining motion compensation image(s) through motion prediction of the motion compensation image obtained using the motion vector, as in the case of the encoding device 101. Accordingly, the encoder 1341 can decrease the number of motion vectors to be encoded.

Therefore, the camera 1300 can decrease the number of motion vectors when recoding encoded data on the DRAM 1318 or the recording medium 1333 or when providing encoded data to another apparatus, for example, and can increase the encoding efficiency.

In addition, the decoding method of the decoding device 1 may be applied to a decoding process performed by the controller 1321. Likewise, the encoding method of the encoding device 101 may be applied to an encoding process performed by the controller 1321.

Also, the image data captured by the camera 1300 may be a moving image or a still image.

Of course, the decoding device 1 and the encoding device 101 can be applied to an apparatus or a system other than the above-described apparatuses.

Also, the size of macroblocks may be arbitrarily set. The present invention can be applied to various sizes of macroblocks, as illustrated in FIG. 30, for example. For example, the present invention can also be applied to an expanded macroblock of 32×32 pixels (expanded macroblock) as well as an ordinary macroblock of 16×16 pixels.

In the upper stage of FIG. 30, macroblocks constituted by 32×32 pixels, which are divided into blocks (partition) of 32×32 pixels, 32×16 pixels, 16×32 pixels, and 16×16 pixels, are illustrated in order from the left. Also, in the middle stage, blocks constituted by 16×16 pixels, which are divided into blocks of 16×16 pixels, 16×8 pixels, 8×16 pixels, and 8×8 pixels, are illustrated in order from the left. Furthermore, in the lower stage, blocks constituted by 8×8 pixels, which are divided into blocks of 8×8 pixels, 8×4 pixels, 4×8 pixels, and 4×4 pixels, are illustrated in order from the left.

That is, the macroblock of 32×32 pixels can be processed as the blocks of 32×32 pixels, 32×16 pixels, 16×32 pixels, and 16×16 pixels illustrated in the upper stage.

The block of 16×16 pixels illustrated on the right side in the upper stage can be processed as the blocks of 16×16 pixels, 16×8 pixels, 8×16 pixels, and 8×8 pixels illustrated in the middle stage, as in the H.264/AVC method.

The block of 8×8 pixels illustrated on the right side in the middle stage can be processed as the blocks of 8×8 pixels, 8×4 pixels, 4×8 pixels, and 4×4 pixels illustrated in the lower stage, as in the H.264/AVC method.

These blocks can be classified into the following three layers. That is, the blocks of 32×32 pixels, 32×16 pixels, and 16×32 pixels illustrated in the upper stage of FIG. 30 are referred to as a first layer. The block of 16×16 pixels illustrated on the right side in the upper stage, and the blocks of 16×16 pixels, 16×8 pixels, and 8×16 pixels illustrated in the middle stage are referred to as a second layer. The block of 8×8 pixels illustrated on the right side in the middle stage, and the blocks of 8×8 pixels, 8×4 pixels, 4×8 pixels, and 4×4 pixels illustrated in the lower stage are referred to as a third layer.

By adopting such a hierarchical structure, regarding blocks of 16×16 pixels or less, a larger block can be defined as a superset thereof while maintaining the compatibility with the H.264/AVC method.

For example, the decoding device 1 and the encoding device 101 may generate prediction images for individual layers. Also, for example, a prediction image generated by the decoding device 1 and the encoding device 101 in the first layer, which is a layer of a larger block size than in the second layer, may also be used for the second layer.

The macroblocks in which encoding is performed using a relatively large block size, as in the first layer and the second layer, have a relatively small amount of high-frequency component. In contrast, it is considered that the macroblocks in which encoding is performed using a relatively small block size, as in the third layer, have a relatively large amount of high-frequency component.

Accordingly, by individually generating prediction images in accordance with the respective layers of different block sizes, an improvement of an encoding performance suitable for a local property of an image can be realized.

REFERENCE SIGNS LIST

1 decoding device, 21 motion prediction/compensation circuit, 41 prediction mode determination circuit, 42 unidirectional prediction circuit, 43 bidirectional prediction circuit, 44 prediction circuit, 45 filtering circuit, 51 motion compensation circuit, 52 motion prediction circuit, 61 difference calculation circuit, 62 low-pass filter circuit, 63 gain adjustment circuit, 64 high-pass filter circuit, 65 gain adjustment circuit, 66 adder circuit, 67 adder circuit

The invention claimed is:

1. An image processing device, comprising:
circuitry configured to:
perform motion compensation by using a motion vector of an encoded image, with a frame formed of a decoded image serving as a reference frame, to generate a first motion compensation image corresponding to a prediction image; and
generate the prediction image by performing a filtering process on at least two motion-compensated images by using a correlation in a time direction included in the first motion compensation image and a second motion compensation image.

2. The image processing device of claim 1, wherein the circuitry is configured to:
add the first motion compensation image and the second motion compensation image; and
generate the prediction image by performing the filtering process on the added first and second motion compensation images.

3. The image processing device of claim 2, wherein the circuitry is configured to:
add a first image representing a high-frequency component to the first motion compensation image; and
add a second image representing a high-frequency component to the second motion compensation image.

4. A method performed by an image processing device, the method comprising:
performing, by circuitry of the image processing device, motion compensation by using a motion vector of an encoded image, with a frame formed of a decoded image serving as a reference frame, to generate a first motion compensation image corresponding to a prediction image; and
generating, by the circuitry, the prediction image by performing a filtering process on at least two motion-compensated images by using a correlation in a time direction included in the first motion compensation image and a second motion compensation image.

5. The method of claim 4, further comprising:
adding the first motion compensation image and the second motion compensation image; and
generating the prediction image by performing the filtering process on the added first and second motion compensation images.

6. The method of claim 5, further comprising:
adding a first image representing a high-frequency component to the first motion compensation image; and
adding a second image representing a high-frequency component to the second motion compensation image.

7. A non-transitory computer-readable medium including a computer program, which when executed by an image processing device, causes the image processing device to:
perform motion compensation by using a motion vector of an encoded image, with a frame formed of a decoded image serving as a reference frame, to generate a first motion compensation image corresponding to a prediction image; and
generate the prediction image by performing a filtering process on at least two motion-compensated images by using a correlation in a time direction included in the first motion compensation image and a second motion compensation image.

8. The non-transitory computer-readable medium of claim 7, further causing the image processing device to:
add the first motion compensation image and the second motion compensation image; and generate the prediction image by performing the filtering process on the added first and second motion compensation images.

9. The non-transitory computer-readable medium of claim 8, further causing the image processing device to:
add a first image representing a high-frequency component to the first motion compensation image; and
add a second image representing a high-frequency component to the second motion compensation image.

* * * * *